US012247810B2

(12) United States Patent
Sullivan

(10) Patent No.: US 12,247,810 B2
(45) Date of Patent: Mar. 11, 2025

(54) OPTICALLY TRACKED PROJECTILE

(71) Applicant: NOSTROMO HOLDINGS, LLC, Alexandria, VA (US)

(72) Inventor: Kevin Michael Sullivan, Kennebunk, ME (US)

(73) Assignee: NOSTROMO, LLC, Kennebunk, ME (US)

(*) Notice: Subject to any disclaimer, the term of this patent is extended or adjusted under 35 U.S.C. 154(b) by 0 days.

(21) Appl. No.: 17/902,190

(22) Filed: Sep. 2, 2022

(65) Prior Publication Data

US 2023/0194208 A1 Jun. 22, 2023

Related U.S. Application Data

(63) Continuation-in-part of application No. 17/069,836, filed on Oct. 13, 2020, now abandoned, which is a continuation-in-part of application No. 15/386,555, filed on Dec. 21, 2016, now abandoned, which is a continuation-in-part of application No. 15/228,217, filed on Aug. 4, 2016, now abandoned, which is a continuation of application No. 14/220,404, filed on Mar. 20, 2014, now abandoned.

(60) Provisional application No. 62/201,255, filed on Aug. 5, 2015, provisional application No. 61/803,826, filed on Mar. 21, 2013.

(51) Int. Cl.
*F42B 12/38* (2006.01)
*F41G 3/14* (2006.01)

(52) U.S. Cl.
CPC ............ *F41G 3/142* (2013.01); *F42B 12/387* (2013.01)

(58) Field of Classification Search
CPC ........ F42B 12/03; F42B 12/387; F42B 12/38; F42B 12/78
USPC .................................................. 102/458, 513
See application file for complete search history.

(56) References Cited

U.S. PATENT DOCUMENTS 338,849 A * 3/1886 Lorenz .................... F42B 12/78
102/514
2,318,089 A 5/1943 Mattin
(Continued)

FOREIGN PATENT DOCUMENTS

DE 1131561 6/1962
DE 3123339 A1 12/1982
(Continued)

OTHER PUBLICATIONS

International Search Report issued in PCT/US2021/070348, mailed Jul. 27, 2021.
(Continued)

*Primary Examiner* — Jonathan C Weber
(74) *Attorney, Agent, or Firm* — Philip E. Levy; Eckert Seamans Cherin & Mellott, LLC

(57) ABSTRACT

A projectile, that can be tracked by optical means, is fitted with a special tracer incorporated into the projectile's trailing edge. The rearward facing special tracer is incorporated into a metal disk which is crimped to the projectile's metal jacket. The special tracer includes micro-prismatic features that reflect light at the incidence angle. Alternatively, the disk incorporates a fluorescent dye that is responsive to a laser emission. External emitted radiation is reflected or re-emitted from the trailing edge of the projectile, allowing for an external electro-optic tracking device to identify the position of the projectile in flight.

18 Claims, 55 Drawing Sheets

(56) References Cited

U.S. PATENT DOCUMENTS

| | | | |
|---|---|---|---|
| 3,712,706 A | 1/1973 | Stamm | |
| 3,757,632 A | 9/1973 | Bellinger | |
| 3,760,735 A | 9/1973 | Schmitt | |
| 3,875,864 A | 4/1975 | Ambrosini et al. | |
| 4,015,258 A | 3/1977 | Smith | |
| 4,080,899 A | 3/1978 | Luban | |
| 4,233,770 A | 11/1980 | de Filippis et al. | |
| 4,495,870 A | 1/1985 | Bell | |
| 4,528,911 A | 7/1985 | DePhillipo et al. | |
| 4,547,949 A | 10/1985 | Heller et al. | |
| 4,597,810 A | 7/1986 | Trickel et al. | |
| 4,625,650 A | 12/1986 | Bilsbury | |
| 4,853,283 A | 8/1989 | Skolnick | |
| 5,020,439 A | 6/1991 | Winter et al. | |
| 5,026,158 A | 6/1991 | Golubic | |
| 5,127,332 A | 7/1992 | Corzine et al. | |
| 5,171,624 A | 12/1992 | Walter | |
| 5,267,014 A | 11/1993 | Prenninger | |
| 5,312,560 A | 5/1994 | Somatomo et al. | |
| 5,333,552 A | 8/1994 | Corzine et al. | |
| 5,359,779 A | 11/1994 | Polk et al. | |
| 5,378,499 A | 1/1995 | Martin et al. | |
| 5,415,151 A | 5/1995 | Fusi et al. | |
| 5,546,358 A | 8/1996 | Thomson | |
| 5,596,509 A | 1/1997 | Karr | |
| 5,685,504 A | 11/1997 | Schneider et al. | |
| 5,773,752 A | 6/1998 | Blume | |
| 6,048,280 A | 4/2000 | Palmer et al. | |
| 6,057,915 A | 5/2000 | Squire et al. | |
| 6,097,491 A | 8/2000 | Hartrumpf | |
| 6,139,323 A | 10/2000 | Christians et al. | |
| 6,298,841 B1 | 10/2001 | Cheng et al. | |
| 6,497,181 B1 | 12/2002 | Manole et al. | |
| 6,532,876 B1 | 3/2003 | Ramirez et al. | |
| 6,799,518 B1 | 10/2004 | Williams | |
| 6,808,467 B2 | 10/2004 | Takeda et al. | |
| 6,820,496 B2 | 11/2004 | McElhanon et al. | |
| 6,880,467 B1 | 4/2005 | Knapp | |
| 6,990,905 B1 | 1/2006 | Manole et al. | |
| 7,004,813 B2 | 2/2006 | Zuloff | |
| 7,040,308 B2 | 5/2006 | Ciesiun | |
| 7,055,438 B1 | 6/2006 | Manole et al. | |
| 7,093,541 B2 | 8/2006 | Herbelin | |
| 7,426,868 B2 | 9/2008 | Fessele et al. | |
| 7,426,888 B2 | 9/2008 | Hunt | |
| 7,487,728 B2 | 2/2009 | Cranor | |
| 7,735,423 B1 | 6/2010 | Gold | |
| 7,870,851 B2 | 1/2011 | Mahany | |
| 8,074,555 B1 | 12/2011 | Sullivan et al. | |
| 8,168,804 B2 | 5/2012 | Pham et al. | |
| 8,378,277 B2 | 2/2013 | Sandomirsky et al. | |
| 8,402,892 B1 | 3/2013 | Scheid et al. | |
| 8,402,896 B1 | 3/2013 | Hollerman et al. | |
| 8,402,897 B2 | 3/2013 | Hollerman et al. | |
| 8,499,693 B2 | 8/2013 | Sullivan | |
| 8,567,964 B2 | 10/2013 | Mullen | |
| 8,794,119 B2 | 8/2014 | Shulman et al. | |
| 9,347,753 B1 | 5/2016 | Horch et al. | |
| 2004/0055497 A1 | 3/2004 | Herbelin | |
| 2004/0099173 A1 | 5/2004 | Rector et al. | |
| 2004/0110196 A1 | 6/2004 | Kadushin et al. | |
| 2004/0220001 A1 | 11/2004 | Oister et al. | |
| 2004/0245504 A1 | 12/2004 | Sage et al. | |
| 2005/0034627 A1 | 2/2005 | Manole et al. | |
| 2005/0056184 A1 | 3/2005 | Dunnam et al. | |
| 2005/0217527 A1 | 10/2005 | Ciesiun | |
| 2006/0048668 A1 | 3/2006 | Williams | |
| 2006/0124022 A1 | 6/2006 | Eberhart et al. | |
| 2006/0231179 A1 | 10/2006 | Guindon et al. | |
| 2007/0243504 A1 | 10/2007 | Bjorkman et al. | |
| 2009/0225299 A1 | 9/2009 | Crawford et al. | |
| 2010/0083862 A1 | 4/2010 | Ciesiun et al. | |
| 2011/0016760 A1 | 1/2011 | Longo | |
| 2011/0226962 A1 | 9/2011 | Boudreau et al. | |
| 2011/0297742 A1 | 12/2011 | Sullivan et al. | |
| 2012/0024279 A1 | 2/2012 | Carlson et al. | |
| 2012/0121128 A1 | 5/2012 | Lawrence et al. | |
| 2016/0209188 A1 | 7/2016 | Nugent, Jr. | |
| 2017/0102218 A1 | 4/2017 | Sullivan | |
| 2018/0135953 A1* | 5/2018 | Bruno | F42B 33/02 |

FOREIGN PATENT DOCUMENTS

| | | | |
|---|---|---|---|
| FR | 2444253 A3 | 7/1980 | |
| FR | 2514884 A1 | 10/1981 | |
| GB | 1317031 A | 5/1973 | |
| GB | 2107835 A | 10/1982 | |
| WO | 198700263 | 1/1987 | |
| WO | WO-9720185 A1 * | 6/1997 | F42B 12/34 |
| WO | 03005074 A1 | 1/2003 | |
| WO | 2008107215 A1 | 9/2008 | |
| WO | 2014186049 A2 | 11/2014 | |

OTHER PUBLICATIONS

Written Opinion issued in PCT/US2021/070348, mailed Jul. 27, 2021.

International Search Report issued in PCT/US2014/031314, mailed Nov. 18, 2014.

Extended International Search Report issued in European Patent Application No. EP 14797122.0.

Kent, Enabling Methods for One Way Luminescent 'Cold' Tracers, NDIA White Paper Series, Joint Small Arms Conference 2014.

International Search Report issued in PCT/US2016/045737, mailed Oct. 28, 2016.

International Search Report issued in PCT/US2017/067238, mailed Aug. 28, 2018.

* cited by examiner

Range - 1500 Meters
X and Y with Man Sized Silhouette

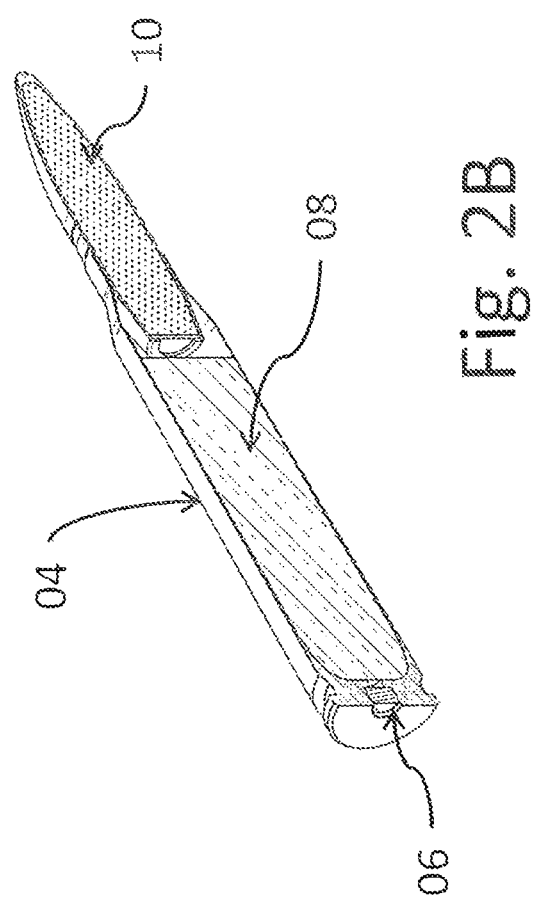

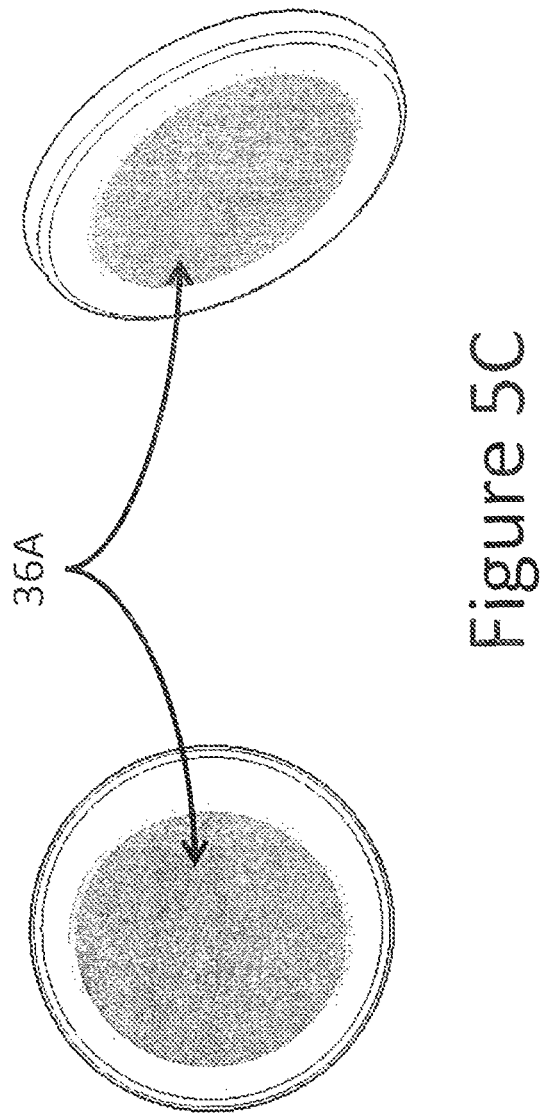

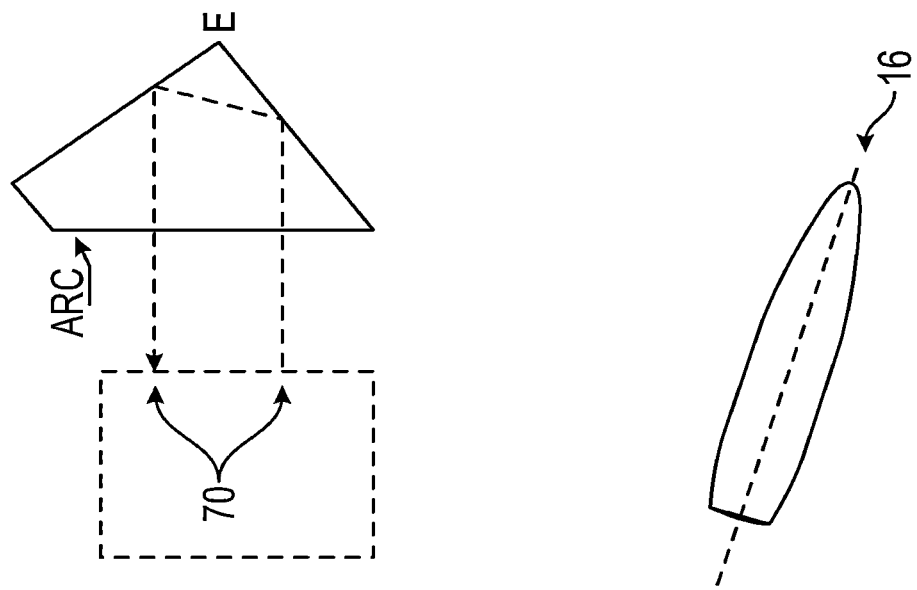
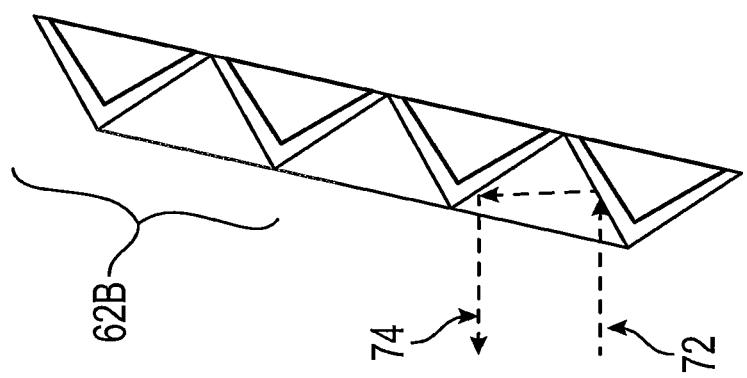
FIG. 8F

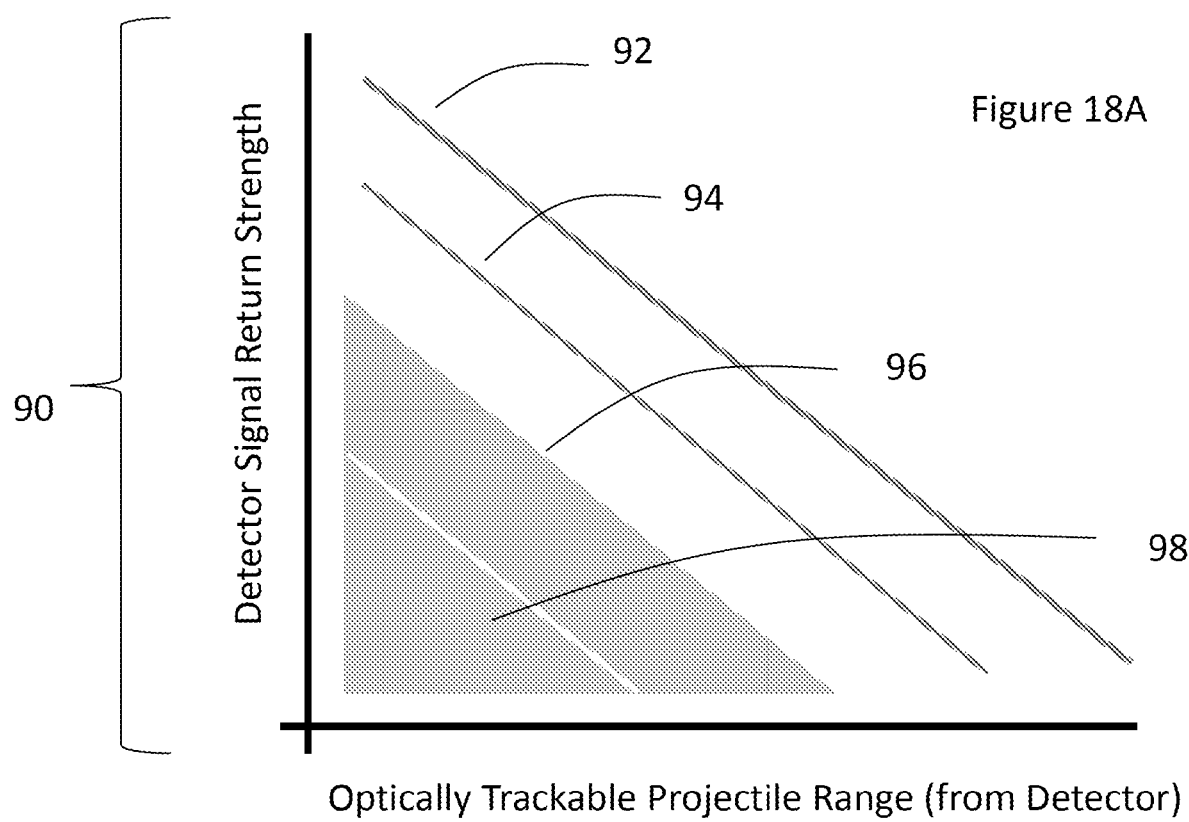

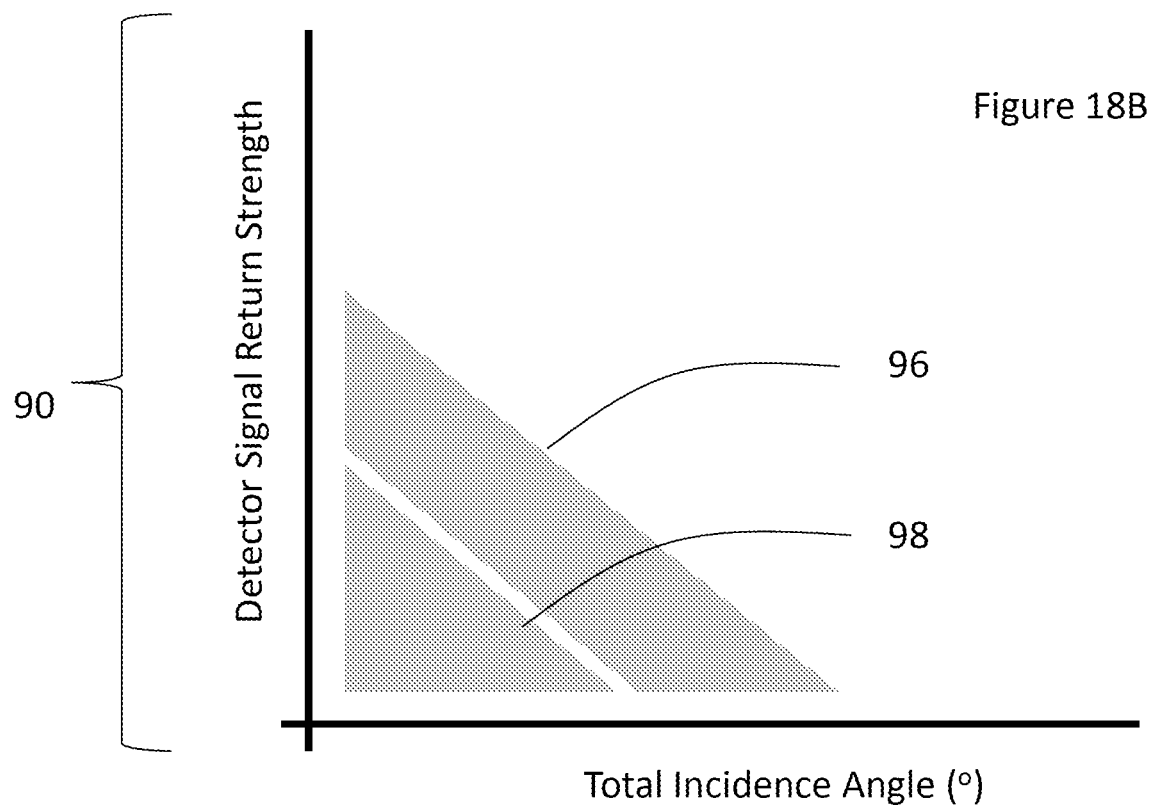

OPTICALLY TRACKED PROJECTILE

CROSS REFERENCE TO RELATED APPLICATIONS

This application is a continuation-in-part and claims priority from U.S. non-provisional application Ser. No. 17/069,836 filed Oct. 13, 2020, which is a continuation-in-part and claims priority from U.S. non-provisional patent application Ser. No. 15/386,555 (now abandoned) filed Dec. 21, 2016, which is a continuation-in-part and claims priority from U.S. Pat. No. 15,228,217 filed Aug. 4, 2016 (now abandoned), which in turn is a continuation of U.S. patent application Ser. No. 14/220,404 filed Mar. 20, 2014 (now abandoned). The U.S. patent application Ser. No. 15/228,217 claimed priority from U.S. Provisional application No. 62/201,255 filed Aug. 5, 2015, and the U.S. patent application Ser. No. 14/220,404 claimed priority from U.S. provisional application No. 61/803,826. The U.S. non-provisional application Ser. Nos. 15/386,555, 15/228,217, and 14/220,404 and U.S. provisional application Nos. 62/201,255 and 61/803,826 are incorporated herein by reference in their entireties.

FIELD OF THE INVENTION

The disclosed concept relates generally to an ammunition projectile that allows for position observation and tracking when illuminated. The projectile may function with a fire control device that tracks the path of a projectile while in ballistic flight toward a given target.

BACKGROUND OF THE INVENTION

Tracer technology was developed by the British defense research establishment in the midst of the First World War. The technology continues to be used 100 years later. In machine guns, belts of ammunition are mixed-ball and tracer combinations. Unfortunately, the 100 year old technology has a number of practical drawbacks: (1) The tracer ammunition's ballistics differ from the trajectory of ball ammunition, (2) handling and inclusion of pyrotechnic tracers in ammunition significantly increases the cost of ammunition, (3) tracers cause unwanted range fires in training, (4) the glow emitted by tracers backlights friendly forces, vehicles, equipment and aircraft and (5) tracers are not optimized for automatic tracking technology.

Retro-reflection: Use of retro-reflectors is ubiquitous in road signs where the technology was invented in the United Kingdom and introduced in the late 1930s. Retro-reflectors reflect light to the emission source with a minimum of scattering. There are three principal types of retro-reflectors: corner cube reflectors, cat's eyes and phase conjugated mirrors. The coefficient of luminosity returned in the direction of the emission source is high. In addition to their use in road signs, retro-reflectors are used in safety reflectors, high visibility clothing and surveying. NASA has also used this technology in the space program. The Apollo 11, 14 and 15 missions placed retro-reflectors on the moon surface allowing for precise measurements of the moon/earth distance. Today companies like 3M and Orafal (formerly Reflexite) now dominate the manufacturing of retro-reflective sheathing and tape that are incorporated into a wide variety of products.

Retro-reflective Materials: Retro-reflective materials are generally categorized as either using glass beads or prismatic technology. The glass bead retro-reflective technology from the 1930's is the oldest; the prismatic technology was developed by Reflexite Americas in the 1960's. Glass bead tapes reflect light back less efficiently than do prismatics, so there are advantages to using prismatic solutions. Prismatic tape exhibits a tighter, more efficient return of light. A brighter, tighter beam extends much further than with glass bead retro-reflectors, giving prismatic tapes an operating range beyond the thousand foot mark. For marine, highway or traffic applications, where long distance conspicuity is important, prismatics are definitely preferred.

Glass bead retro-reflective materials are produced in tape form as both (1) engineering grade glass bead reflective tape, and (2) high intensity glass bead reflective tape Engineering Grade Glass Bead Reflective Tape: Engineering grade reflective tape starts with a carrier film that is metalized on the top. Glass beads are applied to this layer so that about fifty percent (50%) of the bead is embedded in the metalized layer. This gives the beads their reflective properties. Then a layer of either acrylic or polyester is applied over the top. This layer can either be clear to make white reflective tape or it can be colored to create the different color reflective tapes. A layer of adhesive is then applied to the bottom of the tape and a release liner is applied to that layer. The tape is rolled up, slit to width and then sold. It shout be noted that an acrylic layered film will not stretch and a polyester layered film will. Because of the heat used in the manufacturing process, engineering grade films end up being a single layer so they do not delaminate.

High Intensity Glass Bead Reflective Tape: High intensity reflective tape is made in layers. The first layer has a grid built into the tape, normally using a honeycomb type pattern. This pattern holds the glass beads so that they are in separate cells. The glass beads are bonded to the bottom of this cell, then a layer of acrylic or polyester is applied over the top of the cell leaving a small air space above the beads. A layer of adhesive and a release liner are then applied to the bottom of the tape.

While the reflective tape industry was originally founded using glass bead technology, micro-prismatic solutions have come of age since the 1970's.

Non-metalized Micro-prismatic Reflective Tape: The first step in creating non-metalized reflective films utilizes a prism array produced from acrylic or another clear resin. This becomes the top layer of the film. Non-metalized films are more vivid but not necessarily more reflective.

Retro-reflector Production and Prismatic Tape: Clearly, the easiest and simplest way to produce retro-reflective material involves glass beads that are incorporated into a film. This glass bead technology was pioneered in the 1930s and has undergone numerous improvements over the decades. Prismatic reflective tapes were invented by Reflexite Americas in the 1960s. Micro-reflective materials were developed in the early 1990's. Following the U.S. Pat. No. 5,171,624, the Reflexite Corporation incorporated micro-reflective materials into polymers that have been widely adopted into sheeting material.

Today, retro-reflective materials, generally produced as tape or sheeting, are ubiquitous in our lives. However, the glass bead and polymer based micro-prismatics do not lend themselves to direct integration into projectiles that must operate in a high temperature environment.

Application or Retro-reflection Technology to Ammunition: The U.S. Pat. No. 3,757,623 to Bellinger disclosed the use of retro-reflectors in ammunition. Bellinger proposed incorporating glass bead retro-reflectors or corner cube retro-reflectors, also known as "cat's eyes", on the rear of a munition projectile and using a narrow beam laser to illuminate the target area to observe the projectile when it enters the beam. The gunner is then able to adjust the gun's bearings so that the projectile impacts the target.

The U.S. Pat. No. 4,015,258 to Smith disclosed incorporating the basic elements of Bellinger's system into an aircraft platform and importantly described the use of a diverging or diffused laser beam. Again, like Bellinger, the target is illuminated coinciding with the travel time associated with a projectile reaching a target.

Bellinger and Smith disclose the use of typical retro-reflective solutions by attaching glass beads to, or embossing a retro-reflective pattern on, the trailing edge of a projectile. Bellinger's and Smith's patents used the technology of their day, incorporating retro-reflective structure or cat's eyes to the trailing edge of a bullet.

The published U.S. Patent Application 2016/0209188 to Nugent does not build on Bellinger's or Smith's work. Nugent's publication does, however, propose a means for protecting polymer and glass bead retro-reflective material that could be added to the surface of projectiles. This technique could allow the ammunition reloading community to use commercially available retro-reflective tapes and sheeting coupled with a protective wax to allow for adaption of polymer based retro-reflective technology. Further, Nugent purports to disclose a method to reveal a projectile's trajectory, the embodiments in accordance with the instant application discloses a useful design and projectile configuration and method of manufacture where optical facets are oriented and aligned on trailing surface of a trackable projectile, the projectile configured to optimize the intensity of light returned to a detector in the vicinity of a weapon and with an accompanying detector facilitating both the precision projectile tracking and bore-sighting of weapons, firing at nominal ranges that are reflective of typical target engagement distances.

Laser Induced Fluorescence: The body of information regarding laser induced fluorescence is growing as laboratories throughout the world explore potential applications for this technology. The present application foresees the use of tracer fluorescing material on a projectile or "bullet" which is fired from a weapon. When radiated after barrel exit by a laser co-located with the weapon, it allows an observer or electronic detector to track the projectile. This technology eliminates burning pyrotechnic tracer materials, allowing the trajectory of the projectile to match the trajectory of ball ammunition.

In the last few years, NASA and engineering institutions have undertaken new testing of retro-reflectors mounted to small cube satellites, and the work has further defined the physics associated with the angle of light incidence on a retro-reflective surface and strength of reflected light returned to a sensor. Measurement of the returned light drops exponentially in many cases, with detectors unable to detect return light when the θ angle of retroreflectors exceeds certain limits.

Factors effecting signal return strength from retro-reflectors incorporated into projectiles have been narrowed and identified, and thus, the following factors can be identified as directly influencing the observability of projectiles given that the projectile aft observable area is severely limited by the projectile's caliber and further, retro-reflected light encounters Far Field Diffraction Pattern (FFDP) induced on return light, as each retro-reflector acts as separate aperture. These two limiting factors—area, FFDP—are restricted parameters. Thus, a projectile designer can influence three factors in regard to optimizing a projectile design having good reflectance signal specifically optimizing the (1) wavelength of observability, (2) repeatability regarding light fall and reflectance on the retro-reflector and (3) the reflectivity of the retroreflector which is influenced by (a) the selected metal surface, (b) metal surface finish, (c) coating applied to the surface, (4) recess depth of the retroreflective disk.

Test data clearly shows that increasing light incidence angles directly reduce the strength of return light from retroreflectors. Thus, in building on Nugent's and Bellinger's earlier work, it remains desirable that a projectile incorporate optimized retro-reflective light's return characteristics. Further, since improperly design projectiles exhibit extenuating yaw and pitch when in external ballistic the light returned to detector is reduced, where retroreflectors in the base of the projectile are misaligned. A quality, functioning observable projectile will exhibit stable flight and will be configured with a retroreflector with tight perpendicular geometric relationship to a projectile's axis of rotation.

Additionally, it remains desirable that a tracer projectile's have a matching ballistic solution for ball ammunition. Further, it is desirable that the terminal effect of ball and tracer ammunition is comparable to other full metal jacket projectiles. Accordingly, it is desirable that a special tracer minimize the space claim inside a projectile, as is set forth with a special tracer disk disclosed in this application.

In regard to angle of light incidence, one must recognize that the changing orientation of a projectile in flight will reveal perturbations in yaw and pitch nutation, typically being 1-4°. Additionally the angle of attack and aft orientation of the small caliber projectile will also change by an additional 1-4° as a projectile follows a regular trajectory towards a target. Thus, the orientation of the aft facing retroreflector with reference to the projectile's axis of spin produces a significant influence on the strength of retro-reflected light returned to a detector. A misaligned aft retroreflector will exhibit a quick drop off in light return where the incidence angle of light vis a vis the retroreflective surface is misaligned. Conversely, a well aligned retroreflector will produce a strong light return signal. Accordingly, the necessary precise orientation of the special disk set in the base of the projectile directly effects the return strength (luminosity) of light returning from a special tracer incorporated into a projectile. An imprecise geometric positioning and alignment of the tracer disk in fabrication of a projectile, relative to the axis of spin, will reduce the signal return observed at a detector. The incorrect positioning of a crimped tracer may be easily imparted when using roll crimping technique. Further, imbalanced projectiles, will exhibit increase pitch and yaw, making it difficult for a detector to locate, observe and track a projectile in flight. Hence, the artful integration of a disk, fabricated using disciplined manufacturing process, along with fabrication of a well-balanced projectile will exhibit stable flight characteristics, with minimal yaw and pitch, the stable flight characteristics of the projectile being a $2^{nd}$ important design element requisite to produce a novel and useful trackable projectile.

In regard to configuring retro-reflectors in projectiles, we should note that it is generally desired to optimize in the projectile volume, the space available for a dense ductile core, or ductile core with a penetrator where, on impact, the bullet will expand into a cavity. Additionally, it is desirable to minimize the space and volume used by the tracer element to so a projectile can have a beneficial ball-tracer ballistic match. Hence, a thin metal disk—incorporating an aft facing retroreflective morphology—configured properly in the aft end of a jacketed projectile, provides an optimum trackable bullet design allowing a skilled designer to produce can ballistic matching ball and tracer projectiles.

SUMMARY OF THE INVENTION

These needs, and others, are met by the present invention providing for an observable and trackable projectile that, when coupled to an emitter, allows for the observation and recording of a projectile in flight. Further, when coupled to a fire control system, the recording of actual flight drop, drift and measurement of the time, space and location of a projectile in flight allows for improved precision and accuracy of weapon systems.

In both embodiments of the invention a bullet's metal jacket is used to form a closure with a metal disk providing a full metal jacket surrounding the bullet's core or cores. One embodiment identifies a disk with micro-prismatic retro-reflectors that are thus incorporated into the trailing edge of the projectile so that reflected light can be viewed and the projectile's position tracked by electro-optical devices in the vicinity of the weapon firing said projectile.

Alternatively, a disk with a phosphor material, on the trailing edge of the projectile, is responsive and re-emits radiation when illuminated by an external electro-optical device. The radiated light emission from the laser emitter may be in the UV, visual, NIR or MWIR spectrum. The light reflected from the retro-reflective material may be in the UV, visual, NIR or MWIR spectrum.

Simple Deployment and Use: The invention thus provides for a projectile with a special tracer incorporated and crimped into the projectile and closing a metal jacket around the projectile that, when illuminated at the trailing edge, allows electro-optical devices to locate, observe and track a projectile in flight. Full Metal Jacket (FMJ) ammunition is generally preferred for use by military forces for a number of important reasons. Accordingly, this application identifies a useful design to crimp thin metal disks, with certain features, to the trailing edge of the projectile. This design provides distinct benefits over prior art:

(1) Optimized, micro-structured prismatics provide highly efficient reflectance over the projectile's trajectory as the projectile changes attitude and the geometric relationship to the observer changes.

(2) A micro-structure metal retro-reflector incorporated into a disk, allows for manufacture by a specialized forming processor at a manufacturer's facility with equipment to produce microstructures.

(3) A micro-structure metal, especially one using a chrome plate or polished nickel, can survive in the harsh environment of hot propulsion gases.

(4) A micro-structure of ridges forming a prismatic structure is thin, less than a millimeter, which reduces the cost and complexity of stamping prismatic structures with specialized dyes.

(5) Thin disk contraction allows ammunition producers to vary the materials and components incorporated into a projectile's core.

(6) FMJ encapsulating the entire projectile can provide certain optimized terminal effects.

The small arms propellant industry is continuously modernizing and optimizing propellant mixtures. This proposed solution for special retro-reflective tracers includes preferred use of robust metal combinations such as aluminum, nickel and steel-chrome combinations. The surface and reflectance of these metal combinations are used in gun barrels and are known to remain resilient even after exposure to the high heat propellant burning environment. Additionally, for the purpose of designing and building projectiles with special non energetic tracers, it is understandably useful to use clean burning propellants.

As an alternative to using special tracers formed from metal disks with micro-prismatic features, tracers with metal disks incorporating a fluorescent material can be used that re-emit light when exposed to a narrow band laser emission source. According to the invention, technology being developed worldwide for applications of laser-induced florescence is used to allow electro-optical devices to track projectiles. These designs provide distinct benefits over prior art and also provide an advantageous method for manufacture and assembly of projectiles.

Further, the special disk configuration does not create trajectory differing that of ball ammunition, as the center of gravity and moments are not changed. A further object of the present invention is to set forth a method of fabricating volume quantities of observable projectiles, the specification's disclosure of the production technique allows for volume manufacture of observable projectiles, minimizing mass imbalances (projectile to projectile), while precisely orienting the special tracer disk in the projectile's aft end, the fabrication process producing projectiles with good reflectance and observability.

The metal used to fabricate the special tracer disk corresponds to a selected emitter wavelength illuminating the projectile's trailing edge, providing good reflectance and allowing for observation of the projectile in flight.

The disclosed fabrication technique for the projectile requires fixturing and fabrication, so that the ductile core is formed and inserted into the metal jacket, and then in a subsequent step, the special disk is inserted against the ductile core, and the symmetrical crimping of the fabrication process, dyes and tools crimp a projectile's metal jacket, at the projectile aft end, so the crimp secures the disk and the disk's orientation to the projectile's axis of spin is precisely maintained.

This design provides distinct benefits over prior art:

(1) Providing use of prismatic surface formed into a reflective surface, formed on a metal disk, the thin disk minimizing the protrusion depth of a tracer into the bullet cavity. When incorporated and properly positioned in a projectile, the metal's reflectance allowing for observation of projectile's x,y position from the vicinity of the gunner.

(2) Selected metal surface, incorporated into the tracer disk, provides for good reflectance in a specified wavelength allowing for observability in a selected spectrum.

(3) A retro-reflective surface embossed, etched, rolled or otherwise formed on a metal sheet or metal tape, cut into a thin circular disk, forming a special tracer disk that is readily incorporated into a jacketed projectile. The design allows for use of cost effective forming of a retro-reflective morphology on a thin metal plate with a subsequently cut the tape or plate into a circular tracer.

(4) A propellant selected to minimize metal corrosion (in storage) and survive in the harsh environment of hot propulsion gases.

(5) The thin tracer disk optimizing the cavity volume to house a ductile core or a penetrator inset to a ductile core.

(6) The thin disk aft configuration, coupled with a metal jacket thus maximizing the usable volume in the cavity, the usable volume matching the volume available to ball ammunition, thus allowing designers to readily design ball and tracer projectiles having excellent matching characteristics, matching both external and terminal ballistics of ball ammunition.

(7) Considering the shooting community's desire to track a projectile at a nominal engagement range with a degree of precision, there is a unique value in aligning of optical features on the projectile and orienting the aperture of retro-reflectors, housed in a projectile, in order to, e.g., without limitation, provide for optimized reflectance at a distance significantly beyond the weapon's muzzle.

The example embodiments of the present disclosures provides a technique to fabricate a projectile formed with full metal jacket, encapsulating the entire projectile and allowing for incorporation of a special tracer, in the form of a disk, the disk precisely positioned to be perpendicular to the axis of rotation, being located in the aft end of the projectile. With reference to nutational movement and procession exhibited by projectiles in flight, one should recognize that projectiles often exhibit significant nutational movement when exiting the barrel; however, most well-balanced projectiles transition to stable flight, with reduced nutational movement, when projectile's reach a nominal range, where shooters typically bore sight their weapon.

The fabrication process includes, e.g., without limitation, a configuration of a retroreflective metal disk, that is incorporated into a projectile, oriented so that the axes of numerous focal elements, arrayed on the reflective metal disk, are aligned to be parallel to the projectile's axis-of-rotation. The configuration optimally aligns arrayed retroreflective elements in the disk, so that the focal apertures of the arrayed elements optimize directional, rearward reflectance from the aft end of the projectile, the configuration allowing for the tracking of a projectile in ballistic flight, when the projectile is illuminated by a light source in the vicinity of the weapon.

For a full understanding of the present invention, reference should now be made to the following detailed description of the preferred embodiments of the invention as illustrated in the accompanying drawings.

BRIEF DESCRIPTION OF THE DRAWINGS

A full understanding of the invention can be gained from the following description of the preferred embodiments when read in conjunction with the accompanying drawings in which:

FIG. 2B depicts a standard cartridge housing a projectile in cross-section;

FIG. 3A-3C illustrate how an external radiation emission source 18 mounted on the barrel of the weapon emitting light in a cone of illumination 20 intersects with the projectile 10, along the projectile's flight path;

FIG. 5C depicts a view of a special tracer that is in a wafer with a non-burning phosphorous composition optimized to re-emit laser light;

FIG. 8F shows that the angle of radiation incidence and reflectance are approximately parallel with a micro-prismatic surface;

FIG. 18A depicts the theoretical returning light intensity from a retro-reflector, the reduced strength associated with the reduced light associated with changing projectile orientation (pitch, yaw, and flight orientation), the threshold of a detector's sensitivity and the additional loss associated with a misaligned tracer;

FIG. 18B depicts adequate returning light from a special tracer, and an inadequate returning light where the return signal is below the detector's capability to sense light, the light return level determined by the incidence angle of light from a special tracer with a retroreflector.

DETAILED DESCRIPTION OF THE INVENTION

Figure 1A:
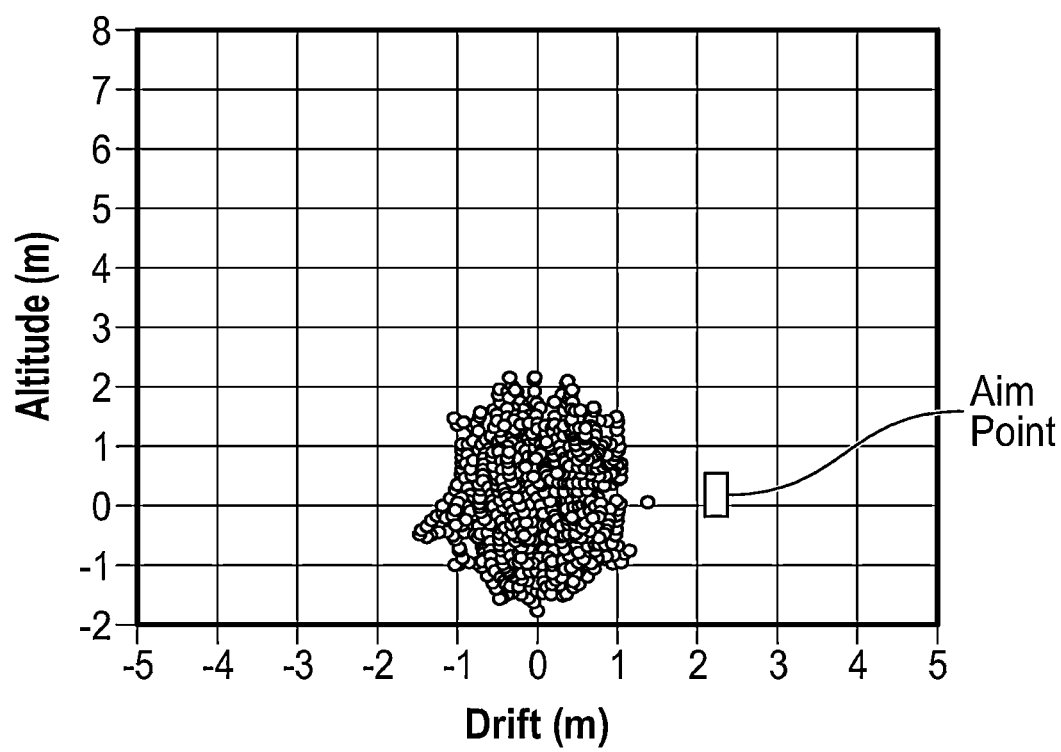
FIG. 1A shows the impact location and dispersion for ball ammunition.

The preferred embodiments of the present invention will now be described with reference to FIGS. 1A-18C of the drawings. Identical elements in various figures are designated with the same reference numerals.

Figure 1B:
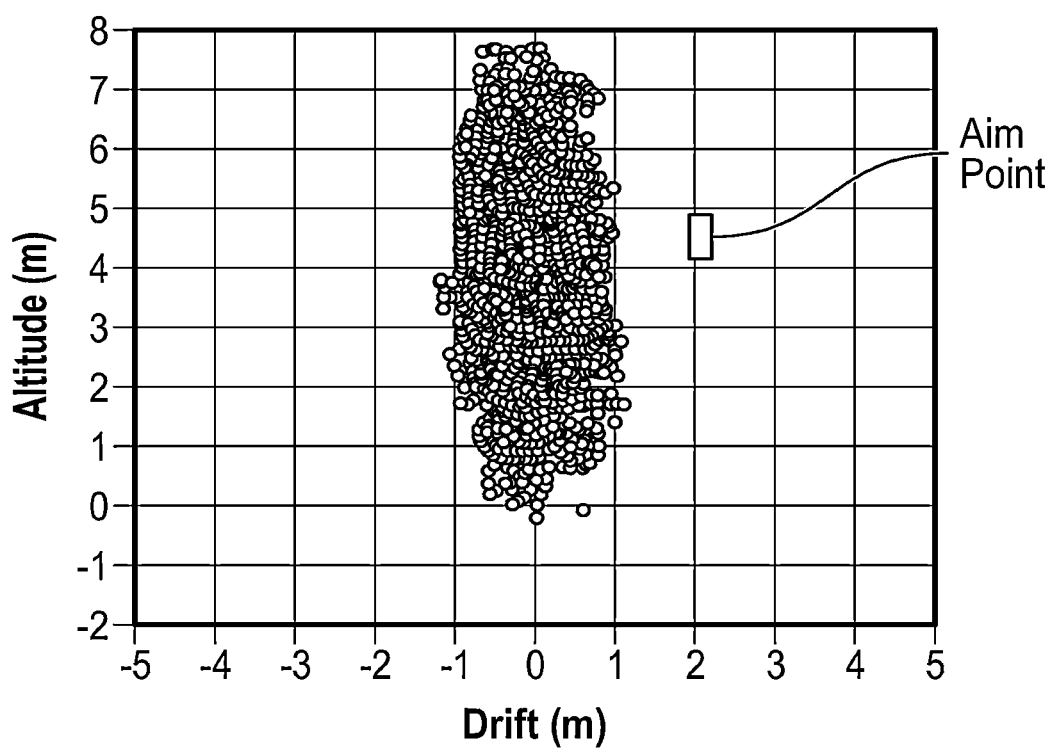
FIG. 1B depicts the impact locations and dispersion for normal energetic tracer projectiles.
Figure 1C:
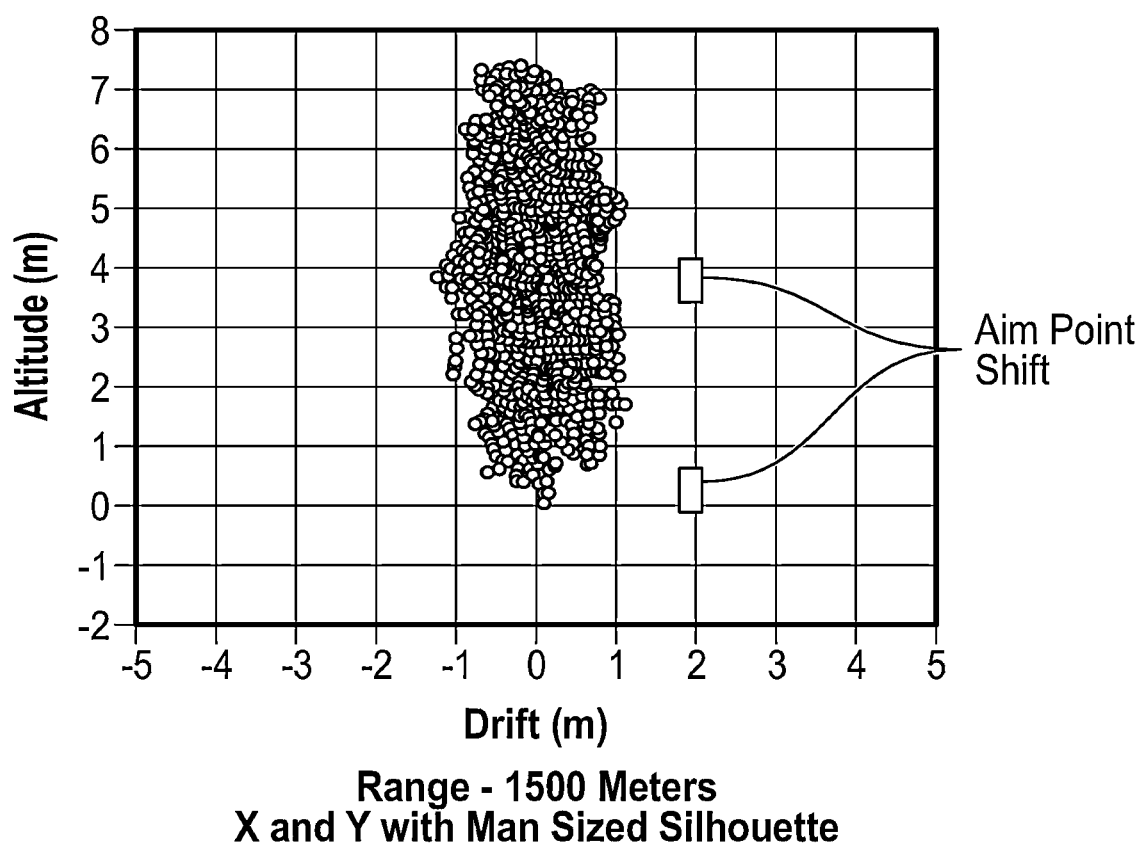
FIG. 1C depicts the impact locations and dispersion for ball/tracer mix.

FIGS. 1A-1C respectively show a Monte Carlo simulation of .308 sierra ball, tracer and ball/tracer bullet mix. Tracer bullets are normally fired with a ball to tracer mix. The mean impact point of bullets with and without burning tracers is significant when firing at longer ranges. The comparative tracer and ball comparisons highlight the ballistic drawbacks associated with use of energetic tracers.

According to the invention, the trackable projectile or "bullet" 10 is fabricated with a full metal jacket ("FMJ") 26 and incorporates a special tracer 28. The special tracer is a not energetic but is provided with special characteristics that are incorporated into a thin metal disk 28. During assembly of the projectile, the disk or wafer 28 is crimped 32 to the trailing edge of the projectile's metal jacket 26 and forming a sealed metal jacket surrounding the bullet's internal material or materials 26A. The special tracer in wafer form either reemits or reflects radiation rearward.

The special tracers 28 are crimped 32 thus forming a trailing edge of the projectile 30. When illuminated by laser light from the vicinity of a weapon, the special tracer 34 light is reflected, allowing for identification and locating of the projectile in flight. FIGS. 6A-6D depict a projectile with a special tracer. The special tracer 28 is crimped by the bullet's exterior metal jacket 26 to form a sealed metal jacket 26A surrounding the bullet's interior metal or components. The special tracer 28 is formed to include micro-prismatic structures 34 in the exterior metal surface as depicted in FIGS. 8A-8E. With reference to FIGS. 3A-3C and 8F viewed in combination, the diagrams illustrate how an external device with an emitter 18 and detector 24 illuminate the projectile's flight path 20, and light 72 reaching the disk 34 is reflected in the direction of the incident radiation by the micro-prismatic structures 68, returning the light 74 at an angle of incidence to the external optical detector 24 co-located with the emitter 18. The array of micro-prismatic structures 68 produce a conical reflectance return 74 allowing for the reflected light to be observed by a detector 24. The cone of reflected light produced by the projectile 10 provides for continued tracking of the projectile, through its ballistic flight path 22 and provides for continued tracking where the rotational variation of spin has induced projectile yaw, precession and nutation.

Figure 6A:
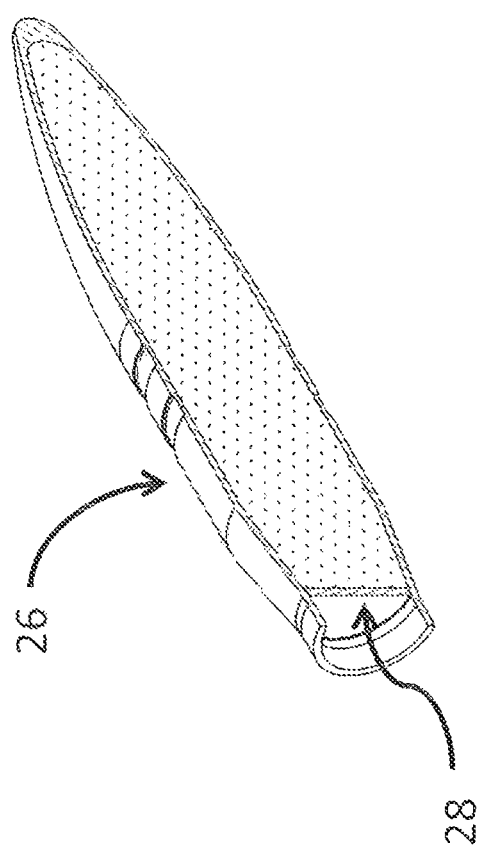
FIG. 6A is a cut-away view of a projectile with a full metal jacket ("FMJ") and a special tracer.
Figure 6B:
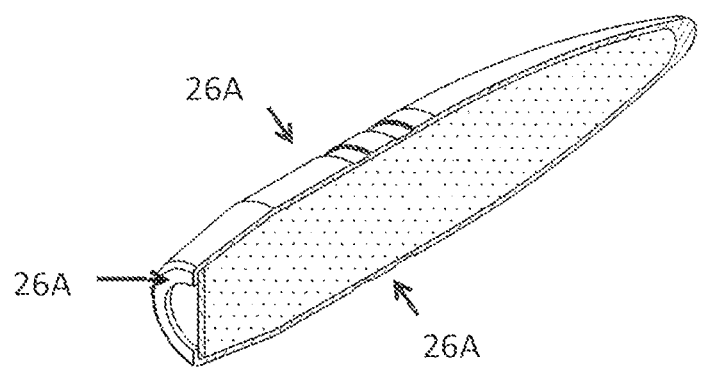
FIG. 6B depicts the special tracer, crimped to the projectile's trailing edge forming a fully encapsulating metal jacket.
Figure 6C:
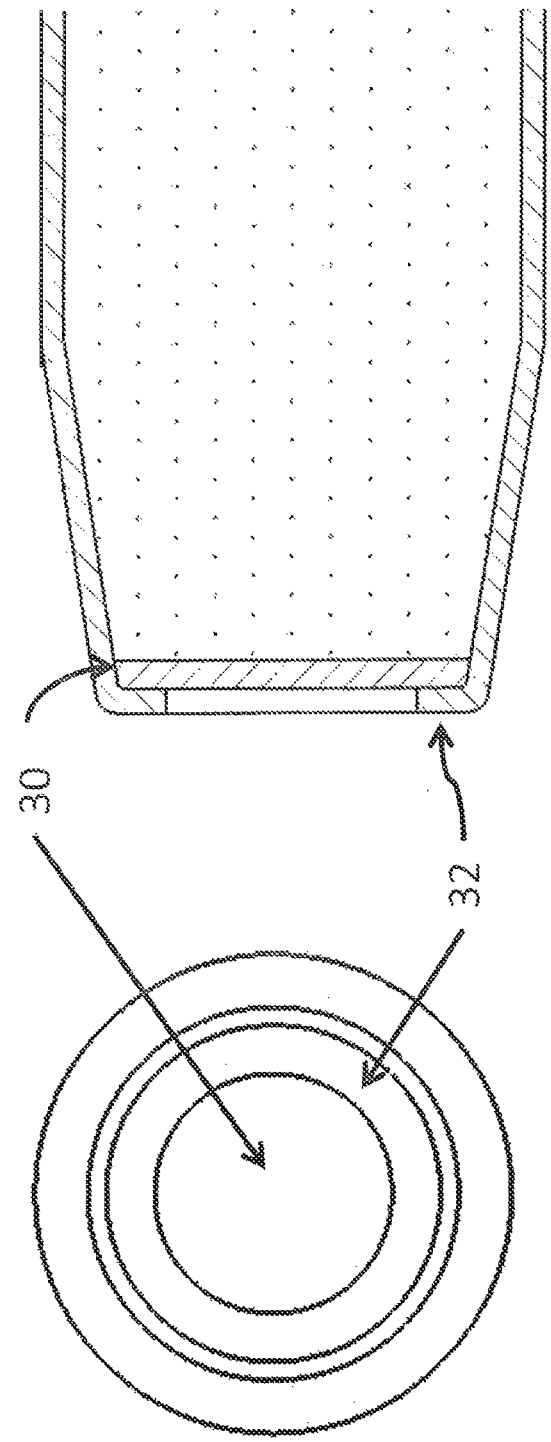
FIG. 6C is a detailed, cross-sectional view of the crimped wafer forming the trailing edge of the projectile providing the projectile with a sealed outer metal body.
Figure 6D:
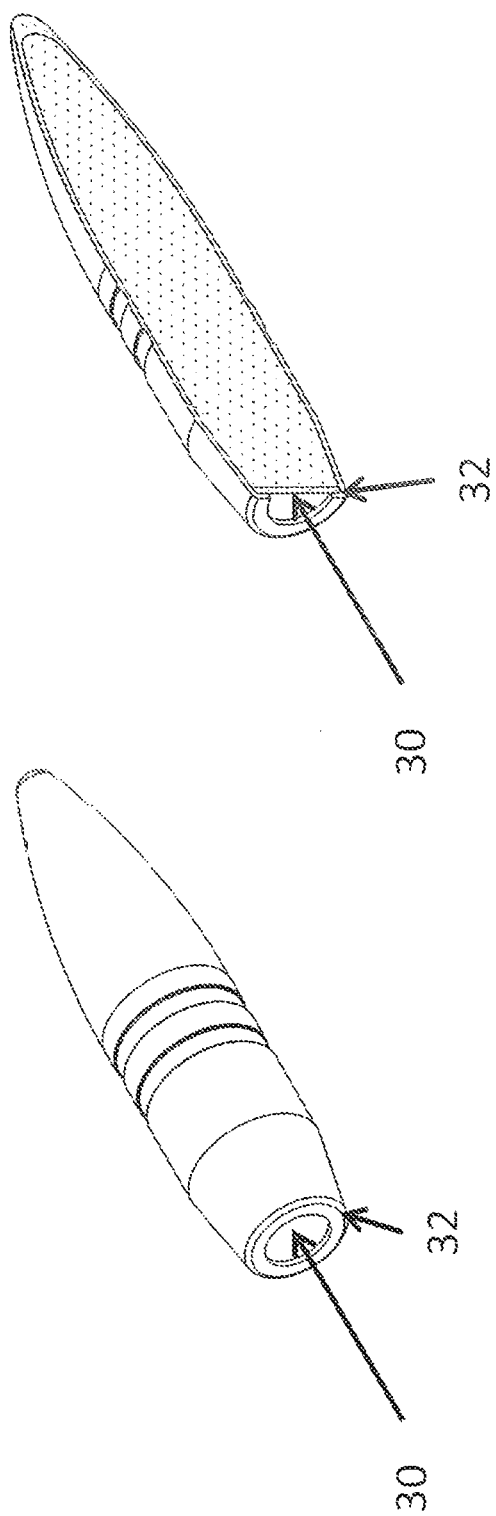
FIG. 6D are two perspective views (one in cross-section) of FMJ projectile and a special tracer crimped to the trailing edge.
Figure 7:
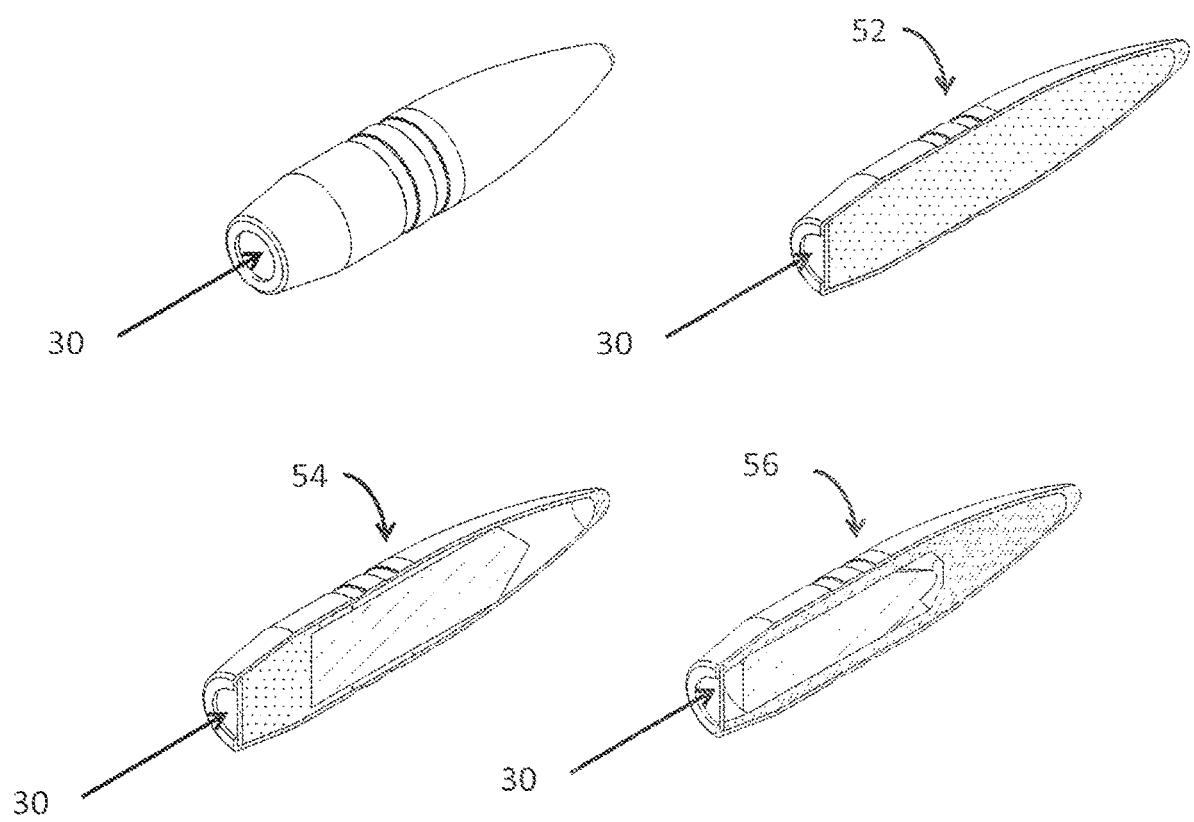
FIG. 7 depicts one external perspective view and three cross-sectional perspective views of an FMJ projectile, with differing internal configurations, all incorporating a special tracer in the trailing edge.
Figure 8A:
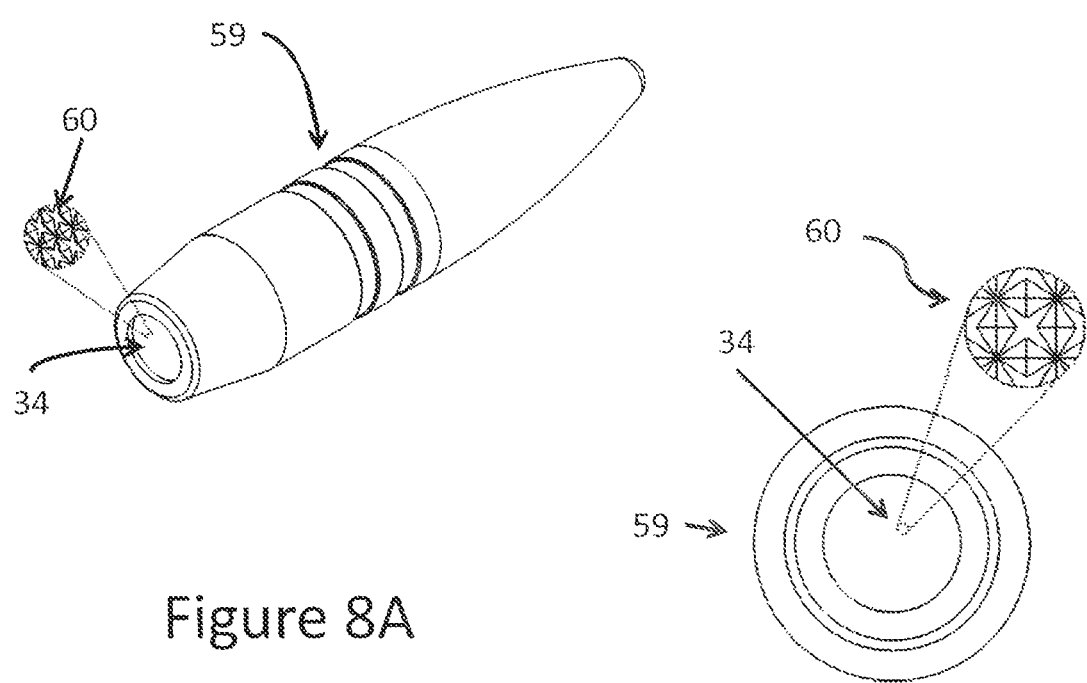
FIG. 8A depicts a perspective and rear view of a projectile with a special tracer and a magnified view of the wafer's outer surface, the outer surface including micro-prismatic facets and morphology formed into a metal.
Figure 8B:
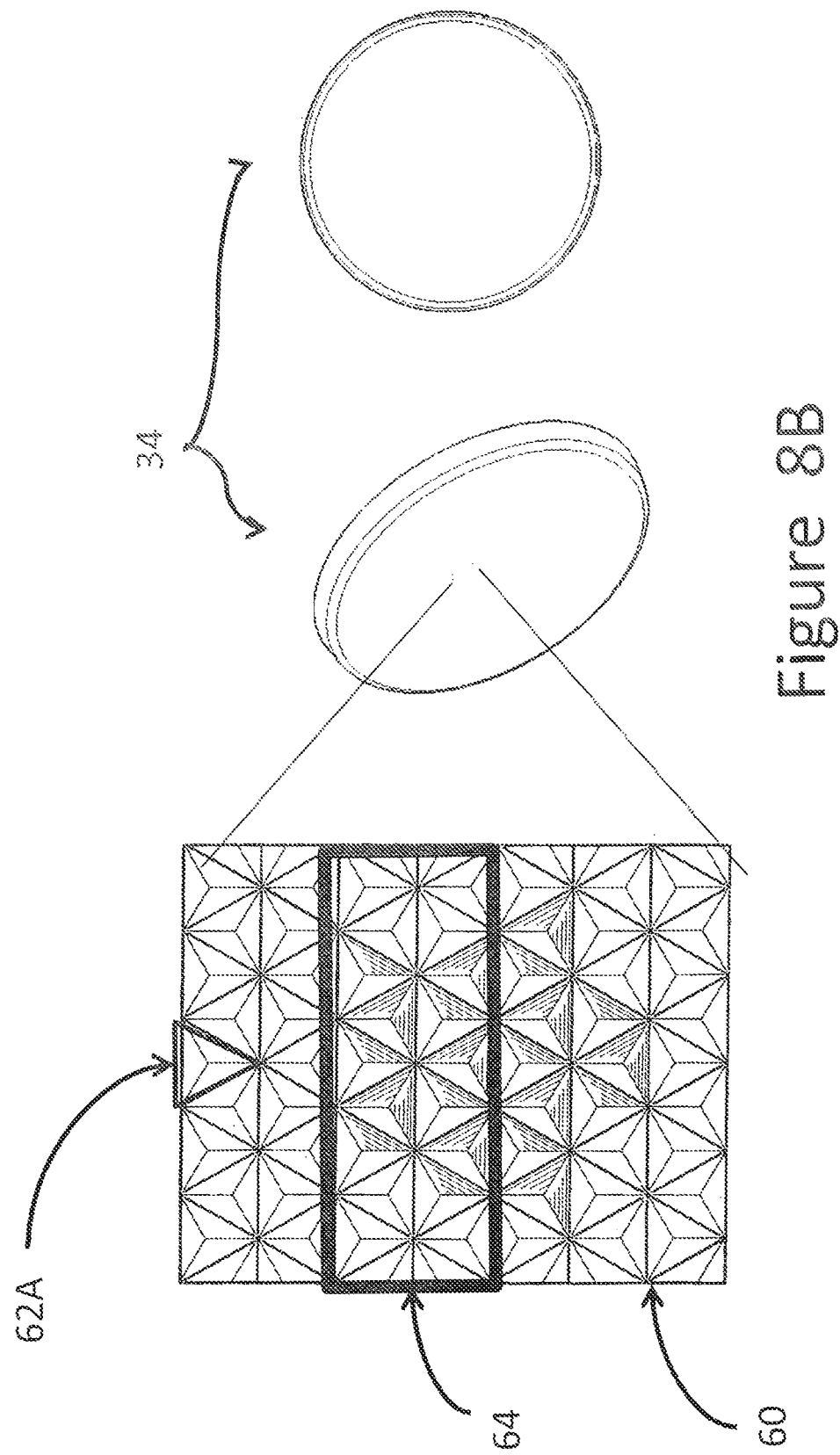
FIGS. 8B, 8C and 8D depict variant external morphology of a special retro-reflective tracer with magnified cut-away side views in 8C and 8D.
Figure 8C:
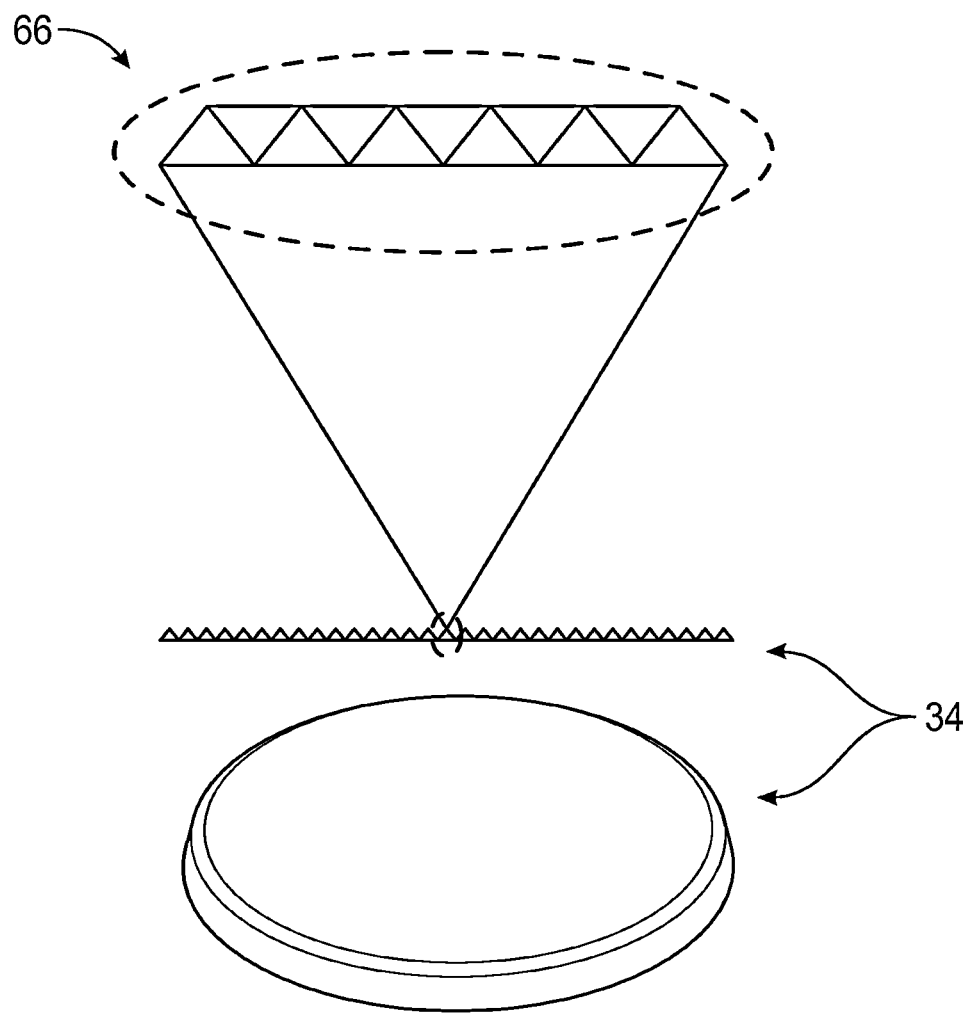
Figure 8D:
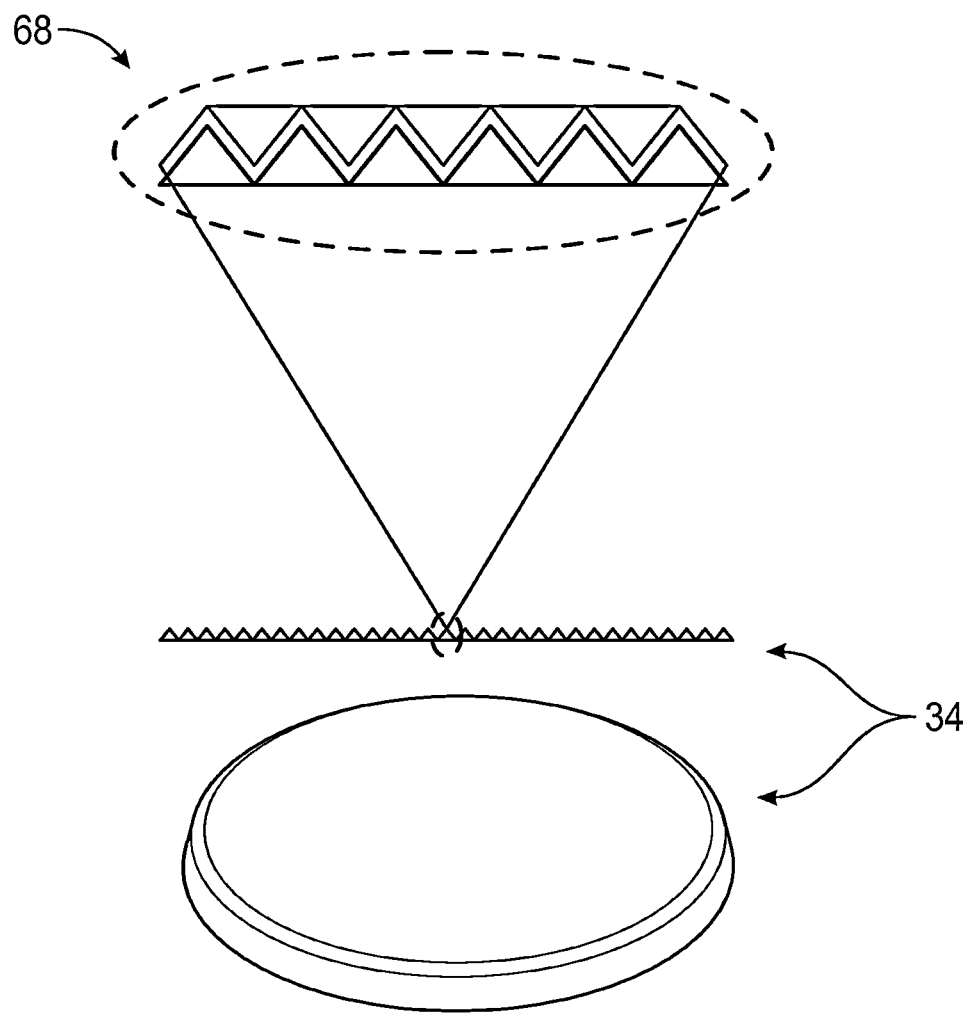
Figure 8E:
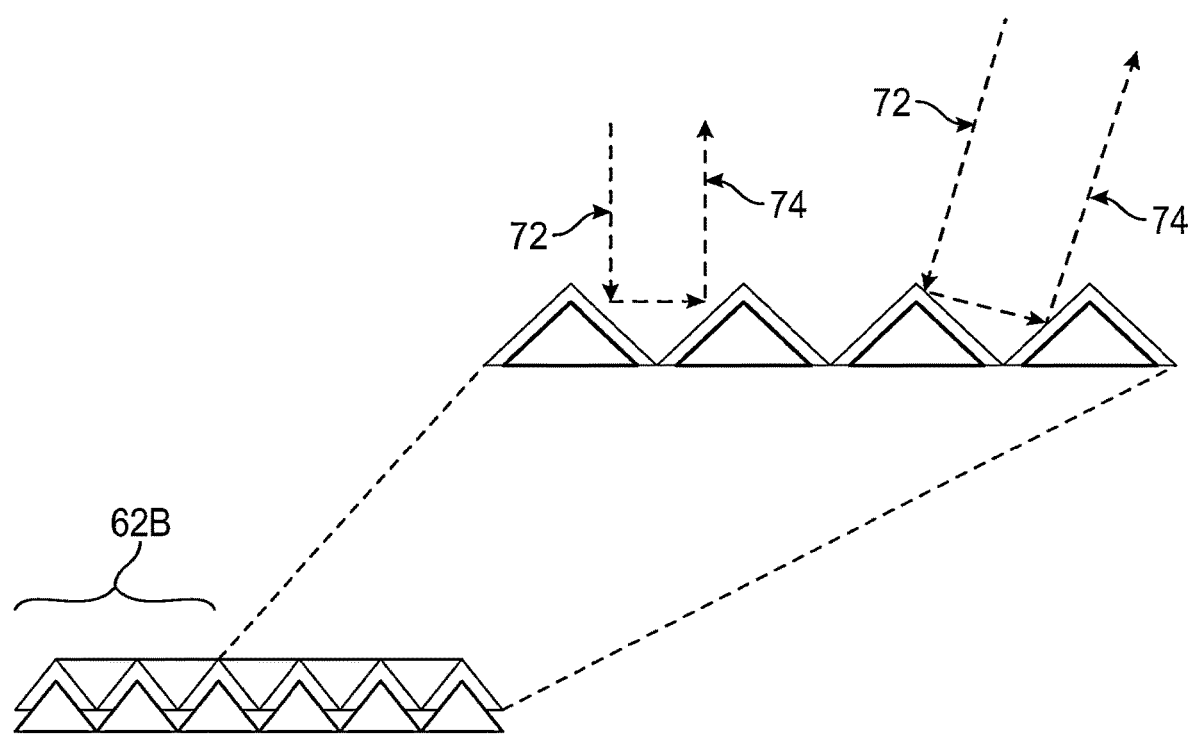
FIG. 8E_depicts side or cross-sectional views of the metal, magnified pyramid morphology with illustrated path of retro-reflected light.
Figure 8G:
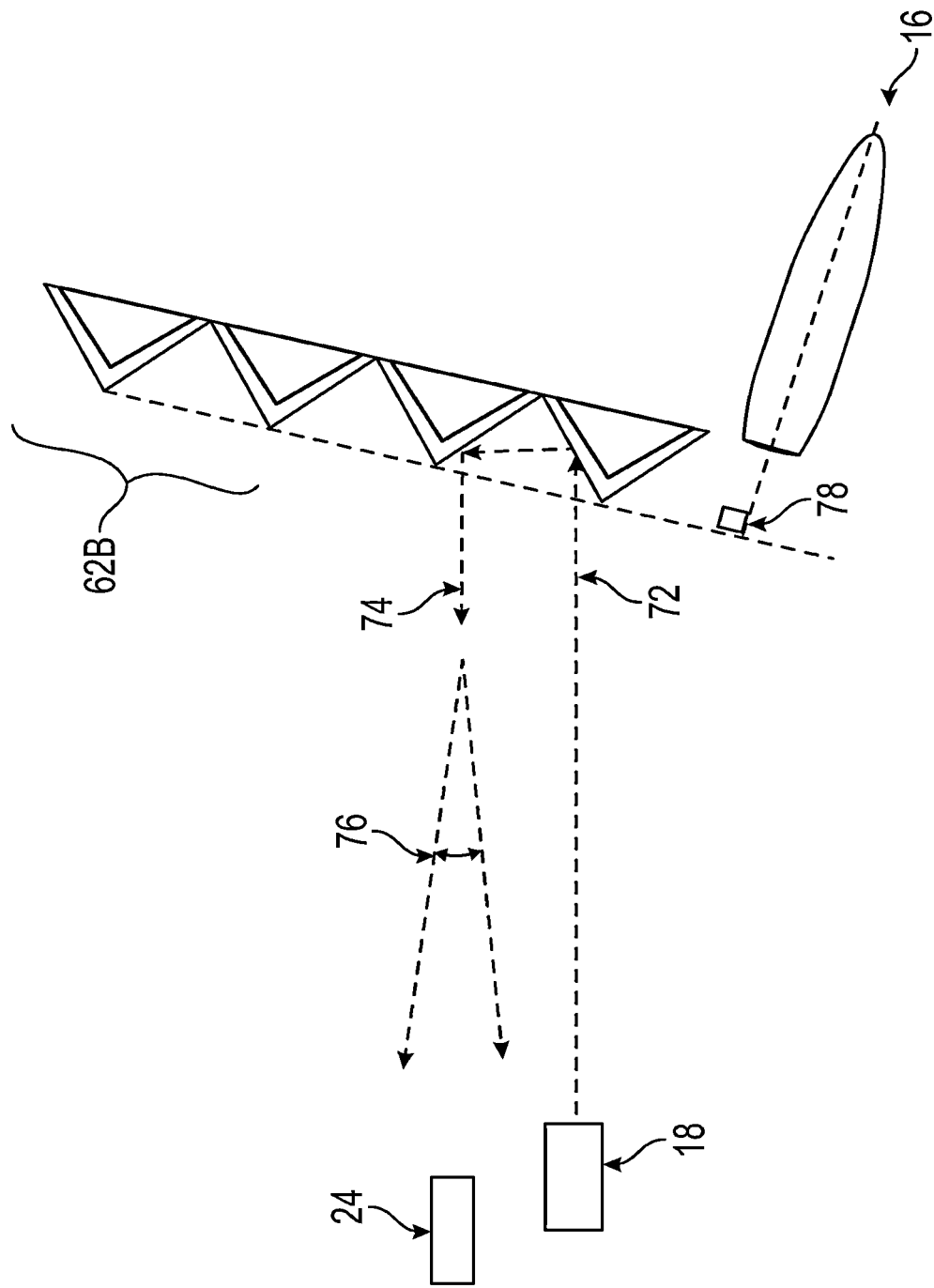
FIG. 8G depicts a projectile's attitude in fight and a corresponding micro-prismatic surface, in the special tracer, perpendicular to the flight attitude. The figure further depicts the angle of illumination incidence and reflectance that results from the micro-prismatic surface.
Figure 9:
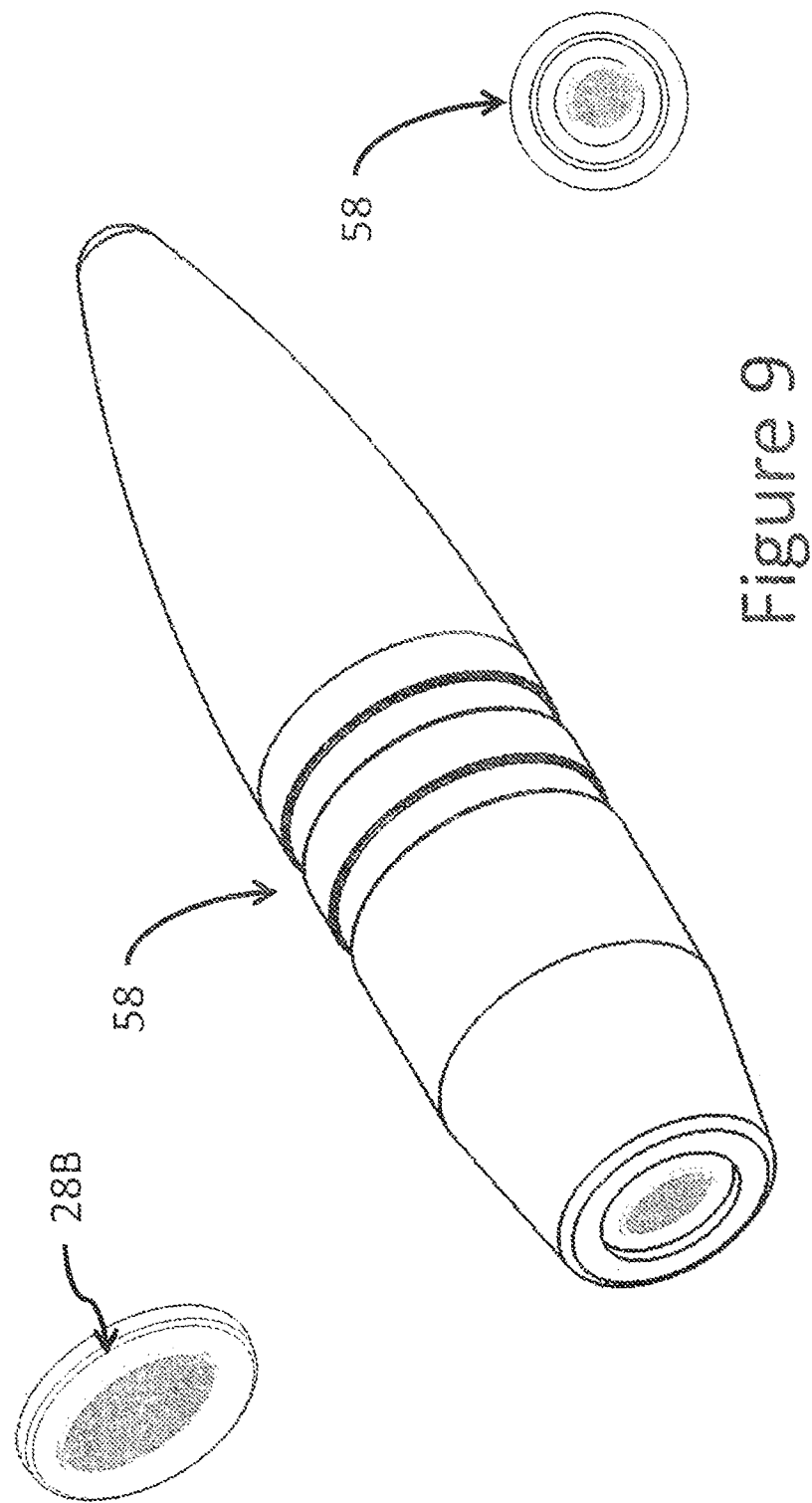
FIG. 9 depicts a projectile with a special tracer that includes a fluorescent dye in a medium adhering to the disk, the fluorescent dye being able to re-emit light after illumination by a laser pulse.
Figure 10:
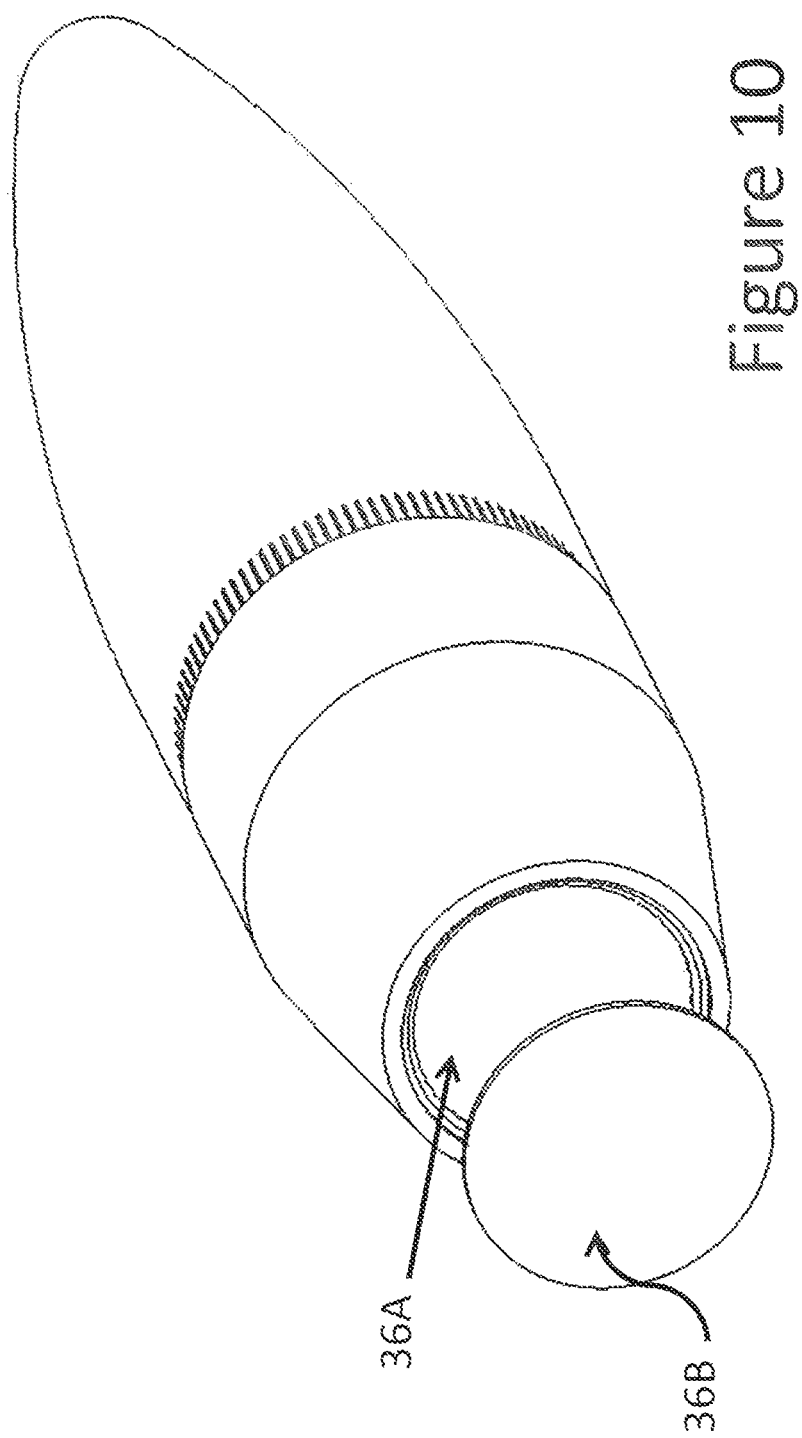
FIG. 10 depicts are projectile with a special tracer that incorporates a fluorescent dye in a sub-strata with a protective or ablative coating.
Figure 11:
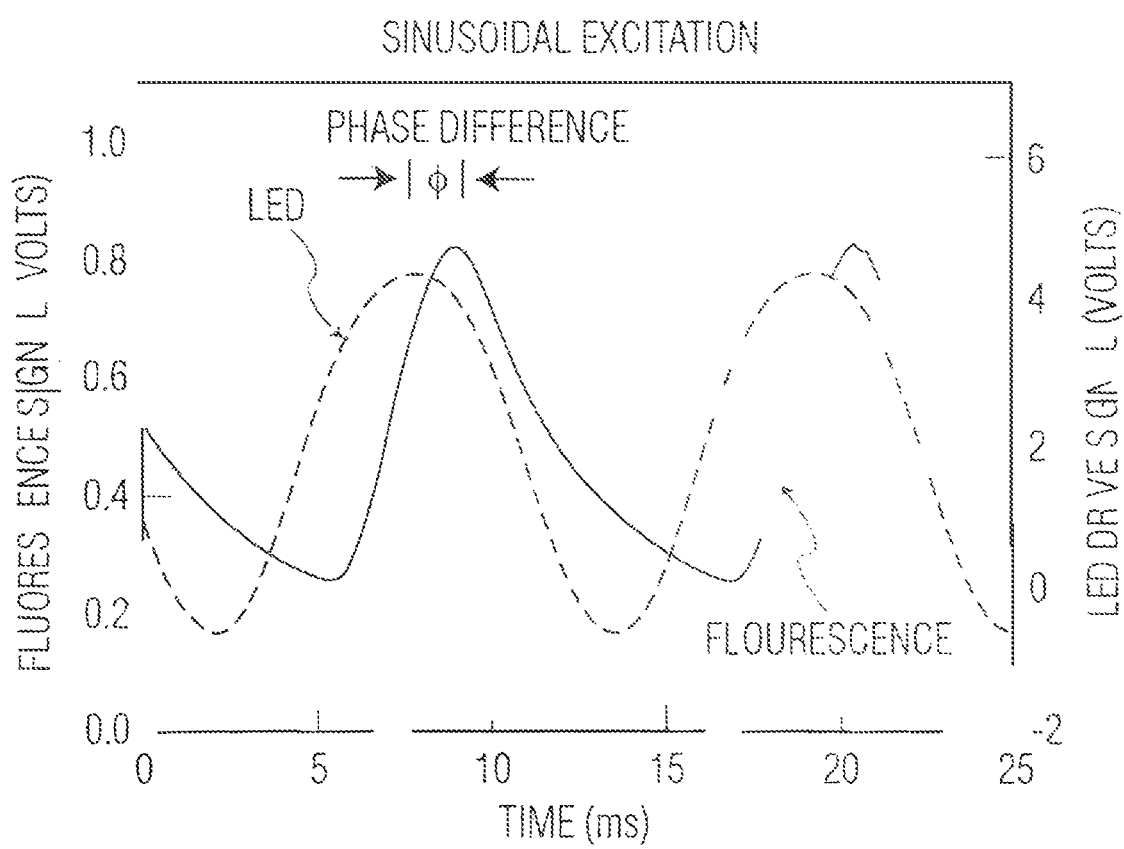
FIG. 11 is a graph response curve (signal return versus time in milliseconds). Incorporating fluorescent phosphorous materials into a special tracer allow the projectile to re-emit light after excitement by laser.

A partially completed projectile may be assembled with the special tracer 28, fit the rear of the projectile as depicted in FIG. 6C, and then crimped 32 to the FMJ 26 by crimping or metal forming, thus completing a fully encapsulating metal jacket 26A and retaining the special tracer 28 within the finished projectile 10.

Figure 2A:
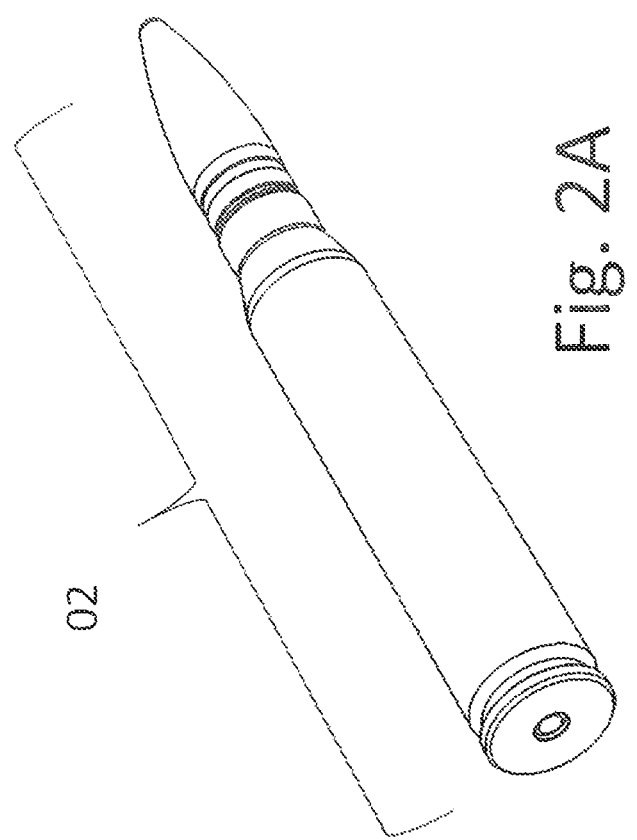
FIG. 2A depicts a standard cartridge housing a projectile.
Figure 2C:
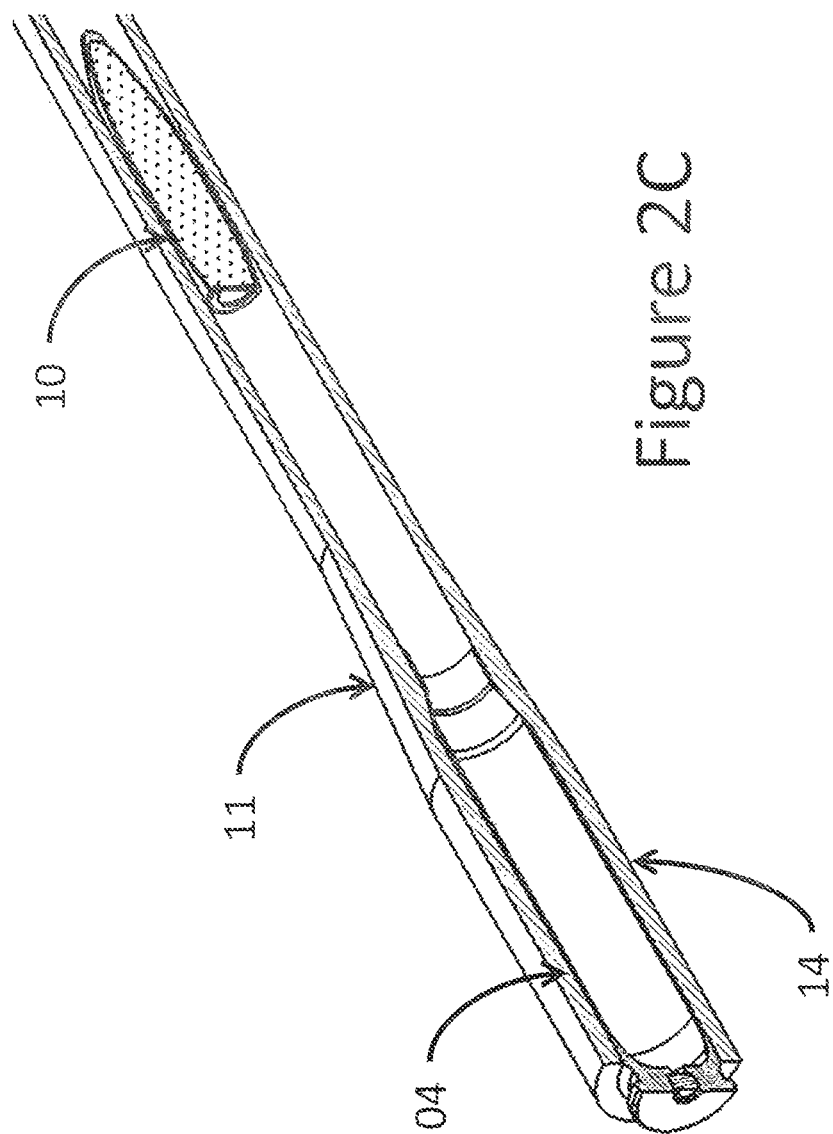
FIG. 2C depicts a standard cartridge in a breach firing a projectile, the projectile having exited the cartridge traveling in a barrel where burning, expanding propellant gases (not depicted) propel the projectile.
Figure 3A:
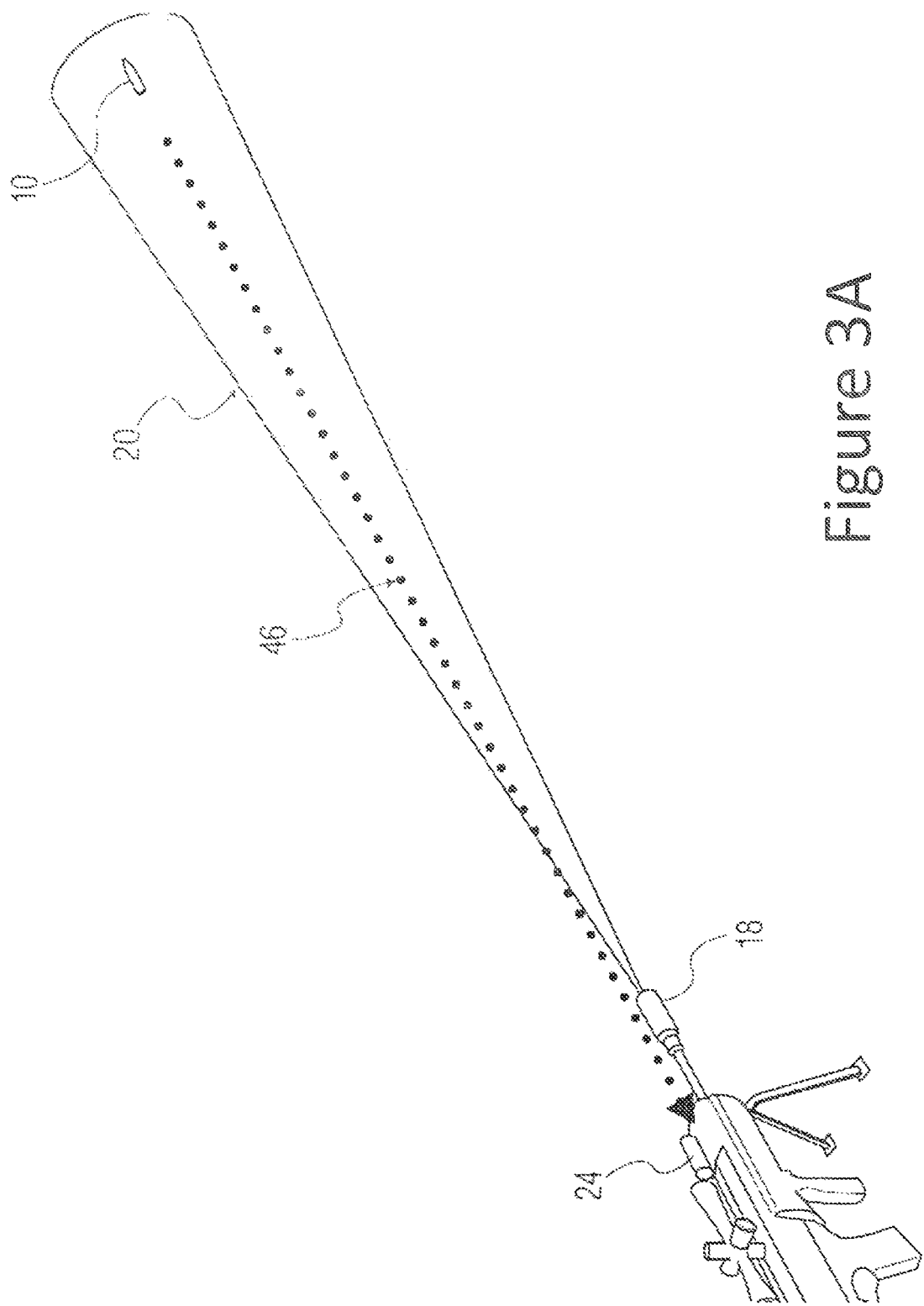
FIG. 3A provides a perspective view depicting a projectile tracking device that includes an emitter 18 illuminating a light cone 20 that intersects the ballistic path of a projectile in flight 10.
Figure 3B:
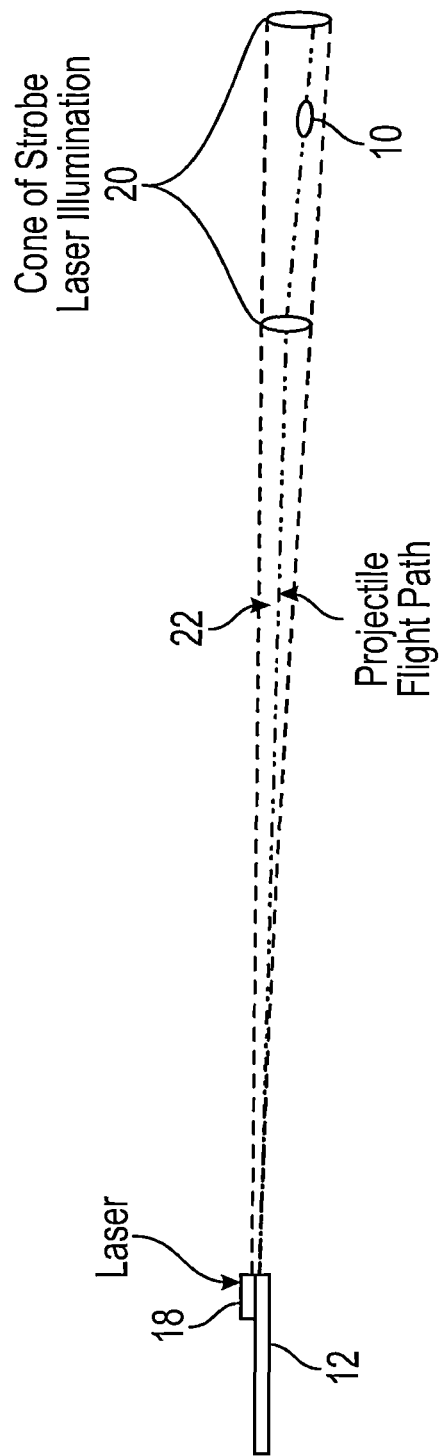
FIGS. 3B and 3C provide views that further illustrate a methodology to observe and record the projectile's location with a tracking device that illuminates the projectile's path.
Figure 3C:
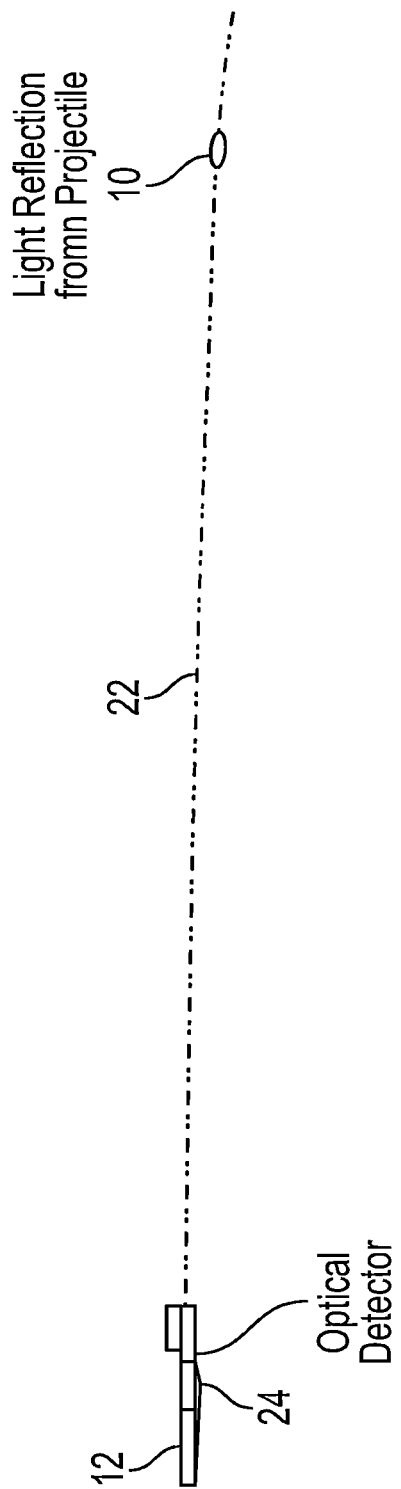
Figure 4:
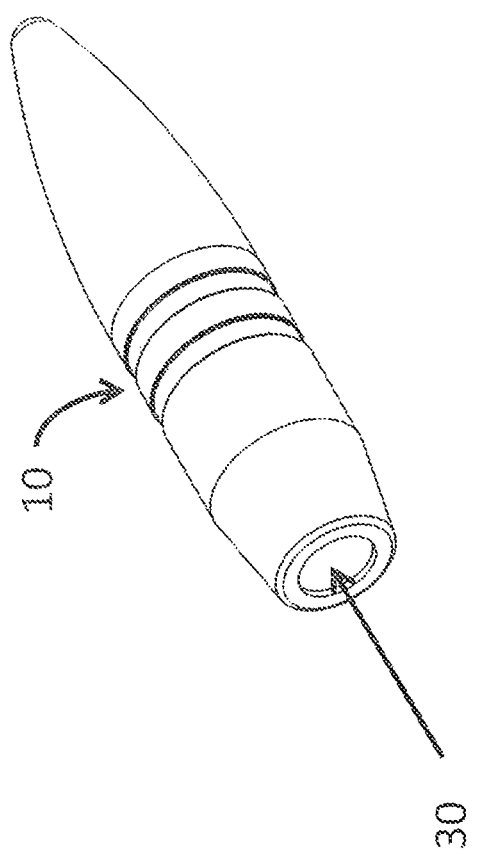
FIG. 4 depicts an external view of a FMJ projectile incorporating a special tracer.

After completing manufacture of the projectile 10, the projectile is then loaded into a cartridge case 04 that is filled with propellant 08 forming a completed projectile 02 (FIGS. 2B and 2C). The product may benefit from use of a propellant 08 with an optimized stoichiometric balance, as such propellants are known to burn and minimize reside from propellant combustion. Thus, a clean burning propellant in combination with special tracers is useful in precluding the unwanted deposition of carbonaceous residue on a special tracer's surface.

Figure 5A:
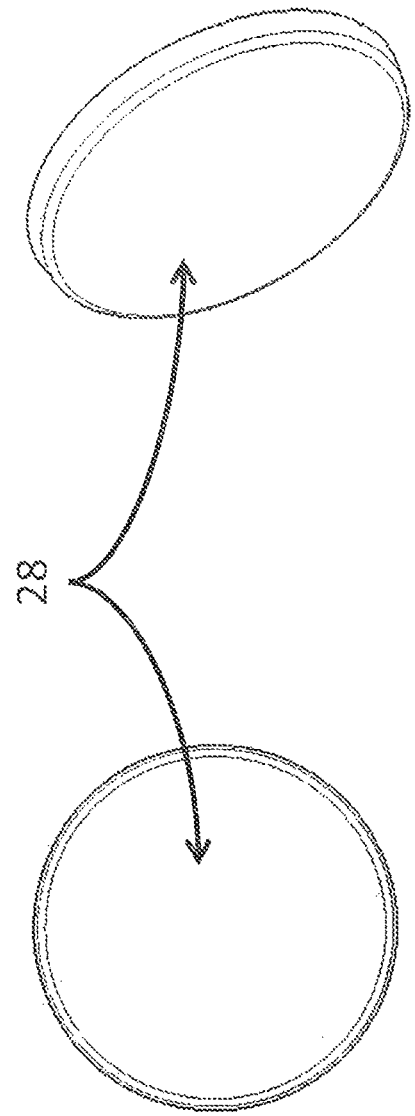
FIG. 5A depicts two views of a special tracer that is in a wafer form.
Figure 5B:
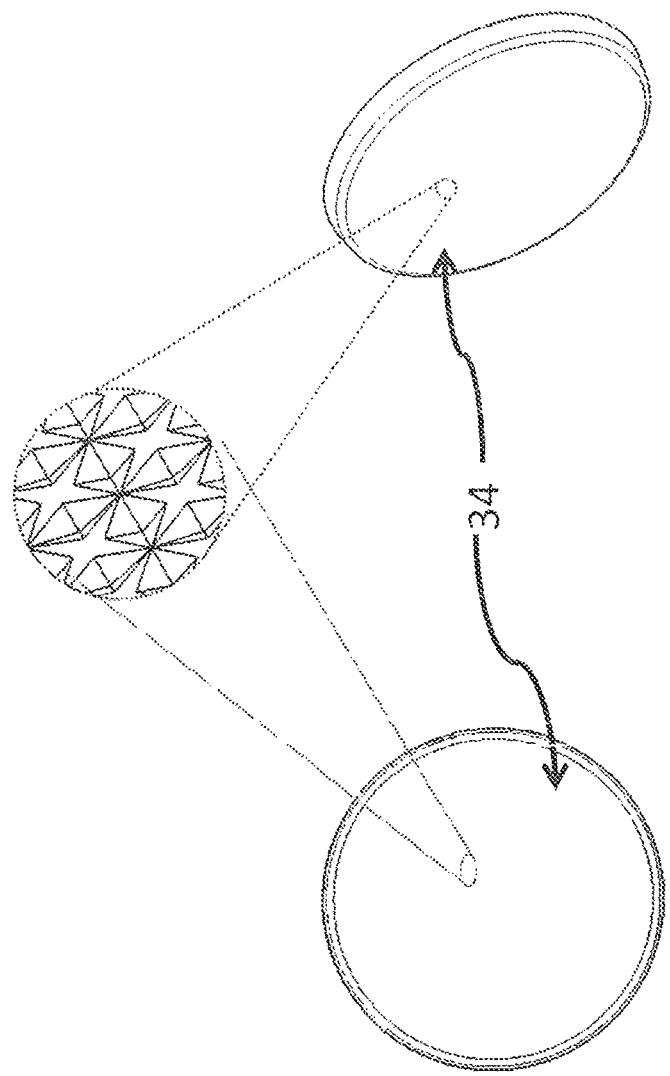
FIG. 5B depicts a view of a special tracer that is in a wafer form and a magnified view of the surface morphology of the disk.

In a second embodiment the wafer includes a fluorescent material (e.g., a dye) that is responsive and re-emits light when radiated with a laser. The light re-emission 46 returns a light signal to an optical detector or 24 tracking device. When illuminated by a light from the vicinity of a weapon 18, light is re-emitted from the projectile's trailing edge 30 in the direction of the weapon. FIGS. 6A-D depict projectiles with a special tracer. The special tracer 28 is crimped by the bullets exterior metal jacket 28 to form a sealed metal jacket 28A surrounding the bullet's interior metal or components. The special tracer disk 28, 36 includes fluorescent dyes responsive to laser emission that include phosphorous. FIG. 5C depicts a special tracer that exhibits a special light response (reemission) that is crimped to a FMJ projectile 58 that, when excited by laser light, reemits radiation as identified in FIG. 11. A cartridge with this type of special tracer in the trailing edge may incorporate an ablative or protective material 36B that burns or otherwise vaporizes after cartridge ignition.

In another embodiment, a projectile may include a special tracer 28,28A,28B,30 which is perpendicularly aligned with an axis of rotation of the projectile 10' to maximize reflectivity through yaw, pitch, and changes in the flight characteristics of the projectile 10'. For example, aligning the retro-reflective special tracer 28A, 30 with the axis of the rotation expands a range of the projectile 10 during which the retro-reflective surface 60 remains visible to the detector 24 or the shooter. That is, as the projectile 10 ascends to or descends from a maximum height during the flight path 22 of the projectile 10, the perpendicular alignment allows the visibility of the retro-reflective surface 60 of the special tracer 28, 28B, 30 up to six (6) degrees of freedom, whereas a non-perpendicular alignment may only allow the visibility of the retroreflective surface up to 2 or 3 degrees of freedom, thereby reducing the visibility of the retro-reflective surface 60 of the projectile 10 in its flight path 22.

In some example, an ammunition projectile 10' may include a metal jacket 26, a ductile core 21 included within the metal jacket 26, and a non-pyrotechnic tracer 28A,28B, 30 configured perpendicular to the axis of rotation of the ammunition projectile 10', the exterior of the tracer 28A, 28B,30 having a reflective surface and a retroreflective morphology 60, the tracer 28A,28B,30 crimped 32 in place retained by the metal jacket 26, forming the aft end of the projectile 10' having retroreflective characteristics. The perpendicular tracer configuration may maximize a return light signal, in a wavelength, to a detector 24 adjacent to a firing point, of the ammunition projectile 10'. In some examples, the perpendicular tracer configuration may increase a range the projectile 10'remains visible to the detector 24. In some examples, the perpendicular configuration may coincide with a centerline of a fabrication dye for fabricating the ammunition projectile 10'. In some examples, the tracer 28A,28B,30 may be fabricated from a metal with a reflective surface of silver, copper, aluminum, nickel, chrome or a dielectric. In some examples, the tracer 28A,28B,30 may be fabricated with the retroreflective morphology 60 impressed, embossed, stamped, or etched on a polished metal substrate. In some examples, the tracer 28A,28B,30 is coated with a reflective chrome finish.

In some examples, an ammunition cartridge 2 configured to be fired from a weapon 12 may include the perpendicular tracer alignment. For example, the cartridge 2 may incorporate a projectile 10' including an external elongated metal jacket 26, a ductile core 21, and a non-pyrotechnic tracer 28A,28B,30, configured perpendicular to the axis of rotation of the projectile 10', the exterior of the non-pyrotechnic tracer 28A,28B,30 having a reflective surface and a retroreflective morphology 60, the tracer crimped in place retained by the elongated metal jacket 26, forming the aft end of the projectile 10' having retroreflective characteristics 60. The perpendicular tracer configuration may maximize a light signal return to a detector 24 in specific wavelengths. In some examples, the perpendicular tracer configuration may increase an observable range of the projectile 10' as the retroreflective surface of the tracer 28A,28B,30 returns light in a specific wavelength to the detector 24. In some examples, the perpendicular tracer configuration increases an angle of reflectance of the projectile 10' during a flight of the projectile 10'. In some examples, the perpendicular configuration may coincide with a centerline of a fabrication dye for fabricating the projectile 10'. In some examples, the reflective surface 60 of the tracer 28A,28B,30 may be formed from a metal. In some examples, the reflective surface 60 of the tracer 28A,28B,30 is optimized for reflection in a spectrum associated with a metal chemistry of the reflective surface 60. In some examples, the tracer 28A,28B, 30 is configured from a thin metal disk, the configuration maximizing the cavity volume within the projectile 10'. In some examples, the tracer 28A,28B,30 may be configured from the thin metal disk with the reflective surface of silver, copper, aluminum, nickel, chrome or a dielectric. In some examples, the tracer 28A,28B,30 may be coated with a reflective chrome finish. In some examples, the tracer 28A, 28B,30 configured from the thin metal disk allows a cavity of the projectile 10' to have a matching ballistic match to ball ammunition. In some examples, the tracer 28A,28B,30 is crimped without a damage to the retroreflective surface of the tracer 28A,28B,30.

FIGS. 12A-19 illustrate various features or aspects of the projectile 10' having the perpendicular alignment of the special tracer 28A,28B,30 to the axis of rotation of the projectile 10'. FIGS. 12A-D show aspects of example projectiles 10' in accordance with example embodiments of the present disclosure. The projectile 10' is similar to the projectile 10 as described with reference to FIGS. 2B-C, 3A-C, 4, 6A-D, 7, 8A, 8G, 9, and 10, except that the projectile 10' includes a perpendicular alignment of the retro-reflective surface 60 to the axis of rotation of the projectile 10'.

Figure 12A:
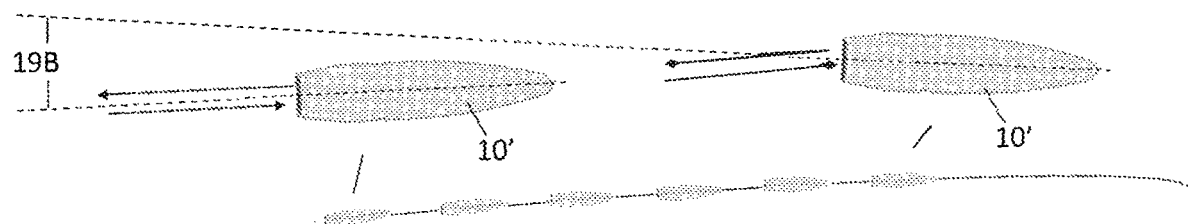
FIG. 12A is a depiction of a trackable projectile and that projectile's changing orientation in a flight path.

FIG. 12A depicts the flight path 22 of a .50 caliber projectile 20', illustrating the orientation changes 19B that an optically trackable projectile 10' encounters based on the changing angle of attack of the projectile 10'. The orientation of the aft projectile shifts a few degrees as any projectile, including a trackable projectile 10' flies towards a distant target.

Figure 12B:
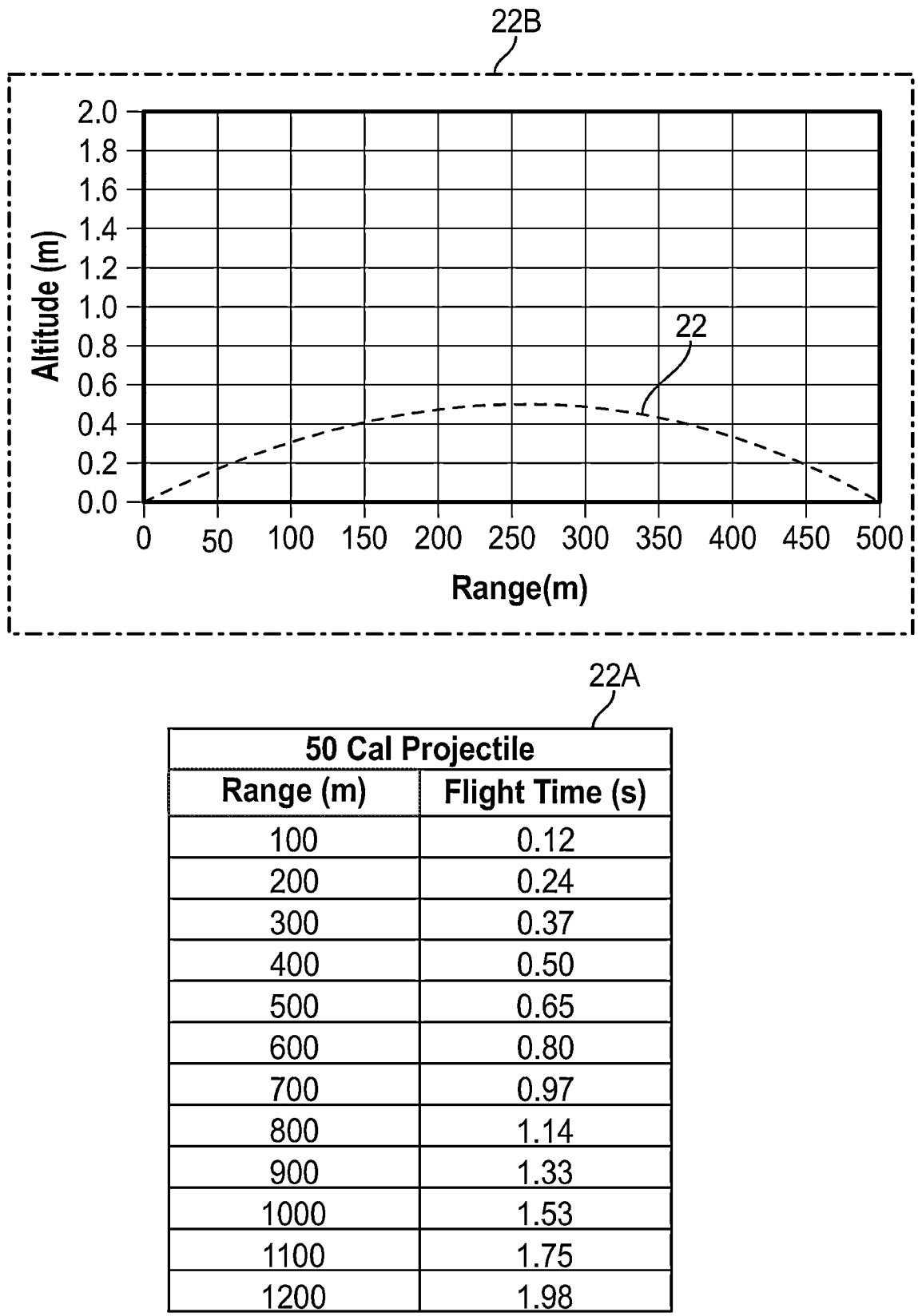
FIG. 12B depicts a trajectory plot of a .50 caliber projectile. The table on the left of the figure is a .50 cal range table and the flight time at different ranges.

FIG. 12B illustrates a chart showing a relationship 22A between a projectile range in meters (m) and time of flight in seconds (s) of the projectile 10', and a graph showing a projectile trajectory over distance of the projectile 10' during the flight path 22 of the projectile 10'

Figure 12C:
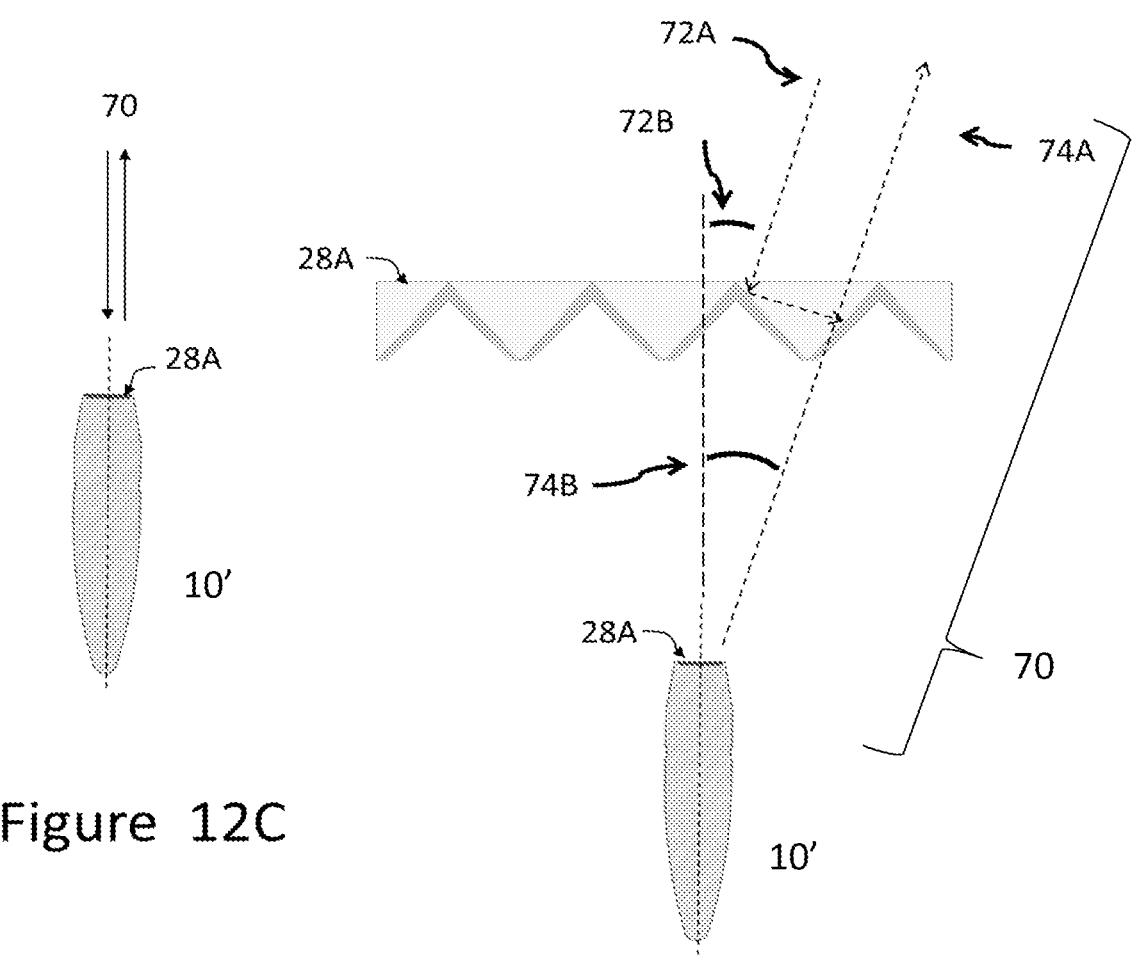
FIG. 12C illustrate light fall and return on a retroreflective disk, in detail with incidental light fall, reflectance to the retroreflective disk and the return of light to the angle of incidence.

FIG. 12C illustrates how the light from the emitter 18 falls on the trackable projectile 10' with angle of light incidence 70 on a special tracer 28A, housed in the aft end of a trackable projectile 10'. Emitter light falls 72B on a special tracer 28A housed in the aft end of a trackable projectile 10' creates a reflectance incidental to the angle of light fall 74A.

Figure 12D:
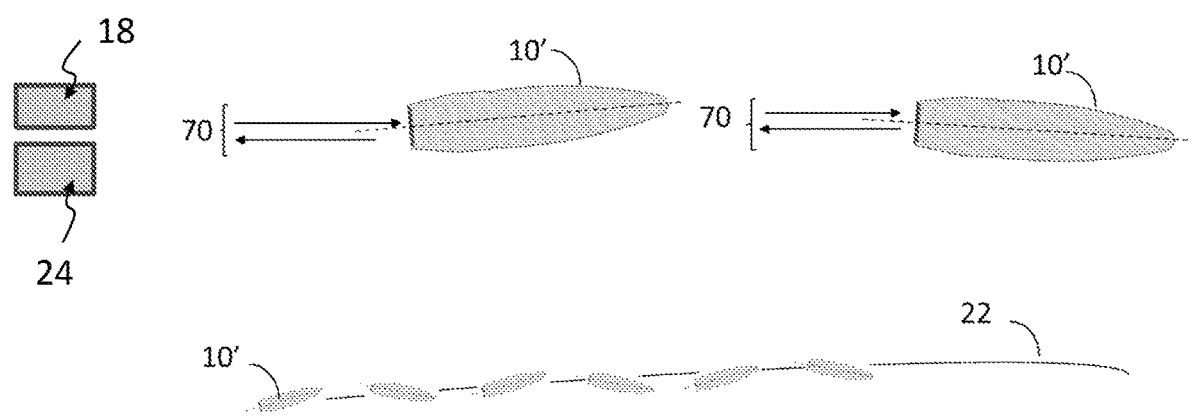
FIG. 12D depicts the exaggerated nutational movement of a projectile exhibiting 6 degrees of freedom (6DOF) orientation changes, in flight, where the changing yaw and pitch orientation of the projectile change the incidence of light fall and return continuously changing while the trackable projectile is in ballistic flight.

FIG. 12D depicts the well-known orientation changes induced on a projectile flying with 6 Degrees of Freedom (6DOF), where the projectile's yaw and pitch changes a projectile's orientation and the changing incidence of light received from an emitter 18. Increasing incidence angles reduce the light reflected from the retroreflective special disk 28A, thus the changing orientation of a projectile in flight 16 varies the light reflected and returned to a detector 24 from a trackable projectile 10'. This variation is accompanied by a drop in signal light return to the detector 24, the drop in light strength directly associated with the widening gap between the emitter 18, the trackable projectile 10' and the light returning to the detector 24 as the projectile 10' undergoes ballistic flight 22.

Figure 12E:
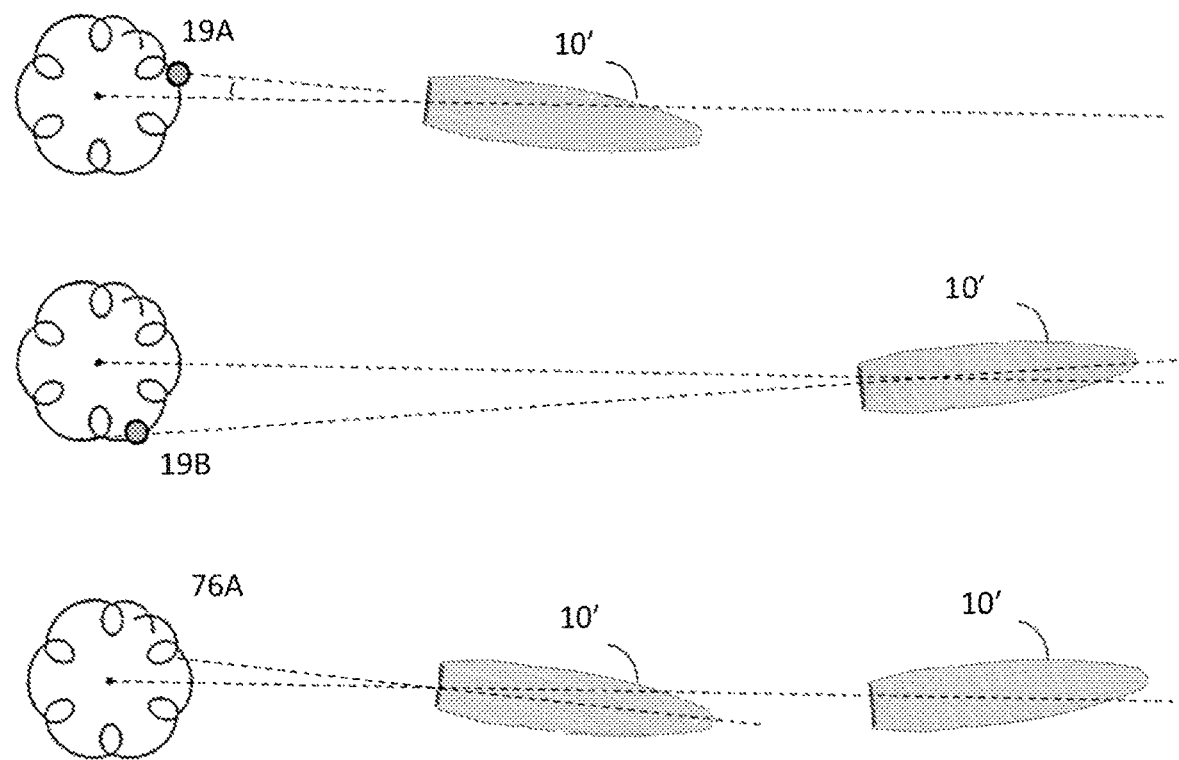
FIG. 12E depicts a projection of movement associated with the aft projection of nutational movement when the projectile is in ballistic flight.

FIG. 12E illustrates the effect of the yaw and pitch, also known as nutational movement causing a continuous variation in a projectile's orientation while in flight, the movements changing the angular orientation of the projectile's aft end of the projectile, a projection of the oscillation 19A,19B creates a drifting light return signal 76, and changing angle of incidence 70 accompanies by an opening range gap between the emitter 18 and projectile 10', reduce the intensity of the light returning to a detector 24. The greater the angle of incidence 72A, the less light is returned from a retroreflective surface 74B, since retroreflective efficiency declines as incident angles increases.

Figure 12F:
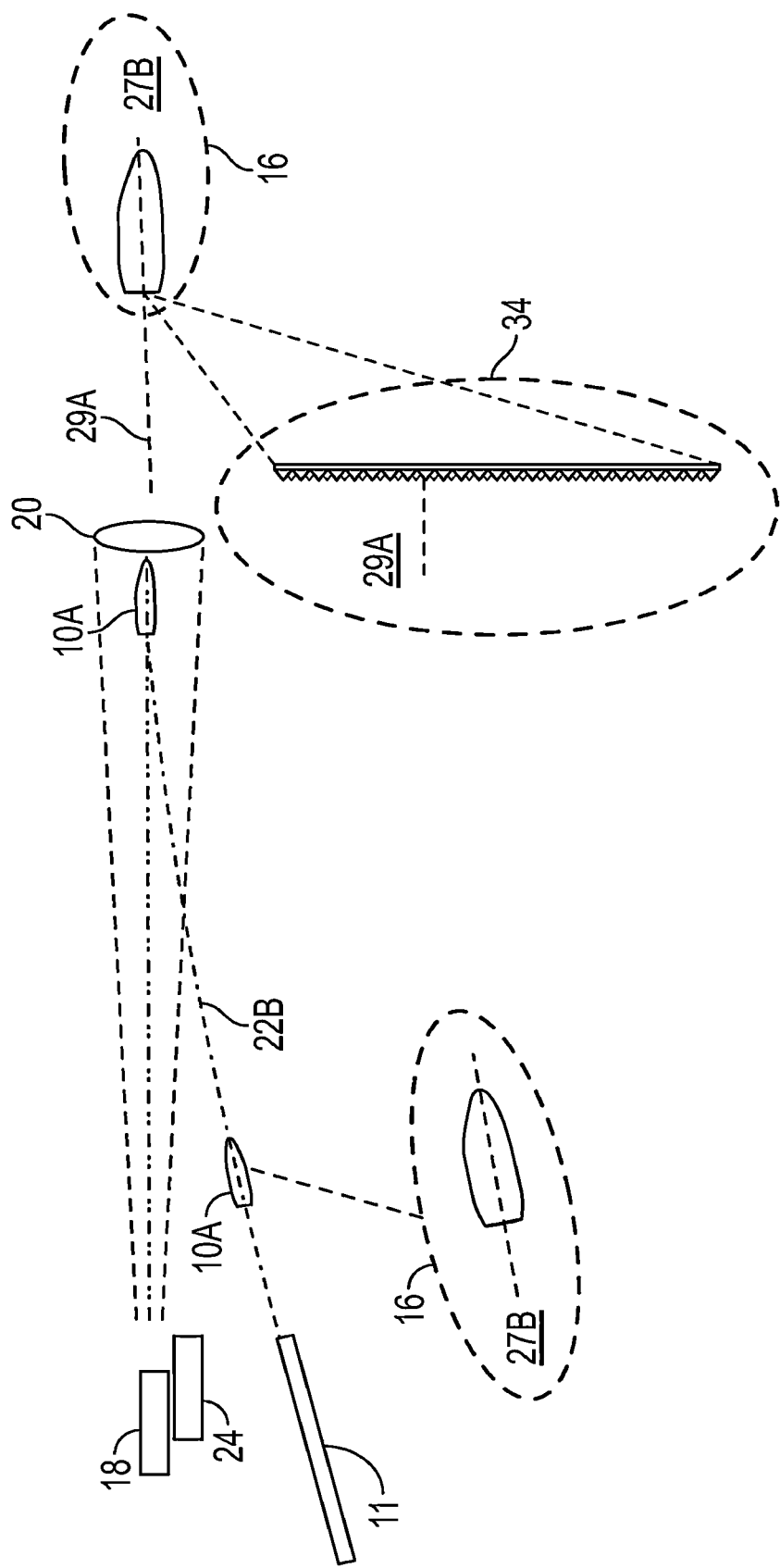
FIG. 12F illustrates a trackable projectile with a retroreflective disk disposed in the aft end of the projectile according to a non-limiting example embodiment of the inventive concept.

FIG. 12F depicts a trackable projectile, with a retroreflective disk 28 located in the aft end of a projectile 10A, exhibiting a morphology of arrayed retroreflectors 60, where the orientation of the trackable projectile 10A changes 16 when in ballistic flight, where emitters 18, produce an illumination cone 20, and a trackable projectile 10A in ballistic flight, enters the illumination cone 20, being recorded by a detector 24 where the detector 24 and emitter 18 are aligned or bore-sighted to optically intersect with the trackable projectile 10A in ballistic flight over a distance 22B at a nominal range. The image depicts an exaggerated relationship between the barrel 11, optics (not depicted), emitters 18 and detectors 24 that are depressed below the axis of the weapon's barrel 11. At a nominal range, where the weapon's kit (11,12,18 and 24) are bore sighted, a trackable projectile's trajectory transitions to exhibit stable flight, so that the projectile's axis of rotation 27 enters the illuminated emission cone 20 of the emitter 18, where the trackable projectile's orientation 16, at this nominal range in stable ballistic flight, provides for alignment of an arrayed retro-reflective apertures 29A, and the disk 28A incorporated into the trackable projectile 10A, the resulting alignment of the retro-reflective aperture 29A at the nominal range optimizes the intensity of light return to the detector 24, located in the vicinity of the weapon 12 (not depicted) and barrel 11.

Figure 12G:
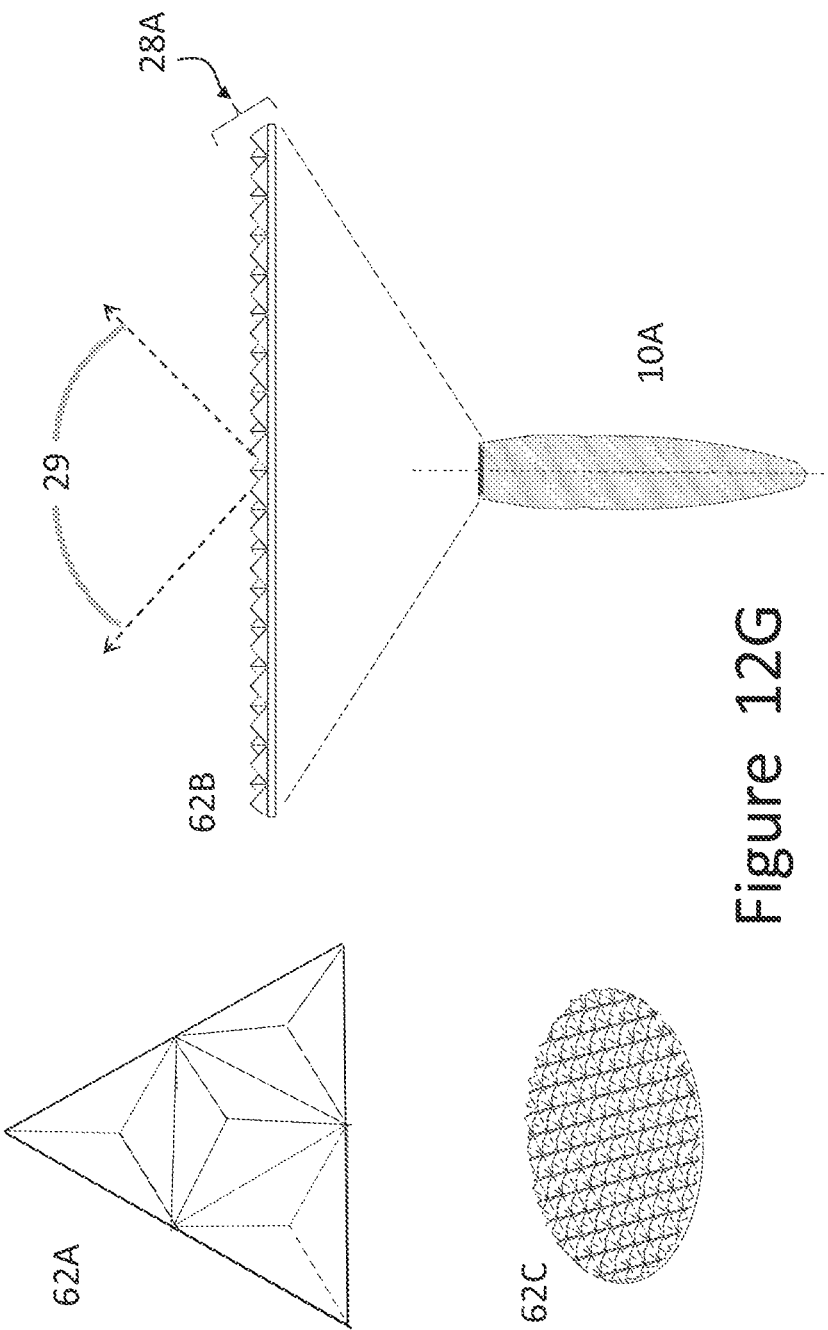
FIG. 12G illustrates a cross-section of a metal disk trace having an array of retroreflectors according to a non-limiting example embodiment of the inventive concept.

FIG. 12G illustrates a cross-section of a retroreflective disk 28A where individual focal apertures 29 are embossed, or otherwise formed on the surface of a metal disk 62B, having a reflective surface, where numerous aligned apertures in combination form an array of retro-reflectors. Feature 62A depicts a close-up view of the surface of a face of the disk 28A, with arrayed retro-reflectors. Feature 62C depicts a perspective view of the retro-reflective disk 28A.

Figure 12H:
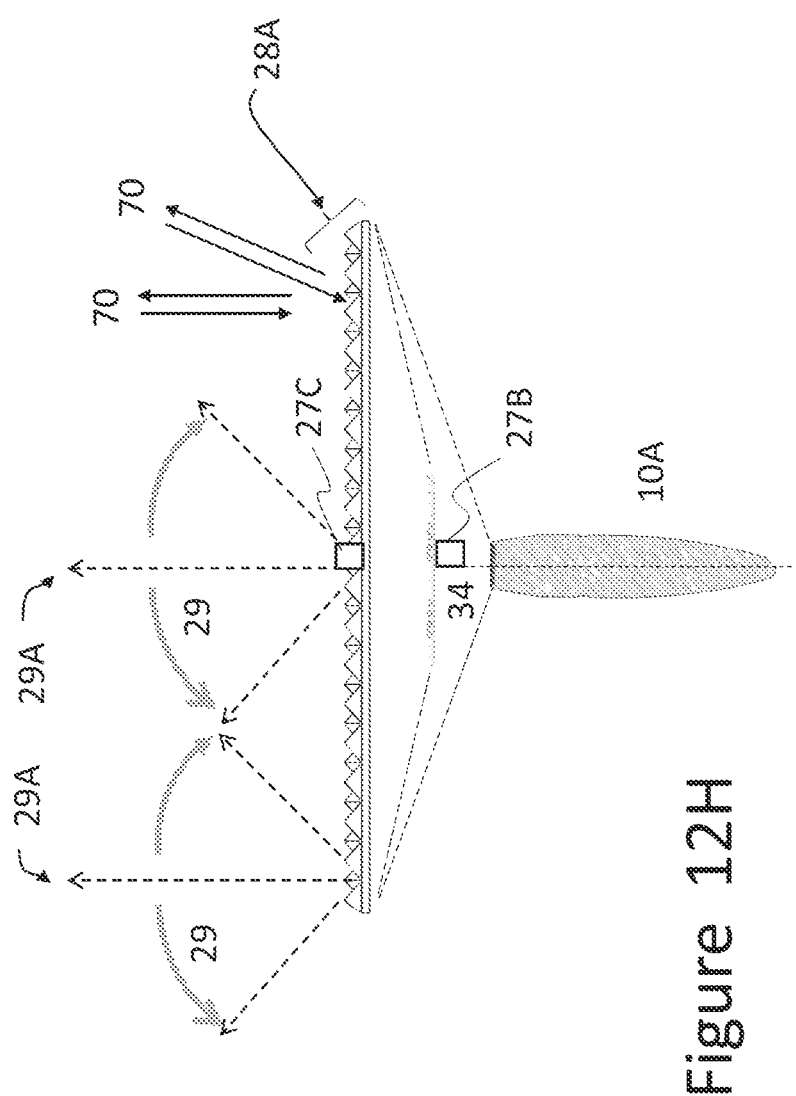
FIG. 12H illustrates a cross-section of a metal disk trace having an array of retroreflectors according to a non-limiting example embodiment of the inventive concept.

FIG. 12H illustrates the cross section of a retroreflective disk 28A, where an aperture 29 is bisected and the axis of multiple apertures 29A form a retro-reflective morphology having a configuration in which the axis of the retro-reflective apertures 29 in the disk 34 are inset perpendicular 27B to the disk 34. The morphology and reflectance of the retroreflector array thus returns light to the incidence of light fall.

In a non-limiting example embodiment according to the present disclosure, an ammunition cartridge configured to be fired from a weapon's barrel, the cartridge incorporating a projectile includes: (1) an elongated metal jacket; (2) a swaged core encapsulated by the elongated metal jacket; and (3) a non-pyrotechnic tracer formed into a metal disk, crimped and oriented in a jacketed bullet, the disk forming the aft trailing end of the projectile, wherein the tracer is embossed with a retroreflective morphology, having an array of retroreflectors, oriented in the jacketed bullet so that the focal apertures of the arrayed retroreflectors, in the tracer, are oriented to have a parallel alignment of the rotation of axis of the projectile. The aligned array of retroreflectors configured in aft trailing edge of the jacketed bullet forms the tracer and is configured to maximize the intensity of light returned along to the axis of rotation of the projectile. The aligned array of retroreflectors, in the trailing edge of the projectile, is configured to return light when the projectile is at a nominal target engagement distance. The projectile is observable at a range where the weapon is typically boresighted. The apertures for retroreflectors on the metal disk remain aligned with the centerline of production dye after fabrication of the projectile. The apertures for retroreflectors on the metal disk remain undamaged after fabrication of the projectile. The tracer, formed from the metal disk having the array of retroreflectors and configured in the trailing edge of the projectile, has a reflective coating. The metal disk formed into the tracer with the array of retroreflectors is formed from a reflective metal. The metal disk formed into the tracer with the array of retroreflectors has a coating of a reflective chrome plate. The tracer with the array of retroreflector has a reflective metal surface of silver, copper, aluminum, nickel, or a dielectric. The tracer formed into the metal disk with an array of retroreflectors, optimizes reflected light intensity in a specific spectrum associated with a metal chemistry of the reflective surface. The metal disk, forming the tracer, is punched from a thin metal tape or plate that is embossed with a retroreflective surface, the aperture of the retroreflectors being perpendicular to the disk. The tracer is configured in the metal disk, embossed with a retro-reflective morphology forming the array of retroreflectors with the retroreflectors' apertures being oriented perpendicular to the metal disk. The metal disk, forming the tracer, is crimped without causing damage to the retroreflective surface on the exterior of the trailing edge of the projectile.

In another example embodiment according to the present disclosure, an ammunition cartridge includes a projectile formed with metal jacket; a ductile core included within the metal jacket; and an embossed disk configured in the trailing edge of the projectile, perpendicular to the axis of rotation of the projectile, the exterior of the disk having a reflective surface and a retroreflective morphology, the disk crimped in place retained by the metal jacket, forming the aft end of the projectile having retroreflective characteristics, using a propellant that has minimal off-gassing, reducing the erosive effect on the surface of the metal disk, when the ammunition is stored for extended periods. The embossed disk is fabricated with the retroreflective morphology impressed, embossed, stamped, or etched on a polished metal substrate. The disk is coated with a reflective chrome finish.

In yet another example embodiment according to the present disclosure, a trackable projectile, fit with a tracer, configured to optimize light return when the trackable projectile is illuminated at a distance that coincides with the nominal bore-sighting range for a weapon that is kitted with emitters and detectors.

In yet another example embodiment according to the present disclosure, a method for fabricating a projectile includes: combining a metal jacket with a swaged ductile core; incorporating a metal plate with a retroreflective surface formed on a disk that functions as a tracer when illuminated, enclosing a projectile; and forming a full metal jacketed projectile, wherein focal apertures, in the disk, are parallel to the axis of rotation of the projectile, and the process of crimping the tracer in the aft end of the metal jacketed projectile precludes causation of a damage to the reflective surface of the disk (without causing a damage to the reflective surface). The forming a full metal jacketed projectile may include inserting the tracer into a tool used to form a full metal jacketed projectile.

Figure 13A:
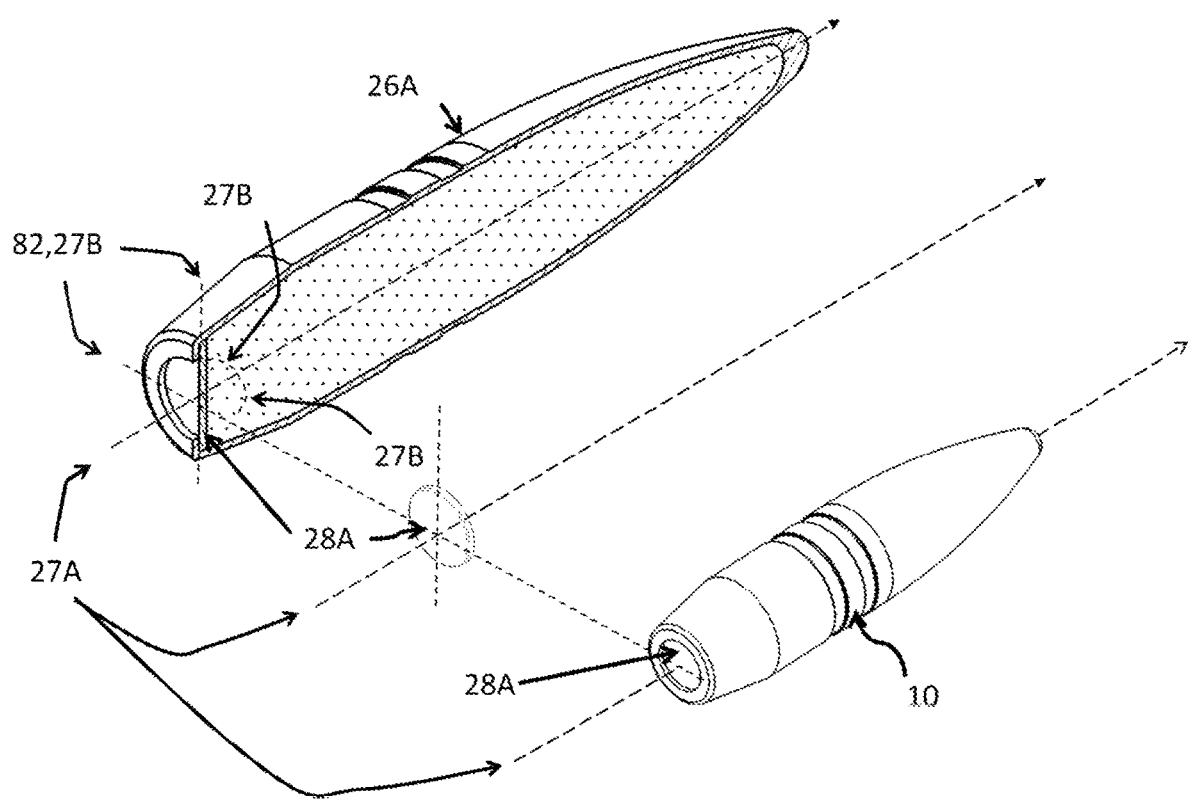
FIG. 13A depicts detail regarding the necessary alignment of the retroreflective disk perpendicular to the projectile's axis of rotation, in an optically trackable projectile.

FIG. 13A, depicts an optically trackable projectile 10' fabricated with a metal with a metal jacket 26A and incorporating a special tracer disk 28A that is crimped to the projectile jacket 26A, forming a complete jacketed projectile 26. This figure also depicts the projectile's axis of rotation 27A, and the special tracer disk's precise perpendicular alignment 82 to the axis of rotation 27A.

Figure 13B:
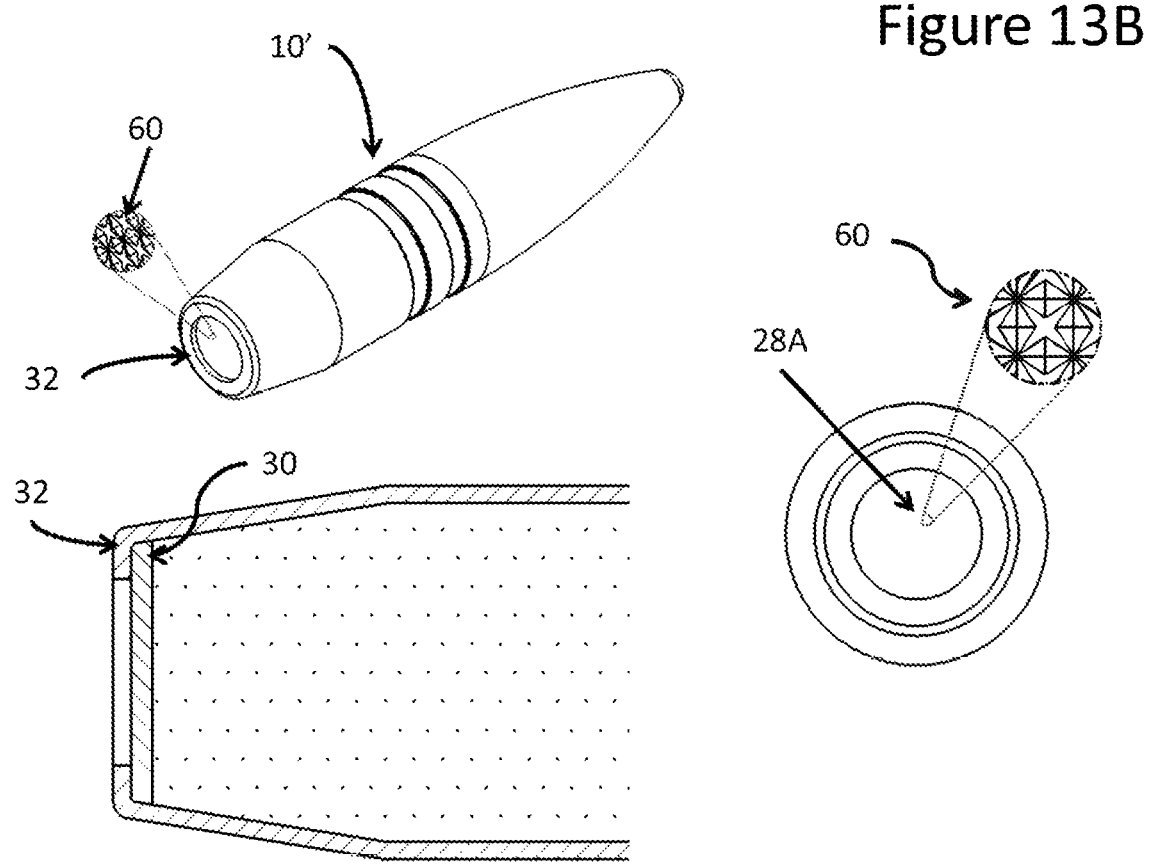
FIG. 13B depicts key features of an optically trackable projectile with a special disk crimped in place by the projectile's metal jacket forming an enclosed aft end of the projectile. The special disk retro-reflective metal surface positioned in the aft of the projectile oriented with retroreflective surface exploded view facing rearwards.

FIG. 13B depicts two exterior views and one cross section view of a completed the optically trackable projectile 10' with special tracer disk 30,28A, crimped 32 to the trailing edge of the projectile 10'. The disk 28A includes externally facing prismatic features apparent under magnification having a reflective surface 60. In combination, the projectile design allows a detector 24 to track the trackable projectile 10' with a special tracer 30,28A over the projectile's flight path 22. The perpendicularity geometry 82,27B of the disk, relative to the projectile's axis of rotation 27A, maximizes light signal return to the detector 24 in specific wavelengths.

Figure 14A:
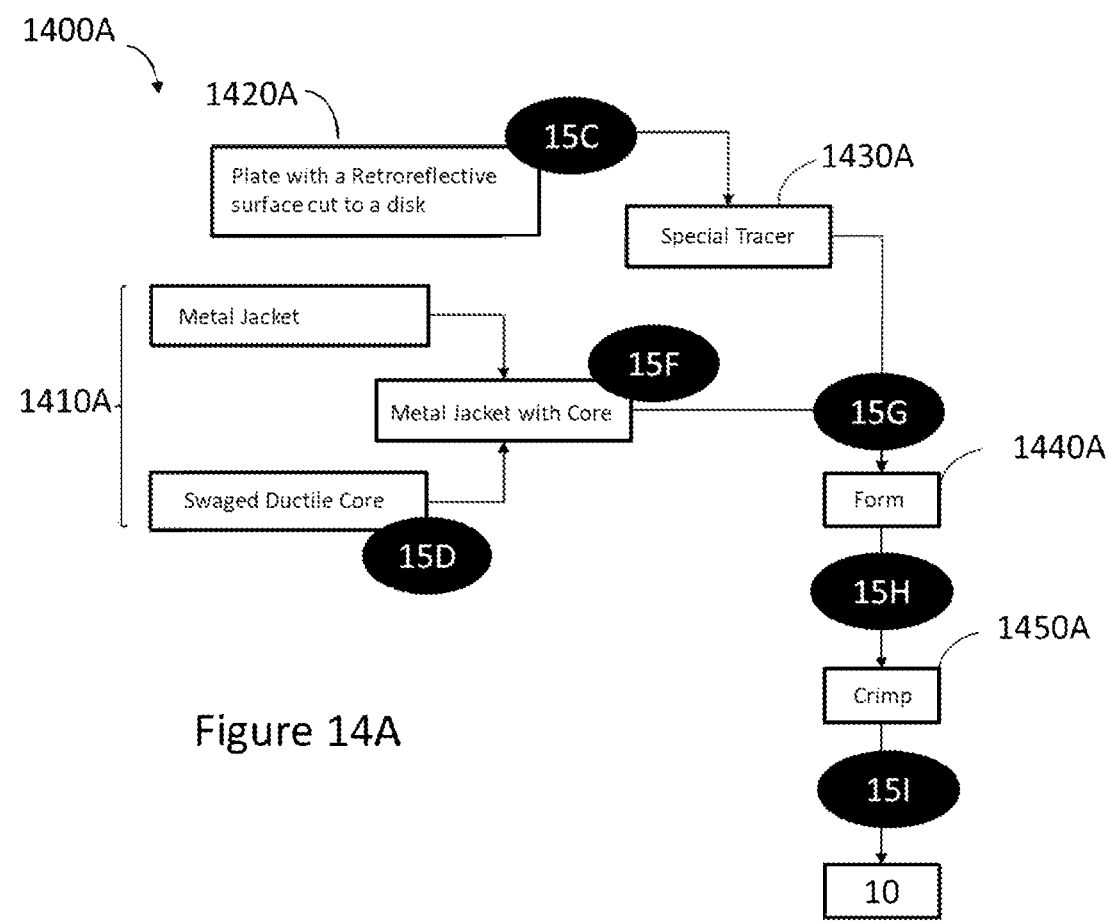
FIG. 14A Fabrication Process Flow to Fabricate an Optically Trackable Projectile with a Special Tracer disk.
Figure 14B:
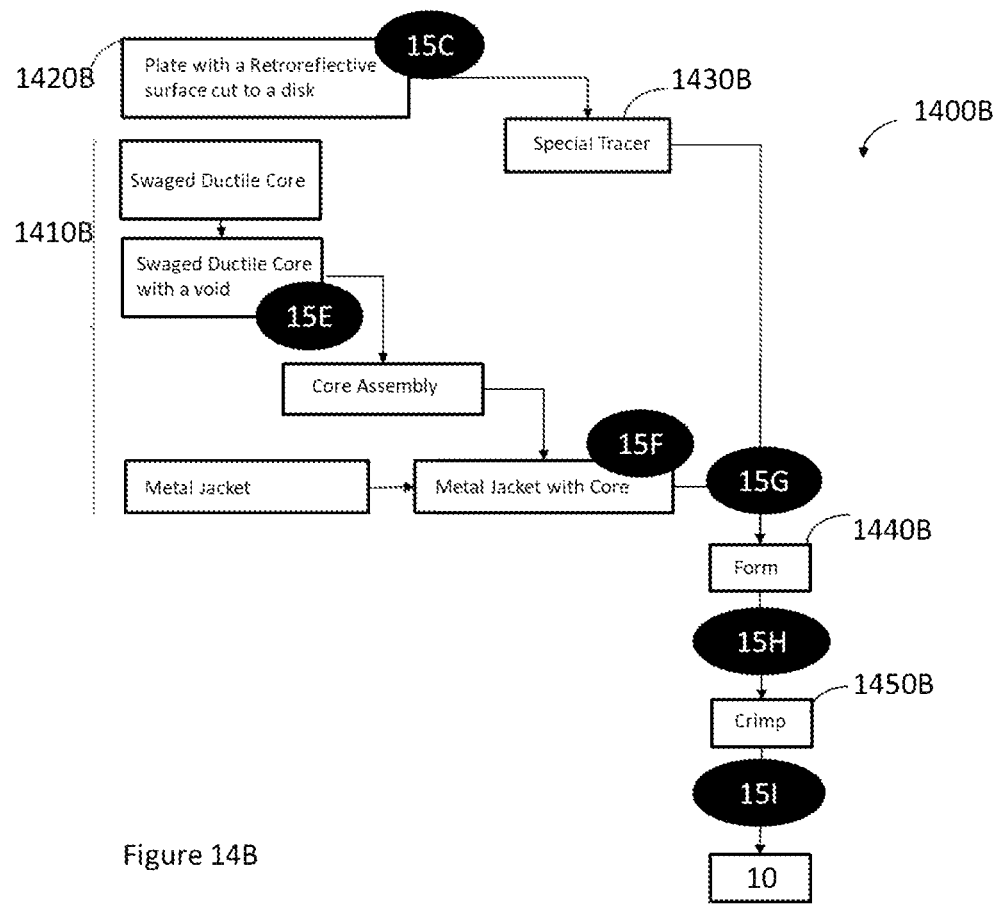
FIG. 14B Fabrication Process Flow to Fabricate an Optically Trackable Projectile with a Special Tracer disk 34, the core formed housing a penetrator.
Figure 15A:
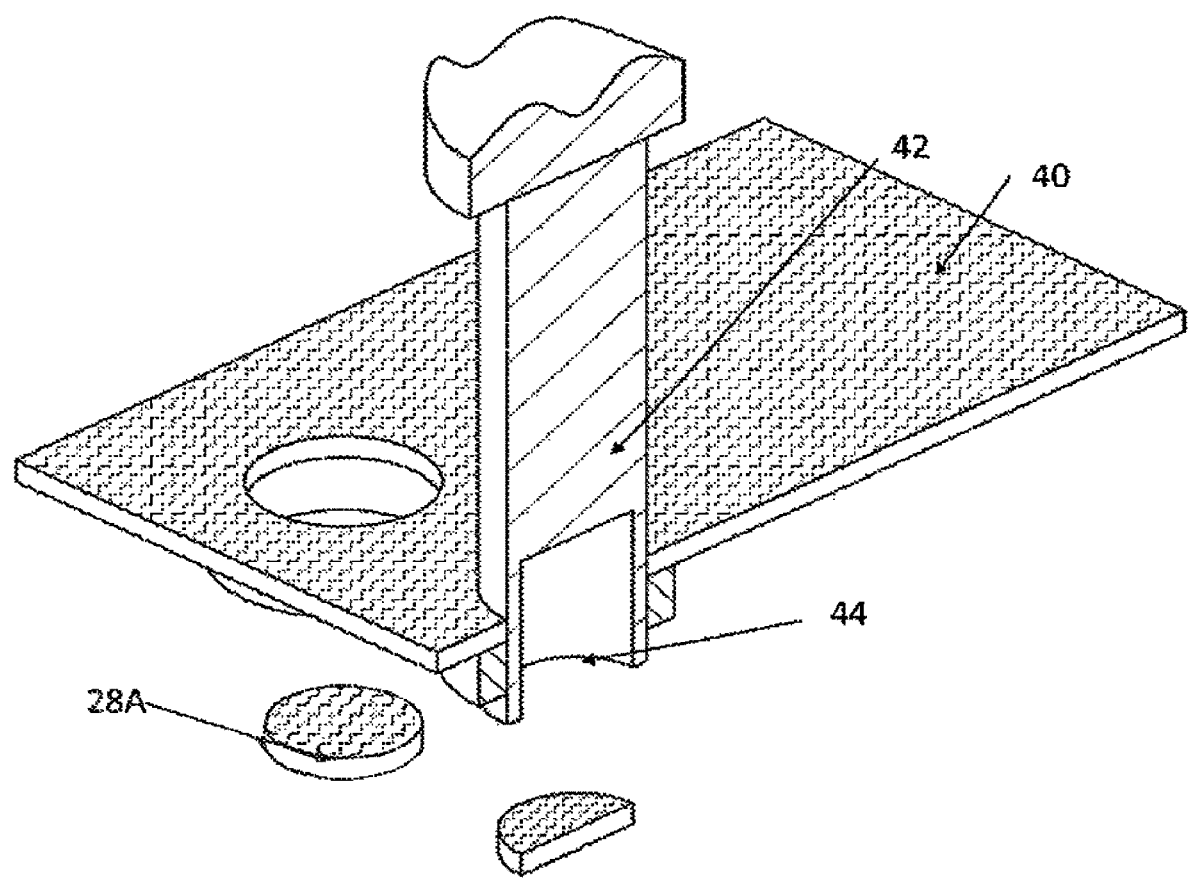
FIG. 15A depicts a metal plate (with a retroreflective morphology) and a punch, fabricating a disk with minimal damage to the surface of the Special Tracer disk.
Figure 15B:
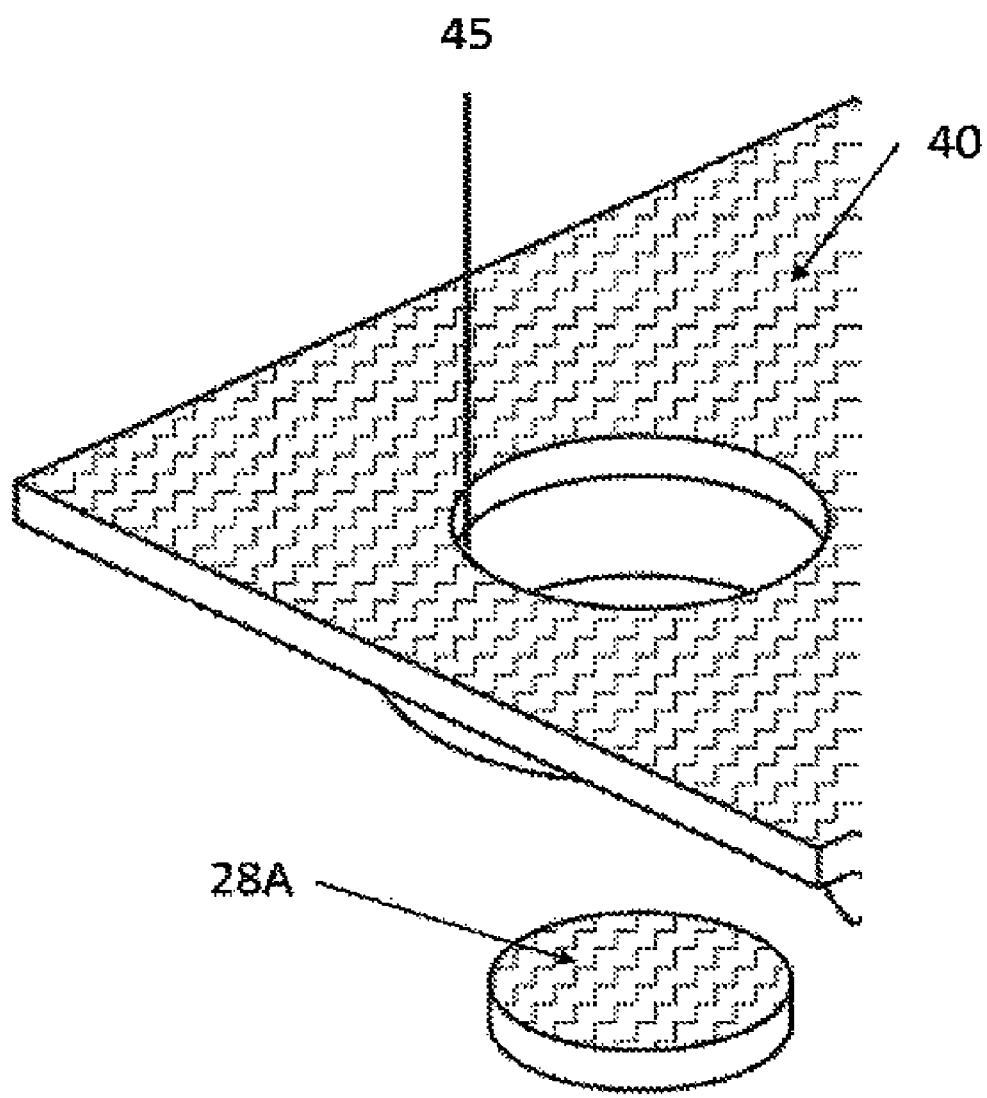
FIG. 15B depicts laser cutting of a metal plate (with a retroreflective morphology) and a laser cut, fabricating a disk with minimal damage to the surface of the Special Tracer disk.
Figure 15C:
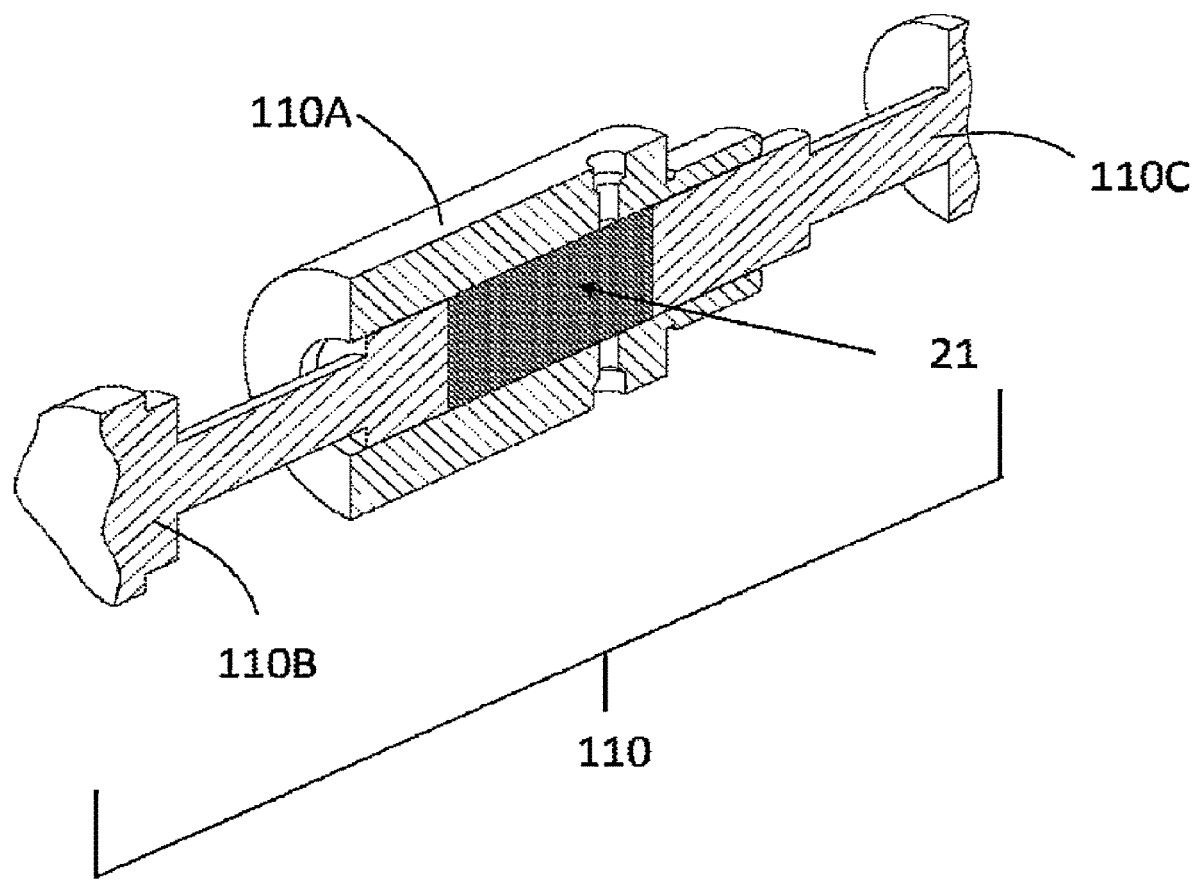
FIG. 15C depicts a Swaging Tool and Die set, forming a core.
Figure 15D:
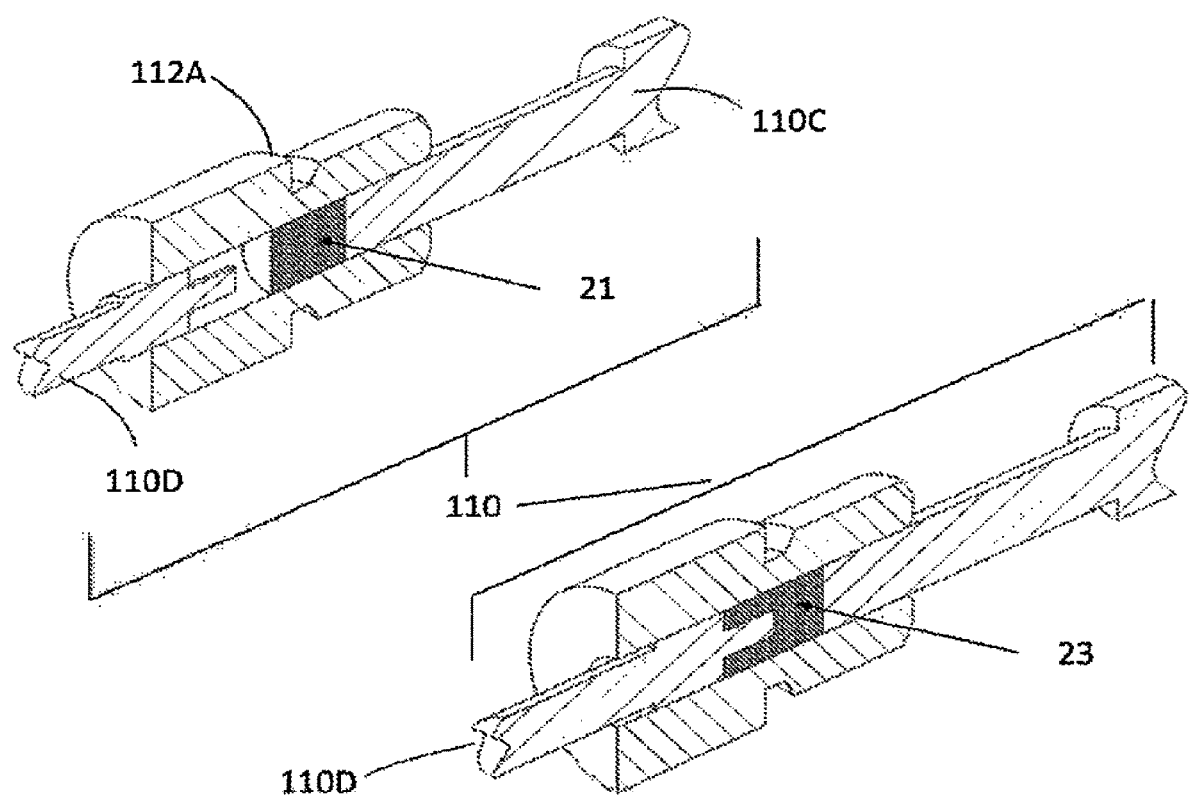
FIG. 15D depicts a Swaging Tool and Die set, forming a core with an inset, that can hold a penetrator (not depicted)
Figure 15E:
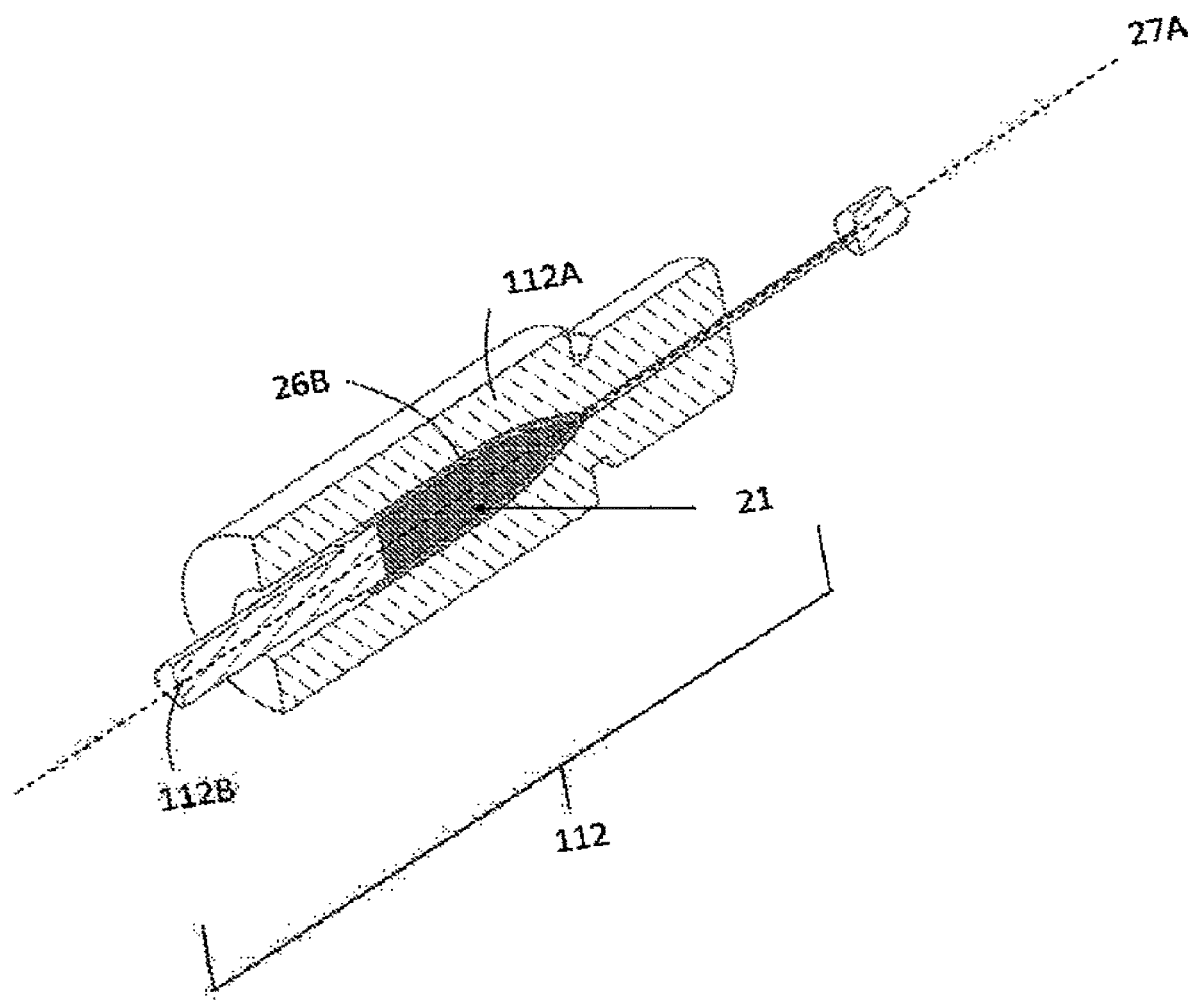
FIG. 15E depicts a die and core pressing tool creating a void in a ductile core.

The process of fabricating a trackable projectile 10' is set forth in FIGS. 14A and 14B. The sequenced processes set forth in FIGS. 14A and 14B produce a formed, crimped projectile with a special disk 28A, properly aligned to form a useful Trackable Projectile 10'. The black circles with white numbers refer to details associated with the process sets set forth in FIGS. 15A, 15B, 15C, 15D, 15E, 15F, and 15G, where FIGS. 15A and 15B disclose alternative processes to produce a special tracer disk annotated in FIGS. 14A and 14B. FIG. 14A is a method 1400A for fabricating a trackable projectile 10' in accordance with the present disclosure. At step 1410A, a metal jacket 26 for the projectile 10' is combined with a swaged ductile core, forming a metal jacket with a core (as shown in FIG. 15E). At step 1420A, a metal plate with a retroreflective surface 60 is shaped into a disk 28A, formed from a metal plate or metal sheet 40 as described with reference to FIGS. 15A and 15B. In some examples, the metal plate 40 may be shaped into the disk using a tool (e.g., a tool 42 as described with reference to FIG. 15A) punching disks with retro-reflective surface 60 without scratching or damaging the retro-reflective surface 60. In some examples, the metal plate 40 may be shaped by a laser cutter (e.g., a laser cutter 45 as described with reference to FIG. 15B) cutting the metal sheet 40 into disks with the retro-reflective surface 60 without scratching or damaging the retro-reflective surface 60. At step 1430A, a special tracer 28A,28B,30 for the projectile 10' is formed with the disk. At step 1440A, the special tracer 28A,28B,30 is inserted into position to form a sub assembly of a full metal jacketed projectile 58A as shown in FIG. 15E. The special tracer 28A,28B,30 may be inserted into the position so as to have a perpendicular alignment between the special tracer 28A,28B,30 and the axis of rotation of the projectile. At step 1450A, the special tracer 28A,28B,30 is crimped 32 onto an aft end of the metal jacket 26 without a scratch or damage to the retroreflective surface 60 of the special tracer 28A,28B,30 (as shown in FIGS. 15G and 15H).

FIG. 14B shows a method 1400B for fabricating a projectile 10' with a special tracer 28,28B,30 in accordance with the present disclosure. At step 1410B, a metal jacket with a core is formed (as shown in FIG. 15E) by forming a core assembly with a swaged ductile core with a void (as shown in FIG. 15D), and combining a swaged ductile core with a void to fit a penetrator 25. At step 1420B, a metal plate 40 with a retroreflective surface 60 is shaped into a disk as shown in FIGS. 15A and 15B. The metal plate 40 may be shaped into the disk using a tool 42 punching disks, a laser cutter 45, or any other means for shaping the disk without scratching or damaging the retro-reflective surface 60 of the metal plate 40. At step 1430B, a special tracer 28A,28B,30 for the projectile 10' is formed with the disk. At step 1440B, the special tracer 28A,28B,30 is inserted into position to form a sub assembly of a full metal jacketed projectile 58A as shown in FIG. 15G. At step 1450B, the special tracer 28A,28B,30 is crimped 32 onto an aft end of the metal jacket 26 tool design precluding scratches or damage to the sensitive retroreflective surface 60 on the special tracer 28,28B, 30 (as shown in FIGS. 15G and 15H).

FIG. 15A depicts key process steps using a tool 42 punching special disks 28A in a plate 40 with a retroreflective surface, where the punch has a relief feature 44 that precludes deforming the disk's retroreflective surface. FIG. 15B depicts forming special disks 28A by cutting the metal sheet 40 with a laser cutter 45. Typically, the metal plate 40 has a retroreflective morphology and a reflective surface coating on one side. The fabrication process to produces jacketed bullets varies, but typically a ductile core 21 is inserted into a partially fabricated bullet jacket 26B. Some bullets are formed with an added penetrator 23, and the core is formed with an inset to receive the penetrator 23. The base of the ductile core is processed with a flat surface, and the partially formed bullet jacket 26B housing the ductile core 21 receives the special tracer disk 28A, the retroreflective surface protected from damage by a tool relief feature 114B, undergoes insertion into the partially formed jacket cavity 26B. FIGS. 15C and 15D depict a die 110A and tools set 110 forming a ductile projectile core 21,23.

FIG. 15E depicts a die 112A and core pressing tool 110D creating a void in a ductile core 21. FIG. 15E depicts insertion of the ductile core 21 into a metal jacket 26A, where a die 112A holds the metal jacket 26A while a tool 112B inserts the ductile core into the metal jacket 26A. This process produces a formed, uncrimped projectile 58A.

Figure 15F:
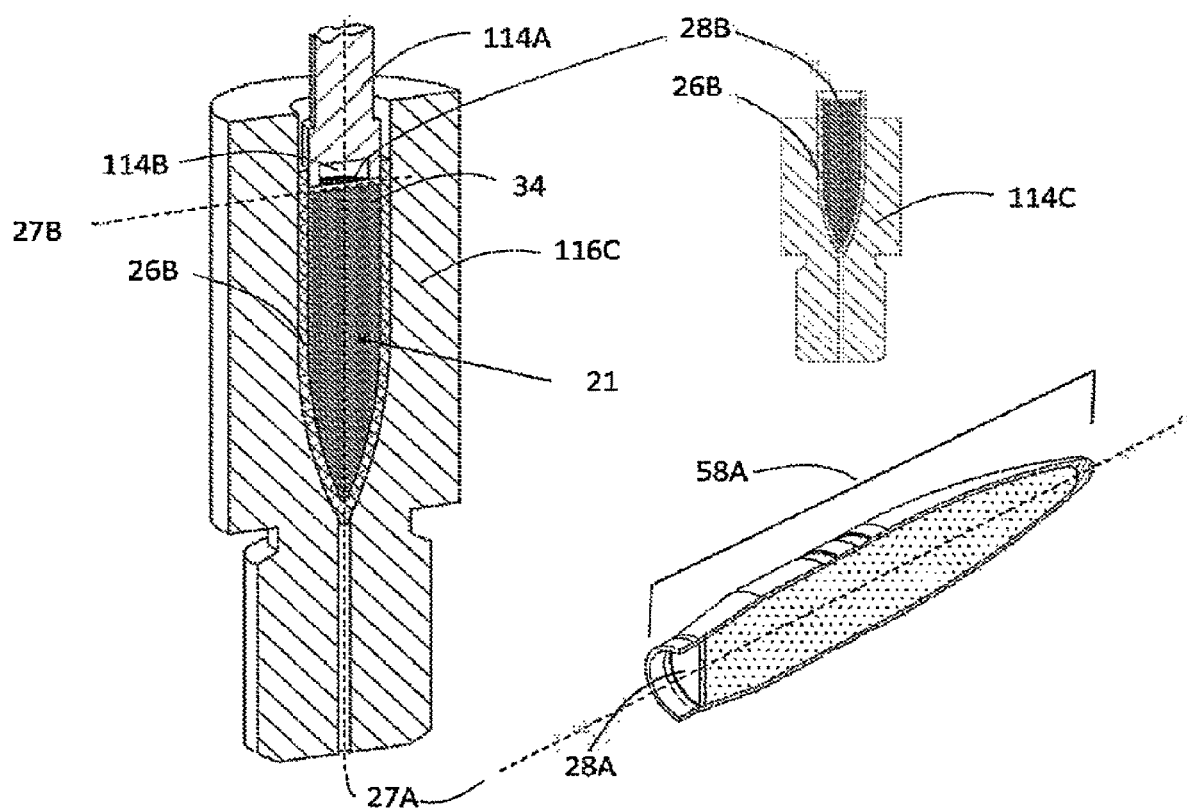
FIG. 15F depicts a tool inserting a special disk positioned adjacent to a ductile core.
Figure 15G:
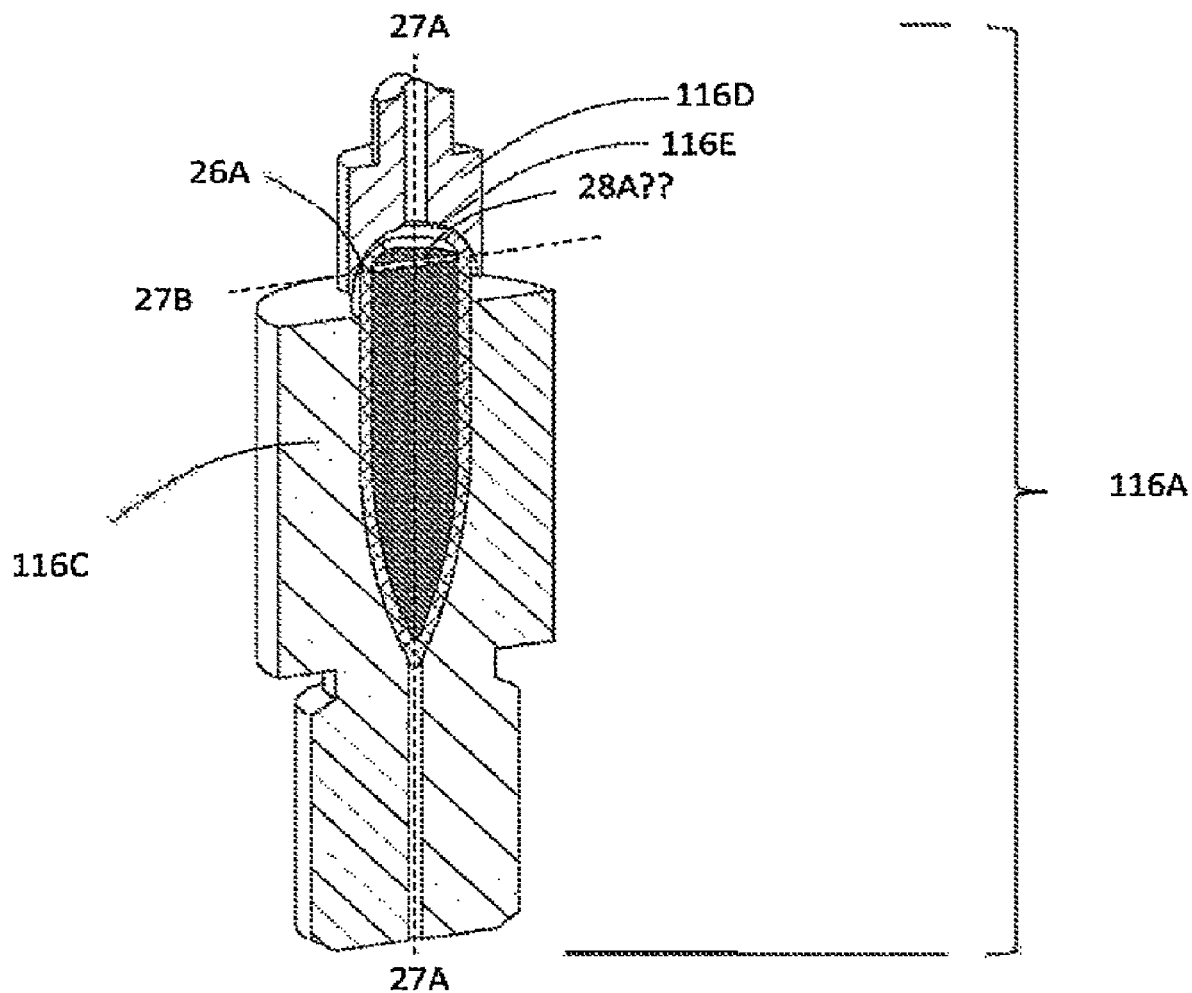
FIGS. 15G and 15H depict fabrication of the optically trackable bullet the crimping action symmetrically forming the crimping tool and die so the tracer crimp secures the special tracer disk positioned perpendicular to projectile's axis of rotation, producing a complete optically trackable projectile, with properly aligned Special Tracer
Figure 15H:
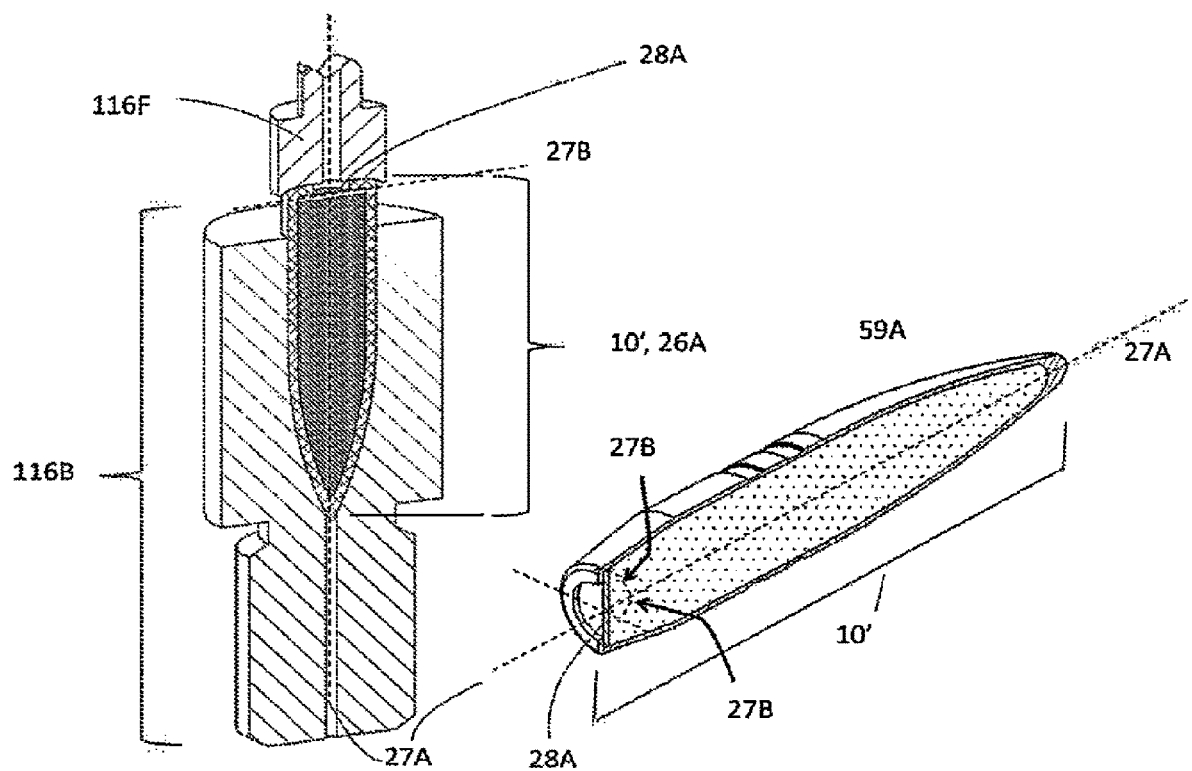

FIG. 15F depicts a tool 114A inserting the special disk 28B positioned adjacent to the ductile core 21 in the rear of the metal jacket 26A symmetrically pressing the special tracer disk 28B into position, parallel to the axis of rotation 27B, forming a sub assembly 58A.

FIG. 15G depicts a Bullet Assembly Tool and Die set 116A, the die 116C and tool 116D in combination holding the projectile sub assembly 58B symmetrically crimping the pressing the special tracer disk 28A into physical contact with the flat preformed ductile core 21 with a tool 27A, the tool and dye combination 116A maintaining a perpendicular relationship between the surface of the inserted special disk 28B and the projectile sub-assembly's 58A axis of spin 27A.

The crimp tool 116D has relief features 116E preventing the process from damaging the exterior surface of the special tracer disk 28A.

FIG. 15H depicts a subsequent final crimp action where a tool 116F crimps the optically trackable projectile 10' with the special tracer disk 28A retaining a perpendicular orientation 27B of the special disk 28A properly aligned, perpendicular to the projectile's axis of rotation 27A the precise alignment minimizing misalignments and maximizing the return of light to a detector 24.

Figure 16:
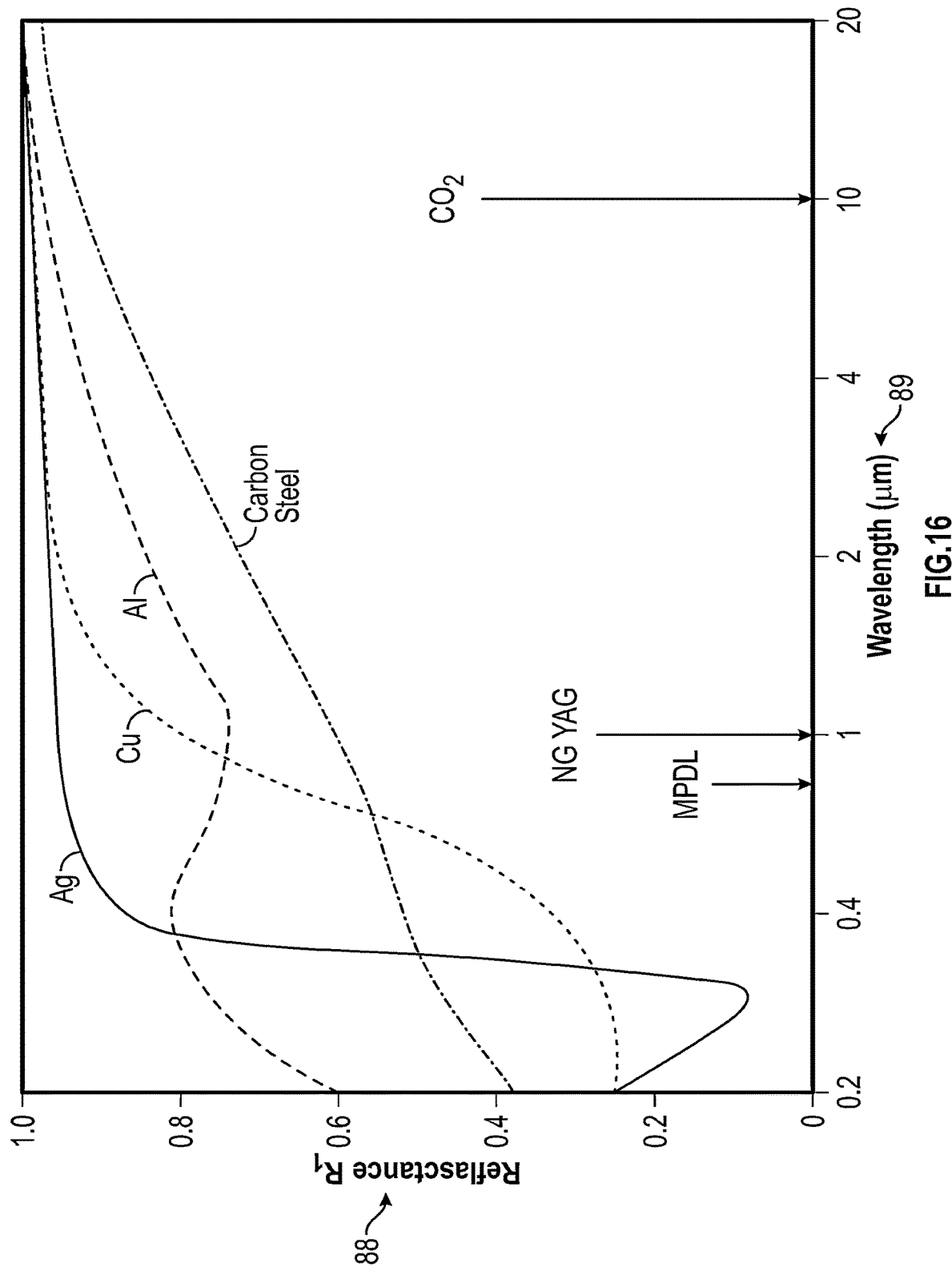
FIG. 16 depicts the different reflectance of metals at certain wavelengths, the special tracer material selected to optimize reflectance in a spectrum corresponding to the emitter

FIG. 16 is a graph illustrating the differing reflectance 88 of metals, in different wavelengths 89, the special tracer disk's 28A surface metal selection bearing on the desired frequency of optical tracking, the optimum wavelength selection corresponding to emitter 18 frequency. Thus, the special tracer disk 28A is paired to optimize reflectance and observability in a specific spectrum (89).

Figure 17A:
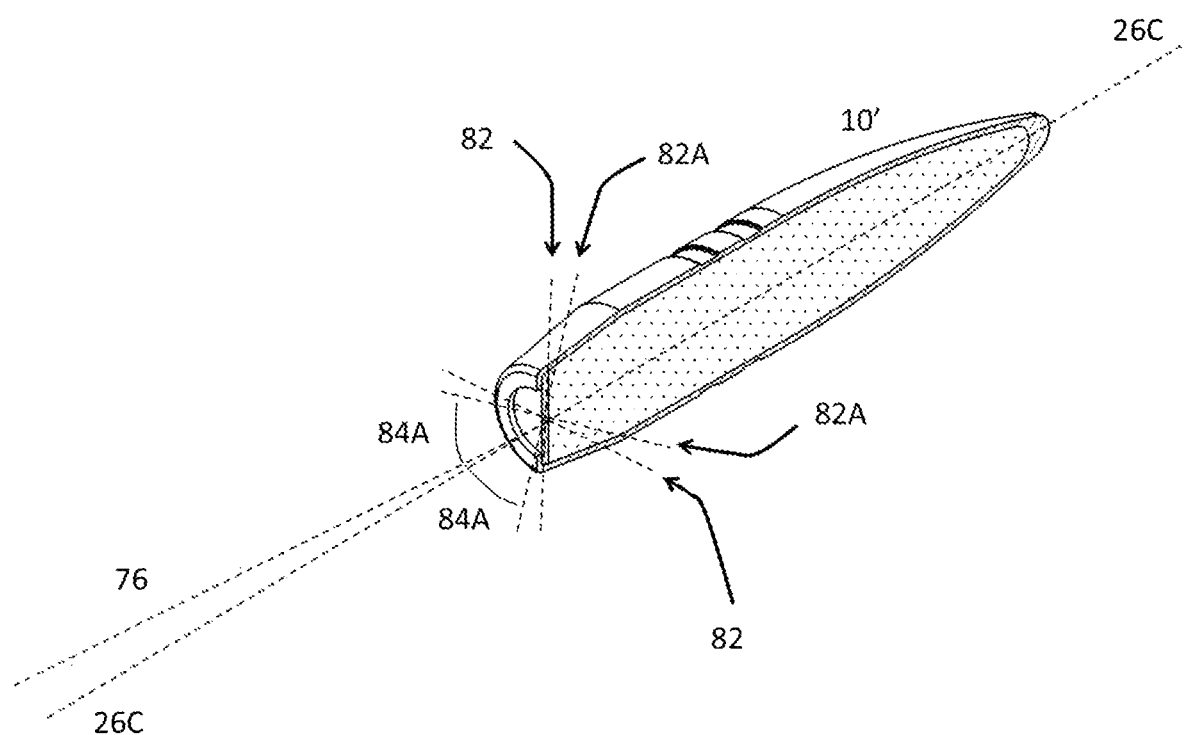
FIG. 17A depicts alignment (or misalignment) of the special tracer with the rotation axis where incorrect crimping creates an error in alignment. The alignment error reducing the return light intensity
Figure 17B:
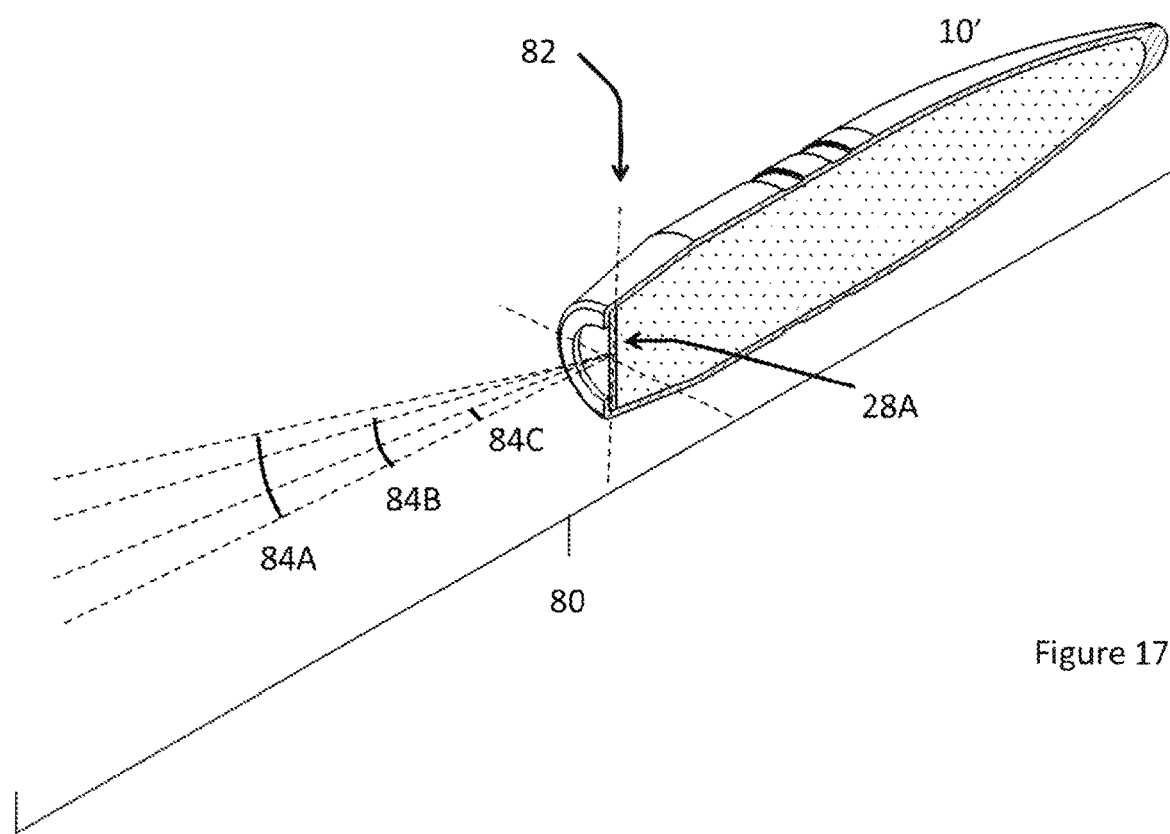
FIG. 17B depicts the increasing incident angles associate with misalignment of the special tracer, the projectile's pitch and yaw and orientation associated with the flight trajectory.

FIG. 17A depicts a misaligned special disk improperly deflects light rearward, change in the incidence angle reducing the light received by the detector (not pictured). FIG. 17B depicts cumulatively increasing deflection of incident light angle 84A, 84B and 84C the deflection associated with changes in projectile trajectory, yaw, pitch and special tracer alignments deflect light.

Figure 17C:
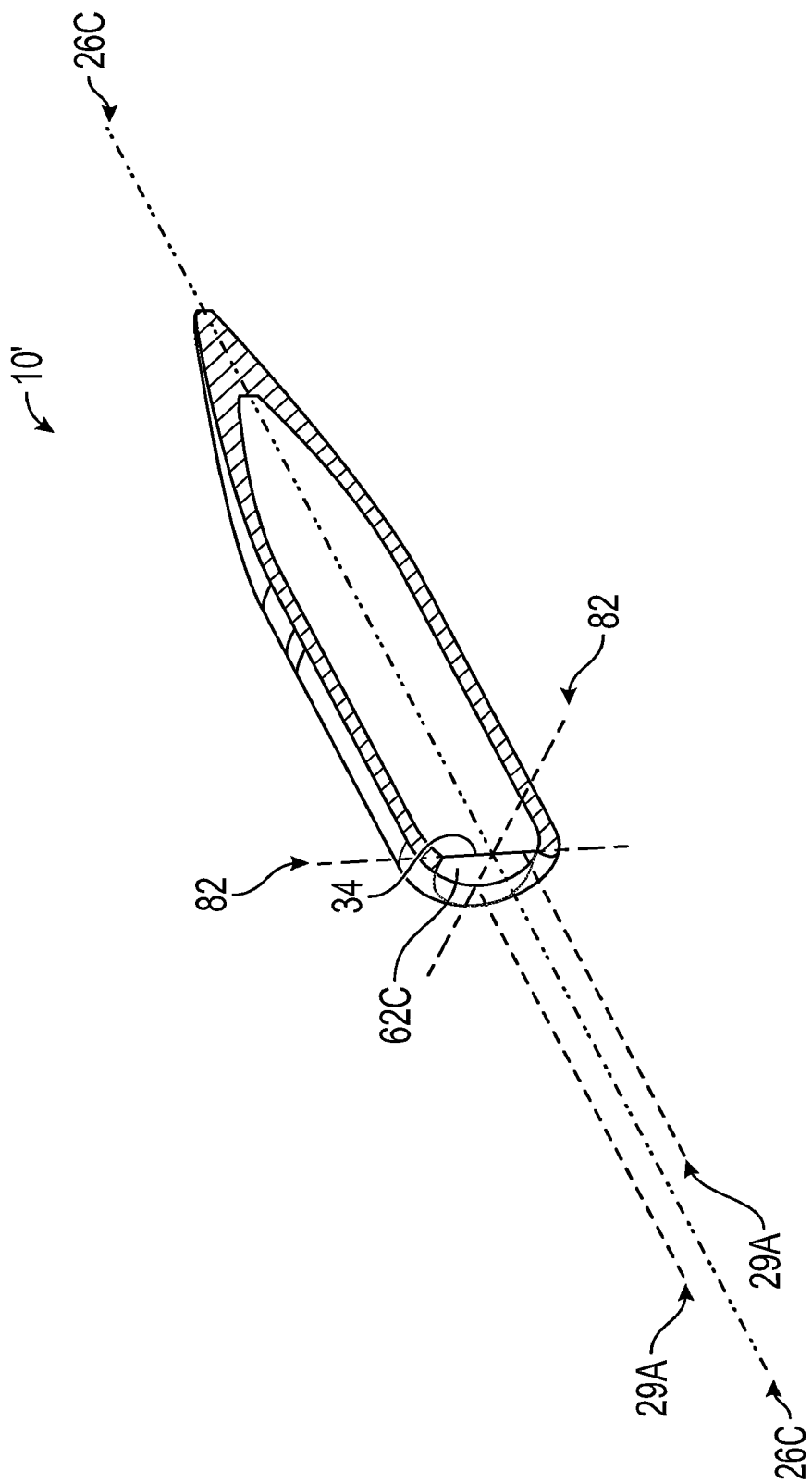
FIG. 17C depicts a retroreflective disk having an array of retroreflectors in an alignment according to a non-limiting embodiment of the inventive concept.

FIG. 17C depicts a retroreflective disk 62C, crimped into a Trackable Projectile 10', the configuration positioning the axes of retroreflective elements 29A, so that they are aligned parallel 27B to the projectile's axis of rotation 26C, where the crimped, inset disk 34 is precisely perpendicular 82 to the projectile's 10' axis of rotation 26C.

Figure 18C:
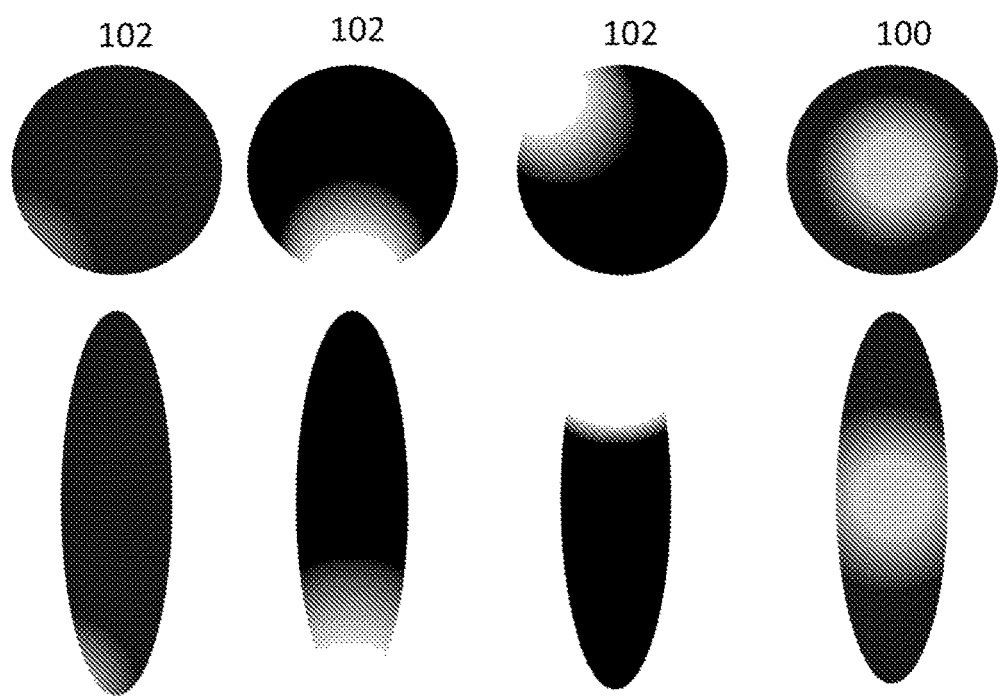
FIG. 18C depicts a light return image at the position of a detector, identifying poor light imaging, and adequate light imaging.

FIGS. 18A and 18B depicts the return signal strength from an optically trackable projectile, with the theoretical (stationary) return 92, the return with projectile nutational movement 94, the return with trajectory changes (associated with the angle of attack) 96 and the return with a further misaligned special tracer disk (misaligned to the axis of rotation) reducing the signal return outside of the detectors sensitivity 98. FIG. 18C depicts the optical return image observed with misaligned special tracer disks 102 and properly aligned special tracer disks 100.

There has thus been shown and described a novel trackable ammunition projectile which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

REFERENCE NUMBERS

02 Cartridge
04 Cartridge Case with primer
06 Primer.
08 Propellant.
10 Trackable Projectile (or Bullet) with a Special Tracer.
10' Trackable Projectile with a perpendicular alignment between the special tracer disk and an axis of rotation of the projectile.
10A Trackable Projectile with a perpendicular alignment between the special tracer disk and an axis of rotation of the projectile, where the center-axes for an array of retroreflective focal elements are aligned parallel to the projectile's axis of rotation.
11 Barrel of a Weapon.
12 Weapon.
14 Breach (in a barrel).
16 Projectile attitude (in a flight path).
18 Emitter (Laser or LED).
20 Light Emission Cone (from an emitter near the weapon).
21 Ductile Bullet Core.
22 Projectile Flight Path.
22A Projectile Range and Time of Flight
22B Projectile Trajectory over distance
23 Ductile Core with Penetrator Insert.
24 Detector.
25 Penetrator.
26 Full Metal Jacket (FMJ) of a projectile.
26A Fully encapsulating metal jacket composed of a FMJ and crimped metal tracer disk.
26B A partially formed metal jacket for a projectile.
26C Axis of rotation of a projectile 10', 10A
27A Axis (Center) of a projectile rotation
27B,C 90° Orientation to Axis of a projectile's rotation.
28 Special Tracer (prior to crimping).
28A Special Tracer in the form of a disk, fabricated from a metal, with retroreflective morphology on the outfacing surface.
28B Special Tracer Wafer with Laser Re-emitting phosphor prior to crimping.
28C Perpendicular 90° Orientation, to plate, and parallel alignment to the projectile's axis of rotation
29 Retroreflective Element's Aperture
29A Axis of a Retroreflective Focal Element's Aperture
30 Special Tracer Crimped into the Projectile by the outer metal jacket forming the surface of a projecile's trailing edge.
32 Crimp of projectile's metal jacket to position Special Tracer Wafer within the projectile.
34 Special Tracer Wafer of metal with formed with micro-prismatic surface (seen under magnification).
36A Special Tracer Wafer with a Laser Re-emitting phosphor in a sub-straight crimped into a projectile.
36B Protective Coating for a Laser Re-emitting phosphor Tracer Wafer fit the rear of a projectile.
40 Metal plate or metallic tape with prismatic features inset used to produce a special disk (28A).
42 A punch to produce a special tracer disk from a metal sheet or tape.
44 An inset or relief feature, configured in punch, to preclude damage to plate surface, when fabricating special disks.
45 Laser Cut used to produce a disk from a plate.
46 Light Return form a Special Tracer.
52 Projectile with a Special Tracer and a conventional metal core.
54 Projectile with a Special Tracer and a penetrator and core (Type 1).
56 Projectile with a Special Tracer and a penetrator core (Type 2).

58 Projectile with a Special Tracer incorporating a re-emitting phosphor responsive to laser illumination.
58A Projectile Assembly with disk inserted, prior to crimping.
59 Projectile with a Special Tracer with a micro-prismatic surface.
59A Formed, uncrimped projectile with inserted disk.
60 Micro-prismatic Retro-reflective surface morphology.
62A Top view of a 3 sided micro-prismatic pyramid.
62B Side view of a 3 sided micro-prismatic pyramid.
62C Perspective, section view of a retroreflective disk, crimped to an optically trackable projectile
64 An array of 3 sided micro-prismatic pyramids.
66 A side or cut-away view (with magnification) of the special tracer wafer's micro-prismatic exterior surface.
68 An alternate design cut-away view (with magnification) of the special tracer wafer's micro-prismatic exterior surface.
70 Coincident Light Fall and Reflectance Incident Angle.
72 Incoming light falling onto the special tracer.
72A Incidental Light Fall on a retro-reflector disk.
72B Light Fall Angle of Incidence $\theta_i$ on a retro-reflector disk.
74 Reflected light returning to the angle of incidence.
74A Reflected Return Light from a retro-reflective disk.
74B Angle of Reflected Light $\theta_r$ from a retro-reflective disk.
76 Rearward conical emission dispersion producing a return reflection over a preponderance of a projectiles trajectory.
76A Rearward reflection of light associated with a projectile's trajectory, corresponding to the projectile's, in flight, precession and nutation.
78 Rearward Special Tracer's surface is perpendicular to the projectile's flight position.
80 Orientation of Projectile, Metal Disk, Light Incidence and Return
82 True Perpendicular Orientation
82A Disk Alignment Error $\theta_{pae}$
84A Incidence $\theta_i$ retro-reflector disk and $\theta_{pae\ (perpendicular\ alignment\ error)}$ of the disk relative to the projectile's true axis of projectile rotation.
84A Return Alignment Error $\theta_{pae}$ return light
84B Return Alignment Error due to pitch associated with the projectile's nutational movement $\theta_n$
84C Return Alignment Error due to pitch angle in flight trajectory $\theta_{tp}$ at range
86 Return Light intensity drop sr<sensitivity of detector.
88 Reflectance
89 Wavelength
90 Return light signal received at a detector (24)
92 Theoretical signal Return excluding nutational errors (metal disk selection, laser strength, projectile orientation, etc.).
94 Reduced light signal return including the reduction of light associated with nutational projectile movement.
96 Further reduced light signal return with misaligned special tracer disk
98 Undetectable return light
100 Clear, strong light signals (received by a detector) where special disk is well aligned to the projectile's axis of rotation.
102 Poor return light signals (received by a detector), with misaligned tracer disk.
110 Core Swaging Tool and Dye Arrangement
110A Core Swaging Die
110B Core Swaging Tool 1
110C Core Swaging Tool 2A
110D Core Swaging Tool 2B
112 Bullet Assembly Tool and Die
112A Bullet Die
112B Core Pressing Tool
114A Special Tracer Disk Insert Press Tool
114B Special Tracer Disk Insert Press Tool Relief Feature
114C Die Special Tracer Disk Insertion
116C Fixture
116D Symmetric Crimp Tool
116E Crimp Relief Feature
116F Final Crimp Tool

What is claimed is:

1. An ammunition cartridge configured to be fired from a weapon's barrel, the cartridge incorporating a projectile comprising:
   (1) an elongated metal jacket having a trailing edge;
   (2) a swaged core encapsulated by the elongated metal jacket; and
   (3) a non-pyrotechnic tracer formed into a metal disk, the disk having been crimped to, and incorporated into the trailing edge of a jacketed projectile, precisely incorporating and securing the crimped tracer disk, to be oriented perpendicular to the axis of rotation of the projectile, wherein the tracer is embossed with a retroreflective morphology, having an array of retroreflectors, oriented in the jacketed bullet so that the focal apertures, in the disk, of the arrayed retroreflectors, in the tracer, are oriented to have a parallel alignment of the rotation of axis of the projectile, and
   wherein observable projectile assembly maximizes the intensity of light returned along the axis of rotation of the projectile that when illuminated by an observer or tracking instrument in the vicinity of the weapon optimizes the intensity of light reflectance allowing for measurement and observation of actual drift and drop of the projectile in flight.

2. The ammunition cartridge of claim 1, wherein the aligned array of retroreflectors, in the trailing edge of the projectile, is configured to return light when the projectile is at a nominal target engagement distance.

3. The ammunition cartridge of claim 2, wherein the projectile is observable at a range where the weapon is bore-sighted.

4. The ammunition cartridge of claim 1, wherein the apertures for retroreflectors on the metal disk remain aligned with the centerline of production dye after fabrication of the projectile.

5. The ammunition cartridge of claim 1, wherein the apertures for retroreflectors on the metal disk remain undamaged after fabrication of the projectile.

6. The ammunition cartridge of claim 1, wherein the tracer, formed from the metal disk having the array of retroreflectors and configured in the trailing edge of the projectile, has a reflective coating.

7. The ammunition cartridge of claim 1, wherein the tracer with the array of retroreflectors is formed from a reflective metal.

8. The ammunition cartridge of claim 1, wherein the tracer with the array of retroreflectors has a coating of a reflective chrome plate.

9. The ammunition cartridge of claim 4, wherein the tracer with the array of retroreflector has a reflective metal surface of silver, copper, aluminum, nickel, or a dielectric.

10. The ammunition cartridge of claim 1, wherein the tracer, formed into the metal disk, with an array of retroreflectors, optimizes reflected light intensity in a specific spectrum associated with a metal chemistry of the reflective surface.

11. The ammunition cartridge of claim 1, wherein the metal disk, forming the tracer, is punched from a thin metal tape or plate that is embossed with a retroreflective surface, the aperture of the retroreflectors being perpendicular to the disk.

12. The ammunition cartridge of claim 1, wherein the tracer is configured in the metal disk, embossed with a retro-reflective morphology forming the array of retroreflectors with the retroreflectors' apertures being oriented perpendicular to the metal disk.

13. The ammunition cartridge of claim 1, wherein the metal disk, forming the tracer, is crimped without causing damage to the retroreflective surface on the exterior of the trailing edge of the projectile.

14. An ammunition cartridge, comprising:
a projectile formed with a metal jacket having a trailing edge;
a ductile core included within the metal jacket; and
an embossed disk having a reflective surface and a retroreflective morphology on the exterior thereof, the disk being configured to be crimped to the trailing edge of the projectile, perpendicular to the axis of rotation of the projectile, the disk crimped in place retained by the metal jacket, forming the aft end of the projectile having retroreflective characteristics and a sealed metal jacket surrounding the interior components of the projectile, the crimping securing the retroreflective morphology to be positioned perpendicular to the axis of rotation of the projectile using a propellant that has minimal off-gassing, reducing the erosive effect on the surface of the metal disk, when the ammunition is stored for extended periods, wherein the retroreflective morphology is configured to, based at least in part on the perpendicular positioning of the retroreflective morphology, maximize the intensity of light returned along the axis of rotation of the projectile and provide reflectance allowing for observation of actual drift and drop of the projectile in flight from the vicinity of a gunner of the projectile, and wherein the tracer is embossed with a retroreflective morphology, having an array of retroreflectors, oriented in the jacketed bullet so that the focal apertures, in the disk, of the arrayed retroreflectors, in the tracer, are oriented to have a parallel alignment of the rotation of axis of the projectile.

15. The ammunition projectile of claim 14, wherein the embossed disk is fabricated with the retroreflective morphology impressed, embossed, stamped, or etched on a polished metal substrate.

16. The ammunition projectile of claim 14, wherein the disk is coated with a reflective chrome finish.

17. A method for fabricating a projectile, comprising:
combining a metal jacket with a swaged ductile core, the metal jacket having a trailing edge;
incorporating a metal plate with a retroreflective surface formed on a disk that functions as a tracer when illuminated, enclosing a projectile; and
crimping the disk to the trailing edge of the metal jacket and forming a full metal jacketed projectile surrounding the interior components of the projectile, wherein the tracer is embossed with a retroreflective morphology, having an array of retroreflectors, oriented in the jacketed bullet so that the focal apertures, in the disk, of the arrayed retroreflectors, in the tracer, are oriented to have a parallel alignment of the rotation of axis of the projectile, and the process of crimping the tracer in the aft end of the metal jacketed projectile precludes causation of damage to the reflective surface of the disk and secures the disk to be positioned perpendicular to the axis of rotation of the projectile, wherein the reflective surface configured in aft trailing edge of the jacketed bullet forms the tracer and is configured to, based at least in part on the perpendicular positioning of the disk, maximize the intensity of light returned along to the axis of rotation of the projectile and provide reflectance allowing for observation of actual flight drop and drift of the projectile in flight from the vicinity of a gunner of the projectile.

18. A trackable projectile having a metal jacket and a core, the projectile being fit with a disk having a tracer, configured to optimize light return when the trackable projectile is illuminated at a distance that coincides with the nominal bore-sighting range for a weapon that is kitted with emitters and detectors, and oriented in a jacketed bullet, the disk having the tracer having been crimped to the trailing edge of a metal jacket and forming the aft trailing end of the projectile and a sealed metal jacket surrounding the interior components of the projectile, the crimping securing the tracer to be positioned perpendicular to the axis of rotation of the projectile, wherein the tracer is embossed with a retroreflective morphology, having an array of retroreflectors, oriented in the jacketed bullet so that the focal apertures, in the disk, of the arrayed retroreflectors are oriented to have a parallel alignment of the rotation of axis of the projectile, and wherein the aligned array of retroreflectors configured in aft trailing edge of the jacketed bullet forms the tracer and is configured to, based at least in part on the perpendicular positioning of the tracer, maximize the intensity of light returned along the axis of rotation of the projectile and provide reflectance allowing for observation of actual drift and drop of the projectile in flight from the vicinity of a gunner of the projectile.

\* \* \* \* \*